US009164202B2

(12) United States Patent
Batchko et al.

(10) Patent No.: US 9,164,202 B2
(45) Date of Patent: Oct. 20, 2015

(54) ADAPTIVE OPTICAL DEVICES WITH CONTROLLABLE FOCAL POWER AND ASPHERIC SHAPE

(75) Inventors: Robert G. Batchko, Santa Monica, CA (US); Andrei Szilagyi, Santa Monica, CA (US); Samuel T. Robinson, Santa Monica, CA (US)

(73) Assignee: HOLOCHIP CORPORATION, Albuquerque, NM (US)

(*) Notice: Subject to any disclaimer, the term of this patent is extended or adjusted under 35 U.S.C. 154(b) by 57 days.

(21) Appl. No.: 13/598,539

(22) Filed: Aug. 29, 2012

(65) Prior Publication Data

US 2013/0176628 A1   Jul. 11, 2013

Related U.S. Application Data

(63) Continuation-in-part of application No. 13/301,492, filed on Nov. 21, 2011, now Pat. No. 8,605,361, which (Continued)

(51) Int. Cl.
*G02B 1/06* (2006.01)
*G02B 3/12* (2006.01)

(Continued)

(52) U.S. Cl.
CPC .. *G02B 3/12* (2013.01); *G02B 3/14* (2013.01); *G02B 26/005* (2013.01); *G02B 1/041* (2013.01); *G02B 26/004* (2013.01)

(58) Field of Classification Search
CPC ...... G02B 3/14; G02B 26/004; G02B 26/005; G02B 3/12; G02B 1/041
USPC .................................................. 359/665–667
See application file for complete search history.

(56) References Cited

U.S. PATENT DOCUMENTS 696,788 A    4/1902  Allen
2,300,251 A   10/1942 Flint
(Continued)

FOREIGN PATENT DOCUMENTS

EP    1925963    5/2008
EP    2034338    3/2009
(Continued)

OTHER PUBLICATIONS

Ex Parte Quayle Action dated Aug. 20, 2009 for U.S. Appl. No. 11/928,076 entitled "Fluidic Optical Devices".

(Continued)

*Primary Examiner* — Evelyn A Lester
(74) *Attorney, Agent, or Firm* — Joshua D. Isenberg; JDI Patent

(57) ABSTRACT

A fluidic lens may include an optical surface configured for deflection dominated by bending stress. An adjustable concentric load may be applied to the optical surface to cause a clear aperture region of the optical surface to deflect with generally spherical curvature. Adjusting the concentric load controls the radius of curvature. An adjustable uniformly-distributed load may be applied to the optical surface by fluid pressure that causes the clear aperture region to deflect with an aspheric shape. Adjusting the pressure controls the asphericity of curvature. First and second fluids having similar densities and different refractive indexes may be disposed on either side of a deflectable optical surface to help balance gravitational loading on either side of the optical surface, thereby reducing gravity-associated aberrations.

2 Claims, 38 Drawing Sheets

Related U.S. Application Data is a continuation-in-part of application No. 12/706,637, filed on Feb. 16, 2010, now Pat. No. 8,064,142.

(60) Provisional application No. 61/529,174, filed on Aug. 30, 2011, provisional application No. 61/539,823, filed on Sep. 27, 2011, provisional application No. 61/539,891, filed on Sep. 27, 2011.

(51) Int. Cl.
*G02B 3/14* (2006.01)
*G02B 26/00* (2006.01)
*G02B 1/04* (2006.01)

(56) References Cited

U.S. PATENT DOCUMENTS

| | | | |
|---|---|---|---|
| 2,504,039 | A | 4/1950 | O'Leary |
| 4,261,655 | A | 4/1981 | Honigsbaum |
| 4,444,471 | A | 4/1984 | Ford, Jr. et al. |
| 4,466,706 | A | 8/1984 | Lamothe, II |
| 4,514,048 | A | 4/1985 | Rogers |
| 4,783,155 | A * | 11/1988 | Imataki et al. ............... 359/676 |
| 4,784,479 | A | 11/1988 | Ikemori |
| 4,802,746 | A | 2/1989 | Baba |
| 4,890,903 | A | 1/1990 | Treisman et al. |
| 4,892,396 | A | 1/1990 | Kushibiki et al. |
| 4,913,536 | A | 4/1990 | Barnea |
| 5,138,494 | A | 8/1992 | Kurtin |
| 5,672,001 | A | 9/1997 | Bertling et al. |
| 5,774,273 | A | 6/1998 | Bornhorst |
| 5,973,852 | A | 10/1999 | Task |
| 6,081,388 | A | 6/2000 | Widl |
| 6,288,767 | B1 | 9/2001 | Murata et al. |
| 6,369,954 | B1 | 4/2002 | Berge et al. |
| 6,542,309 | B2 | 4/2003 | Guy |
| 6,618,208 | B1 | 9/2003 | Silver |
| 6,860,601 | B2 | 3/2005 | Shadduck |
| 7,068,439 | B2 | 6/2006 | Esch et al. |
| 7,072,086 | B2 | 7/2006 | Batchko |
| 7,142,369 | B2 | 11/2006 | Wu et al. |
| 7,218,429 | B2 | 5/2007 | Batchko |
| 7,218,430 | B2 | 5/2007 | Batchko |
| 7,359,124 | B1 | 4/2008 | Fang et al. |
| 7,369,321 | B1 | 5/2008 | Ren et al. |
| 7,369,723 | B1 | 5/2008 | Mescher |
| 7,374,301 | B1 | 5/2008 | Simmers |
| 7,440,193 | B2 | 10/2008 | Gunasekaran et al. |
| 7,453,646 | B2 | 11/2008 | Lo |
| 7,612,948 | B2 | 11/2009 | Immink et al. |
| 7,646,544 | B2 | 1/2010 | Batchko et al. |
| 7,672,059 | B2 | 3/2010 | Batchko et al. |
| 7,697,214 | B2 | 4/2010 | Batchko et al. |
| 7,755,840 | B2 | 7/2010 | Batchko et al. |
| 7,813,047 | B2 | 10/2010 | Wang et al. |
| 8,064,132 | B1 | 11/2011 | Leblanc |
| 8,064,142 | B2 | 11/2011 | Batchko |
| 8,503,875 | B2 | 8/2013 | Szilagyi et al. |
| 8,605,361 | B2 | 12/2013 | Batchko et al. |
| 8,665,527 | B2 | 3/2014 | Batchko et al. |
| 2002/0154380 | A1 | 10/2002 | Gelbart |
| 2004/0082993 | A1 | 4/2004 | Woods |
| 2004/0240076 | A1 | 12/2004 | Silver |
| 2004/0262645 | A1 | 12/2004 | Huff et al. |
| 2005/0030438 | A1 | 2/2005 | Nishioka |
| 2006/0077562 | A1 | 4/2006 | Silver |
| 2006/0126190 | A1 | 6/2006 | Berge et al. |
| 2006/0164731 | A1 | 7/2006 | Wu et al. |
| 2007/0030573 | A1 | 2/2007 | Batchko et al. |
| 2007/0201138 | A1* | 8/2007 | Lo ................................ 359/666 |
| 2007/0211207 | A1 | 9/2007 | Lo et al. |
| 2007/0263293 | A1 | 11/2007 | Batchko et al. |
| 2008/0112059 | A1* | 5/2008 | Choi et al. .................... 359/664 |
| 2008/0144185 | A1 | 6/2008 | Wang |
| 2008/0218873 | A1 | 9/2008 | Batchko |
| 2008/0225379 | A1 | 9/2008 | Mescher |
| 2008/0231963 | A1 | 9/2008 | Batchko |
| 2008/0239503 | A1 | 10/2008 | Conradi et al. |
| 2008/0259463 | A1 | 10/2008 | Shepherd |
| 2008/0285143 | A1 | 11/2008 | Batchko et al. |
| 2009/0021823 | A1 | 1/2009 | Heim et al. |
| 2009/0040361 | A1 | 2/2009 | Heim et al. |
| 2009/0052049 | A1 | 2/2009 | Batchko et al. |
| 2009/0195882 | A1 | 8/2009 | Bolle et al. |
| 2010/0103542 | A1 | 4/2010 | Yasuda et al. |
| 2010/0231783 | A1 | 9/2010 | Büeler |
| 2010/0232161 | A1 | 9/2010 | Aschwanden |
| 2011/0007161 | A1 | 1/2011 | Batchko et al. |
| 2011/0261466 | A1 | 10/2011 | Buch et al. |

FOREIGN PATENT DOCUMENTS

| | | |
|---|---|---|
| EP | 2238952 | 10/2010 |
| EP | 2239600 | 10/2010 |
| GB | 1327503 | 8/1973 |
| JP | 1166003 | 6/1989 |
| JP | 1166004 | 6/1989 |
| JP | 05303011 | 11/1993 |
| JP | 10144975 | 5/1998 |
| JP | 11133210 | 5/1999 |
| JP | 2000081504 A | 3/2000 |
| KR | 1020010094241 | 10/2001 |
| KR | 1020080000577 | 1/2008 |
| WO | 9918456 | 4/1999 |
| WO | 2005096028 | 10/2005 |
| WO | 2008018387 | 2/2008 |
| WO | 2008138010 | 11/2008 |
| WO | 2010015093 | 2/2010 |
| WO | 2010015095 | 2/2010 |
| WO | 2010103037 | 9/2010 |
| WO | 2010104904 | 9/2010 |

OTHER PUBLICATIONS

Final Office Action dated Jan. 22, 2009 for U.S. Appl. No. 11/383,216,18 pages.

Final Office Action dated Sep. 17, 2007 for U.S. Appl. No. 12/117,625 entitled "Fluidic Lens With Manually-Adjustable Focus".

Final Office Action for U.S. Appl. No. 12/828,192 dated Sep. 14, 2011.

Hongwen Ren et al. "Variable-Focus Liquid Lens by Changing Aperature", Applied Physics Letters, vol. 86, No. 21107, May 17, 2005, p. 211107-3.

Integral—Definition from the Merriam-Webster Online Dictionary, http:// www.merriam-webster.com/dictionary/integral[1],downloaded on Mar. 17, 2009, 1 page.

International Search Report and Written Opinion of the International Searching Authority dated Aug. 8, 2008—International Patent Application No. PCT/US08/63122, 9 pages.

International Search Report and Written Opinion of the International Searching Authority for the international application No. PCT/US08/63107, Aug. 4, 2008, 7 pages.

J. Chen et al.,"Variable-Focusing Microlens with Microfluidic Chip", J. Micromech. Microeng. 14,p. 675-680,2004.

Notice of Allowance and Fee(s) Due dated Nov. 16, 2009 issued for U.S. Appl. No. 11/928,076.

Notice of Allowance and Fee(s) Due dated Nov. 20, 2009 issued for U.S. Appl. No. 12/117,625.

Notice of Allowance and Fee(s) Due dated Apr. 23, 2009 for U.S. Appl. No. 11/928,076, 7 pages.

Notice of Allowance and Fee(s) Due dated Apr. 9, 2009 for U.S. Appl. No. 11/383,216, 6 pages.

Notice of Allowance and Fee(s) due dated Feb. 22, 2010 for U.S. Appl. No. 11/928,376.

Notice of Allowance and Fee(s) Due dated Jan. 18, 2011 for U.S. Appl. No. 12/758,751.

Notice of Allowance dated Mar. 10, 2009 for U.S. Appl. No. 11/747,845, 8 pages.

Notice of Allowance dated Jul. 9, 2009 for U.S. Appl. No. 11/747,845 entitled "Fluidic Lens With Electrostatic Actuation".

(56) References Cited

OTHER PUBLICATIONS

Notice of Allowance dated Aug. 13, 2009 for U.S. Appl. No. 11/928,216 entitled "Fluidic Optical Devices".
Notice of Allowance dated Aug. 28, 2009 for U.S. Appl. No. 11/383,216 entitled "Fluidic Optical Devices".
Office Action dated Feb. 15, 2011 for U.S. Appl. No. 12/706,637.
Office Action dated Mar. 5, 2009 for U.S. Appl. No. 11/928,216.
Office Action dated Apr. 28, 2009 for U.S. Appl. No. 12/117,625, 6 pages.
Office Action dated Feb. 4, 2011 issued for U.S. Appl. No. 12/828,192.
Office Action dated Jul. 23, 2008 for U.S. Appl. No. 11/747,845, 9 pages.
Office Action dated Jun. 12, 2008 for U.S. Appl. No. 11/383,216, 22 pages.
Office Action dated Oct. 22, 2008 for U.S. Appl. No. 11/928,076, 8 pages.
Office Action dated Sep. 21, 2009 for U.S. Appl. No. 11/928,376.
PCT International Search Report dated Dec. 24, 2010 for international application No. PCT/US2010/031776.
Piston—Definition from the Merriam-Webster Online Dictionary, http:// www.merriam-webster.com/dictionary/piston, dowmloaded on Mar. 19, 2009, 2 pages.
S. Perichon et al. "Stretchable Gold Conductors on Elastomeric Substrate", Applied. Physics. Letter, vol. 82, No. 15, p. 2404-2406, Apr. 14, 2003.
U.S. Appl. No. 12/706,637 to Robert G. Batchko, et al., filed Feb. 16, 2010.
U.S. Appl. No. 13/301,492 to Robert G. Batchko, et al., filed Nov. 21, 2011.
U.S. Appl. No. 61/529,174 to Robert G. Batchko, et al., filed Aug. 30, 2011.
U.S. Appl. No. 61/539,823 to Robert G. Batchko, et al., filed Sep. 27, 2011.
U.S. Appl. No. 61/539,891 to Robert G. Batchko, et al., filed Sep. 27, 2011.
Unit—Definition from the Merriam-Webster Online Dictionary, http://www.merriam-webster.com/dictionary / unit, downloaded on Mar. 20, 2009,1 page.
U.S. Appl. No. 12/828,192, filed Jun. 30, 2010.
U.S. Appl. No. 60/242,395 to Robert G. Batchko, entitled "Combinatorial Optics" filed Oct. 20, 2000.
U.S. Appl. No. 60/395,849 to Robert G. Batchko, entitled "Digital Focus Lens System" filed Jul. 11, 2002.
U.S. Appl. No. 60/680,632 to Robert G. Batchko, et al., filed May 14, 2005.
U.S. Appl. No. 60/683,072 to Robert G. Batchko, et al., filed May 21, 2005.
U.S. Appl. No. 60/703,827 to Robert G. Batchko, et al., filed Jul. 29, 2005.
U.S. Appl. No. 60/723,381 to Robert G. Batchko, et al., filed Oct. 3, 2005.
U.S. Appl. No. 60/747,181 to Robert G. Batchko, et al., filed May 12, 2006.
U.S. Appl. No. 60/916,739 to Robert G. Batchko, et al., filed May 8, 2007.
U.S. Appl. No. 61/115,456 to Robert G. Batchko, et al., filed Nov. 17, 2008.
U.S. Appl. No. 61/115,459 to Robert G. Batchko, et al., filed Nov. 17, 2008.
Non-Final Office Action for U.S. Appl. No. 14/196,976, dated Jun. 24, 2015.

* cited by examiner

ADAPTIVE OPTICAL DEVICES WITH CONTROLLABLE FOCAL POWER AND ASPHERIC SHAPE

CROSS-REFERENCE TO RELATED APPLICATION

This application is a continuation-in-part of commonly assigned U.S. patent application Ser. No. 13/301,492, to Robert G. Batchko et al., entitled "FLUIDIC LENS WITH REDUCED OPTICAL ABERRATION", filed Nov. 21, 2011, the entire contents of which are incorporated herein by reference. U.S. patent application Ser. No. 13/301,492 is a continuation of and claims the priority benefit of commonly assigned U.S. patent application Ser. No. 12/706,637, to Robert G. Batchko et al., entitled "FLUIDIC LENS WITH REDUCED OPTICAL ABERRATION", filed Feb. 16, 2010, now U.S. Pat. No. 8,064,132, the entire contents of which are incorporated herein by reference.

This application is a continuation-in-part of and claims the priority benefit of commonly assigned U.S. patent application Ser. No. 12/706,637, to Robert G. Batchko et al., entitled "FLUIDIC LENS WITH REDUCED OPTICAL ABERRATION", filed Feb. 16, 2010, now U.S. Pat. No. 8,064,132, the entire contents of which are incorporated herein by reference.

This application is a non-provisional of and claims the priority benefit of commonly assigned U.S. Provisional Patent Application No. 61/529,174, to Robert G. Batchko et al., entitled "FLUIDIC LENS WITH IMPROVED ASPHERIC SHAPE AND A METHOD OF REDUCING PRESSURE EXCURSIONS IN A FLUIDIC LENS BOUNDED BY BENDING MEMBRANES", filed Aug. 30, 2011, the entire contents of which are incorporated herein by reference.

This application is a non-provisional of and claims the priority benefit of commonly assigned U.S. Provisional Patent Application No. 61/539,823, to Andrei Szilagyi et al., entitled "ADAPTIVE OPTICAL DEVICES WITH CONTROLLABLE FOCAL POWER AND ASPHERIC SHAPE", filed Sep. 27, 2011, the entire contents of which are incorporated herein by reference.

This application is a non-provisional of and claims the priority benefit of commonly assigned U.S. Provisional Patent Application No. 61/539,891, to Robert G. Batchko et al., entitled "ADAPTIVE OPTICAL DEVICES WITH CONTROLLABLE FOCAL POWER AND ASPHERIC SHAPE", filed Sep. 27, 2011, the entire contents of which are incorporated herein by reference.

FIELD OF INVENTION

This invention generally relates to liquid lenses and more particularly to fluidic liquid lenses.

BACKGROUND OF THE INVENTION

The prior art contains a number of references to adaptive optics (AO), lenses and systems. The development of AO over the last several years has led to important advances in multiple fields; this has been made possible by virtue of AO's ability to reduce the number of moving parts, foot print and design effort associated with optical systems. One area of AO that has received considerable attention is the liquid lens. In these devices, a volume of fluid typically provides a reconfigurable optical medium. Selected optical properties of the lens are adjusted by manipulating various properties of the fluid and/or the boundary conditions of the compartment or substrates housing the fluid.

Typical liquid lenses fall under one of three categories: electrowetting; liquid crystal (LC); or fluidic. A notable example of an electrowetting lens is provided by Bruno Berge, et al., "Lens with variable focus", PCT Publication No. WO 99/18456. In that system, a compartment houses two immiscible liquids having different refractive indexes. The interface between the two liquids can vary from substantially flat to substantially spherical in curvature and is largely determined by the contact angle formed between the interface and the wall of the compartment. The curvature of the interface and difference in indexes between the two fluids serves as a lens for light transmitted across the interface. The contact angle will change in response to a voltage applied across the compartment wall. A change in voltage will result in a change in the curvature of the interface and focal power of the lens. Although the electrowetting approach yields a conveniently compact system with low power requirements and fast response, it is difficult to maintain a stable interface for clear apertures greater than about 5-mm diameter.

LC lenses generally utilize the fact that liquid-crystal molecules, which are shaped like tiny rods, can change their orientation in an electric field. Under sufficient field strength, a substantial amount of the molecules can line up parallel to the field. This alters the refractive index, and hence the focal power, of the material. By tailoring the field, substrate and/or LC layer, various optical properties can be controlled. In "Adaptive Liquid Crystal Lenses," U.S. Pat. No. 6,859,333, Ren, et al., teach a LC lens based on a homogeneous nematic LC layer sandwiched between two transparent substrates. The first substrate includes a spherical or annular ring-shaped Fresnel grooved transparent electrode patterned on its inner surface, while the second substrate includes a transparent electrode coated on its inner surface. When a voltage is applied across the LC layer, a centro-symmetrical gradient distribution of refractive index within the LC layer occurs. The difference in indexes of the LC layer and patterned substrate causes light to focus. By controlling the applied voltage, the focal length of the lens can be tuned continuously. While this device overcomes many limitations typical of other LC lenses, such as strong astigmatism, distortion and light scattering, it suffers from a slow response time. For example, the focusing time of a 6-mm diameter lens having a 40-micron-thick LC layer is approximately 1 second.

The family of fluidic lenses embodies a wide variety of designs and features, however lenses of this type typically comprise the following basic structure: (a) a lens compartment filled with a transparent and incompressible fluid; (b) the compartment is bounded around its sides by a sidewall and on its optical faces by a pair of opposing optical surfaces wherein at least one of the optical surfaces (a "membrane") is formed from an elastic material and is thus capable of elastic strain; (c) an actuator delivers an actuation force (or "load", "loading" or "applied load") to the compartment or fluid, resulting in a pressurization of the fluid and a deformation of the membrane; and (d) once the actuation force is diminished, the restoring or elastic force of the membrane may contribute to the restoration of the membrane to its original or non-actuated state. The change in shape of the membrane and difference in index of refraction between the fluid and medium external to the compartment, result in a change in focal power of the fluidic lens. A system has also been demonstrated (see J. Chen et al., J. Micromech. Microeng. 14 (2004) 675-680) wherein only one lenticular body is provided, bounded on at least one side by an optically clear, compliant membrane. In that system, the refractive power of the lens is controlled by pumping in or out a controlled amount of fluid, thereby changing the curvature of the bounding membrane. That system still suffers from the disadvantage that the pressurized fluid source is located remotely from the compartment. This makes the form-factor of the whole system inconvenient.

While fluidic lenses are capable of overcoming many problems associated with liquid lenses, such as slow response time, instability of large apertures and optical losses, certain limitations remain. For example, in order to reduce the force required by the actuator, it is often desirable for the membrane to be highly compliant and have low elastic (or Young's) modulus, typically in the range of about 0.05 to 2 MPa. However, such low elastic modulus may cause the lens to be susceptible to disturbances, such as instabilities in focus and tilt due to forces of acceleration, and aberrations, such as coma, which may be due to gravitational forces. An approach to mitigating this limitation that has been taught is pre-tensioning of the elastic membrane during lens fabrication, e.g., as described in U.S. Pat. No. 7,697,214 to Robert G. Batchko et al entitled "FLUIDIC LENS WITH MANUALLY-ADJUSTABLE FOCUS", the entire contents of which are incorporated herein by reference. Pre-tensioning reduces the compliance of the membrane, making it effectively stiffer and thus more resistant to the effects of gravity. Nevertheless, is some instances (for example, lenses with small f/#'s or large apertures) coma and other gravity-induced aberrations persist.

Another inherent disadvantage of many low-elastic modulus membrane materials (for example, polydimethylsiloxane or PDMS) is their permeability, or inability to effectively block the passage of some gases and fluids. Such permeability may result in air bubbles developing in, or fluid leaking out of, the fluidic lens. These effects can diminish the durability, lifetime, optical quality, dynamic range and other performance properties of the lens. Some approaches to solving this problem may include coating the membrane with a high-barrier material or increasing the thickness of the membrane. However, these approaches can result in disadvantageous effects such as increasing the complexity of fabrication, optical scatter and loss, and aberrations.

Yet another inherent disadvantage of typical fluidic lenses is that the shape profile and resulting optical properties of the lens are substantially governed by the tensile elastic properties of the membrane (e.g., Young's modulus, thickness, and amount of pre-tensioning) and fluid pressure. In conventional optics, it is often desirable for the surface of a lens to have a spherical, or prescribed aspheric, profile. However, in the case of fluidic lenses, the highly compliant nature of the membrane generally results in a strong nonlinear dependence of the membrane profile on fluid pressure. Thus, instead of maintaining a spherical profile independent of fluid pressure (i.e., fluid pressure only affecting the radius of curvature), the membrane profile of the fluidic lens may deviate significantly from spherical, with the amount of deviation being dependent on fluid pressure. Such complex dependencies can severely limit the ability to control the optical properties (such as aberrations, the conic constant and other optical effects) of fluidic lenses.

More recently, another co-pending application Ser. No. 12/706,637 ("VARIABLE-FOCAL-LENGTH FLUIDIC LENS WITH REDUCED OPTICAL ABERRATION", to Batchko et al.) taught means by which the aforementioned limitations could be largely overcome. A key element in overcoming these limitations was the use of membranes constructed from intrinsically stiff materials, such as glass or optical plastics. In such stiff materials the nature of the deformation is substantially a bending strain, whereas in the case of compliant membranes (such as those composed of elastomer films) the deformation is substantially an elastic strain. In such membranes that deform by bending strain, their stiffness is generally sufficient to resist the effects of gravity. However, when the lens profile no longer afflicted by gravitationally-induced optical coma, spherical aberration (the next higher order aberration commonly associated with fluidic lenses) may now become the dominant aberration. It is well known in the art that spherical aberration is not only associated with fluidic lenses, but also in general with all types of lenses, including static lenses composed of solid materials and other types of adaptive lenses such as liquid crystal and electro-optic lenses. Solutions for providing a fixed (or "static") spherical correction are known in the art (for example, Schmidt corrector plates). Likewise, dynamic wavefront correction can be accomplished by deformable mirrors [Saito et al., U.S. Pat. No. 7,520,613], liquid crystal spatial light modulators [Barnes et al., U.S. Pat. No. 5,018,838] and mechanical movement of static elements [Alvarez, U.S. Pat. No. 3,305,294 and Simonov et al., WPO International Publication Number WO 2011/019283 A1].

Nonetheless, these solutions suffer from limitations including: high insertion loss; limited range of optical waves of wavefront correction, mechanical complexity and reflective-only (i.e., only non-transmissive or refractive) design.

Despite their low cost and other advantages, the abovementioned limitations and inability to achieve optical performance at a level comparable to that of conventional lenses has thus far prohibited developers from substantially adopting liquid lenses in numerous optical products and applications.

Thus, there is a need in the art for an adaptive optical device that overcomes the above disadvantages.

BRIEF DESCRIPTION OF THE DRAWINGS

Objects and advantages of the invention will become apparent upon reading the following detailed description and upon reference to the accompanying drawings in which.

DESCRIPTION OF THE SPECIFIC EMBODIMENTS

Figure 1:
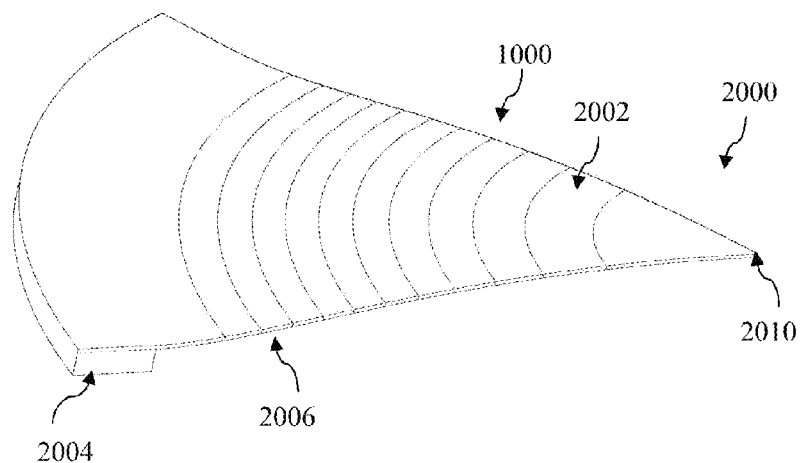
FIG. 1 shows a wedge-shaped section view of a fluidic lens membrane having a high elastic modulus and being fixed in a rigid mounting configuration.

In the following detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Elements

In a preferred embodiment of the present invention, an adaptive fluidic device may comprise an adaptive fluidic lens. The adaptive fluidic lens may include one or more compartment member (compartment). The compartment may function as the core or body of the lens through which light is transmitted and its propagation controlled. The compartment may include and be at least partially bounded by one or more optical surface. One or more optical surfaces may be configured to elastically deform (or "deflect") under an applied load. A fluid may be disposed at least partially inside the compartment and in communication with an optical surface. The compartment may include one or more support member (support), which may be configured to mount, fasten-to and/or provide a boundary condition for an optical surface and/or the compartment. Additionally, the support may serve to communicate an applied load to an optical surface and/or the compartment, resulting in a change in an optical property of the device. An actuator may be configured to provide the applied load (or "actuation force" or "motive force"). A housing member (housing) may be provided and disposed in the proximity of the compartment. The housing may serve to house, mount or contain and/or provide structural support for the compartment and/or device or any member thereof.

The Optical Axis

An optical axis may be associated with the device and defined as an axis passing through a portion of an optical surface. Preferably, the optical axis may be oriented orthogonal to and intersecting the center of an optical surface. Throughout the following discussion, the use of the word "axial" may be used to mean: in a direction substantially parallel to the optical axis or cylindrical axis of the device.

The Clear Aperture

In the present embodiment, the device may further include a clear aperture. The clear aperture may preferably be configured in a circular shape, having a radius (clear aperture radius). However in other configurations, the clear aperture may alternatively be configured in any other desirable shape (for example, rectangular). Preferably, the optical properties of the device may be optimally utilized for light incident on the clear aperture. The clear aperture may be disposed substantially concentric and orthogonal to the optical axis. Alternatively, the clear aperture may be disposed in any desirable orientation and/or position relative to the optical axis.

Clear Aperture Defined by Actuator or Device

In a present embodiment, the clear aperture may be defined or bounded by one or more components of the device; for example, features of the compartment or actuator. In one example, the actuator may be a configured in the form of an annulus or annular disk (for instance, a piezoelectric ring bender). The inner diameter of the annular disk of the actuator (actuator aperture) may be disposed in optical communication with an optical surface. In this fashion, the actuator aperture may substantially define the clear aperture, since light rays not passing through the actuator aperture may be substantially obstructed from impinging on the optical surface by the actuator. Similarly, the compartment, housing or any other portion of the device may include an aperture, edge, or other boundary disposed in optical communication with an optical surface, thereby defining a clear aperture.

The Compartment

Compartment as the Main Optical Body of the Device

The compartment may be considered to be an optical body of the device and configured for the transmission of light through it, reflection, diffraction or scatter of light off of it, and/or emission or absorption of light by it. The compartment may include one or more optical surfaces and clear apertures.

Fluid Disposed in the Compartment; Example of a Fluidic Lens

In a preferred embodiment, for example a fluidic lens, the compartment may be configured to contain one or more fluid. Preferably, the fluid may be disposed in optical communication with a clear aperture. Alternatively, the fluid may be disposed in a fashion such that it is not in communication with a clear aperture.

Fluidic Lens with Two Optical Surfaces

In this fashion, a ray of light may enter the compartment through a clear aperture of a first optical surface, propagate through a fluid and exit the compartment through a clear aperture of a second optical surface. In an alternate embodiment, a ray of light (or photon) may enter the compartment through a first location on an optical surface, propagate through a media disposed in the compartment, and exit the compartment through a second location on the optical surface. Examples of such a configuration include: optical surfaces that are curved and intersect the optical axis at multiple locations; fluid or other media disposed in the compartment having waveguiding properties such as metamaterials, transformational optics, or photonic crystals; or nonlinear optical materials such as those possessing suitable third-order electric susceptibility and demonstrating the optical Kerr effect.

Fluidic Mirror

For example, in another embodiment, such as an adaptive or deformable mirror, the compartment may be bounded on a side by an at least partially reflective optical surface, for example, a mirror. In this fashion, a compartment may contain a fluid and be bound on a side by an optical surface. Light, external to the compartment may strike the optical surface and at least a portion of the light may reflect off of the optical surface. Alternatively, light internal to the compartment, may strike the optical surface and at least a portion of the light may reflect off of the optical surface. In general, such deformable mirrors, adaptive mirrors, or adaptive fluidic mirrors may be configured in any desirable fashion to reflect and/or scatter light off of an optical surface (for example, the optical surface may include a mirror coating, diffractive grating, hologram, nanoparticles, or any other desirable surface property).

Other Configurations of the Compartment

More generally, the compartment may be bounded by one or more optical surface such that a ray of light may be incident on the optical surface at two or more distinct locations. For instance, a ray of light may enter the compartment through a first location on an optical surface and exit the compartment through a second location on the optical surface. In still other embodiments, for example, a mirrored fluidic lens, a first optical surface may be at least partially transmissive while a second optical surface may be at least partially reflective. In this fashion, a ray of light may be transmitted through the first optical surface, into the fluid, reflect off of the second optical surface, propagate back through the fluid and exit the compartment through the first optical surface.

Reservoir Member of the Compartment

In yet other embodiments, the compartment may contain fluid disposed outside of the clear aperture; in this fashion, at least a portion of the compartment may function as a reservoir for a portion of the fluid.

Closed or Open Compartment

The compartment may be closed or open to the external environment. For example, a closed compartment may contain a fluid and be hermetically sealed from the external environment, while an open compartment may contain a fluid and include one or more hole, via, duct, pass-through, port, channel or other opening. For example, channels may be disposed in the compartment for providing communication of fluid or pressure between the compartment and an externally disposed pump, actuator, other reservoir, additional compartment or external environment.

Elastic Properties of the Compartment

The compartment may be at least partially compliant and/or rigid or be configured to exhibit any desired elastic or other physical, mechanical, optical, electrical or other properties.

Compression of the Compartment Due to Axial Force or Fluid Pressure

In one embodiment, a fluid-filled compartment may be configured to deflect in a compressive and/or tensile fashion in response to an applied load. For example, an actuator may apply an axially-directed compressive load to a compliant portion of the compartment. The resulting compression of the compartment may result in a change in fluid pressure internal to the compartment and a redistribution of fluid in the compartment. Likewise, the change in fluid pressure may be distributed over the internal surface of the compartment, resulting in a deflection of an optical surface.

Compartment Actuated by Fluidic Pressure

Alternatively, the actuator may include a pump wherein fluid pressure inside the compartment may be adjusted by pumping fluid into and/or out of the compartment. One or more of the compartment and/or optical surface may deform or deflect in response to the change in fluid pressure. In one example of a fluidic lens, the compartment may be substantially rigid, wherein a change in fluid pressure may result in a deflection of one or more optical surface, resulting in a change in an optical property of the device.

Compartment as a Fluidic Prism

In another example, a fluidic prism, the compartment may be at least partially compliant and two optical surfaces may be substantially rigid. A change in fluid pressure may result in a deflection of the compartment, but substantially no deflection of the optical surfaces. However, the deflection of the compartment may result in a change in relative positions of the optical surfaces, and, hence, a change in apex angle of the fluidic prism.

Housing Member

In one embodiment a housing member (housing) may be provided and disposed in the proximity of the compartment. The housing may serve to house the device and/or provide structural support for the compartment and/or device or any members thereof. Further, the housing may include or house a second compartment, actuator, support, optical surface, reservoir, or any other desirable element or member of the device. Further, the housing may be configured to provide electrical interface to actuators or other components in the device. Yet further, the housing may include, house or provide first and/or second compartments, actuator, optical surface, reservoir actuators, mounts or fastening features, optical elements and/or any other desirable components of the device.

The Fluid

In a preferred embodiment, a fluid may be disposed at least partially inside a compartment. In other embodiments, for example, in the case of a fluid disposed in a reservoir or pump disposed externally to the device, a fluid alternatively may be disposed outside of a compartment.

Multiple Fluids and Index of Refraction

More generally, one or more fluids or any other desirable media may be disposed at least partially inside and/or outside of the compartment. Preferably, the fluid(s) or media on either side of an optical surface may be selected so that there is a difference in the index of refraction between the fluid or media disposed on one side of an optical surface and the fluid or media disposed on other side. In this fashion, a change in the shape profile of an optical surface may result in a change in a property of light transmitted across, or incident upon, the interface of the optical surface and a fluid, and hence, a change in an optical property of the device.

Second Fluid

For example, a second fluid may be disposed in a housing or external (or "second") compartment and/or in communication with a side of an optical surface. For example, a first side of an optical surface may be in communication with a first fluid disposed in a first compartment. A second side of the optical surface may be in communication with a second fluid disposed in a second compartment. Either or both compartments may be disposed in one or more housing. Such configurations of multiple fluids and/or compartments may be employed to provide optical effects including chromatic or dispersive optical properties, such as adaptive fluidic lens doublets or triplets. Alternatively, multiple fluids may be balanced with similar densities or specific gravities in order to reduce or eliminate disturbances to the shape of the optical surface due to gravitational forces.

Properties and Index Matching of the Fluids

First fluid, second fluid, or any other fluid may be index matched (e.g., matching indexes of refracting or impedance matched) to any element or component of the device or the environment external or internal to the compartment. For example, first fluid may be index matched to a support over a selected range of wavelengths thereby preventing interference patterns and effects (such as etalons and Newton's rings) from occurring between a support and an optical surface. Further, the refractive index of a fluid may be matched to the refractive index of one or more optical surfaces to reduce reflection losses (or Fresnel reflections). In another embodiment the refractive index of the fluid may be selected to have a high refractive index to maximize the dioptric range, the range of focal lengths, of a lens member. The fluid may flow from one part of compartment 6404 to another with little or no resistance. Further, a second fluid may have substantially the same or different index of refraction than the first fluid. Further, the second fluid may be selected from any of the same or different groups as that the first fluid. Yet further, first and second fluids may be selected to have similar or generally identical densities, specific gravity, coefficient of thermal expansion, or any other desirable properties. For example, first and second fluids may be disposed in respective compartments on either side of a single optical surface (or membrane). First fluid may be disposed in physical communication with one side of an optical surface, while second fluid may be disposed in physical communication with the other side of the optical surface. In this fashion, the similar densities of first and second fluids may help balance the loading on either side of the optical surface due to gravity (for instance, when the optical axis is horizontally oriented). Thus, gravity-associated deflections of the optical surface and resulting optical aberrations of the device may be reduced. Further, the similar coefficients of thermal expansion of first and second fluids may provide balanced loading of the optical surface due to gravity over an increased range of operating temperatures.

Compressibility of the Fluid

In a preferred embodiment, the fluid may be generally incompressible. However, in other embodiments (for example, configurations wherein one of the fluids is a gas), it may be desirable for a fluid to be at least partially compressible.

Properties of the Fluid

Preferably, the fluid may be at least partially transparent (or transmissive) in a desired spectrum or range of electromagnetic wavelengths. However, in other embodiments, the fluid may be selected from known materials and have desirable characteristics of transmission, absorption, dispersion, specific gravity, coefficient of thermal expansion, viscosity, vapor pressure, hydrophobicity, dielectric strength, surface tension, electrical or thermal conductivity, or any other desirable property. Further, the fluid may be selected from any fluid, liquid, gas, gel, plasma, solid or vacuum or any other desirable media chosen for its performance characteristics including optical, mechanical, physical, electrical, chemical, or any other desirable properties.

The Optical Surface

In a preferred embodiment of the present invention, the optical surface may be similar to one or more structures under the general classification of "plate" as understood in the field of plate theory (or plate deflection theory, continuum mechanics, mechanical engineering, or other related fields); such classifications include thick plates, medium thickness (or Kirchhoff) plates, thin plates, and diaphragms (or "membranes"). These plate classes can be summarized briefly as follows: (a) Thick plates. The deflections of a thick plate are very small and therefore fiber elongation and diaphragm stresses (which cause fiber elongation) may be ignored. However, as a result of the large thickness, the bending stresses are also small and therefore they are comparable with shear stresses. The deflection of thick plates, therefore, is based on bending and shear stress. The shear results in the distortion of the line segments perpendicular to the central plane of the plate; (b) Medium thickness plates (Kirchhoff plates). These plates have smaller thickness than thick plates, which results in higher bending stresses which prevail over the shear stress. Therefore the shear stresses may be ignored as well as their result (i.e. distortion of the originally straight perpendicular lines to the central plane of the plate). On the other hand, the deflection is not so big to result in a significant elongation of the fibers in the central plane (the plane dividing the plate in the middle of the thickness). Therefore diaphragm stress may also be ignored. Only the bending stress is considered for these plates with linear distribution of the bending stresses along the plate thickness and zero bending stress in the central plane of the plate. An example material that may be configured to exhibit properties similar to a medium-thickness plate includes flexible glass (or "microsheet"). Flexible glass may be approximately between 75 and 150 microns in thickness and present manufacturers of it include Corning Incorporated, Asahi Glass Co., Ltd., and Schott AG. One such commercially available flexible glass is Gorilla® Glass manufactured by Corning Incorporated having a Young's modulus of approximately 71.7 GPa; (c) Thin plates producing large deflections. In the case of thin plates producing large deflections, the effects of shear are even less significant than for the medium thickness plates and therefore its effects may be ignored. Bending stress must be taken into consideration and, in addition, the diaphragm (or "tension" or "tensile") stresses also act and cannot be ignored. This is due to the fact that there are larger deflections which may result in changes in the length of the central plane fibers. These length changes are related to the acting diaphragm stresses. In addition, this type of plate may be non-linear, i.e. deformations and stresses are not directly proportional to the loading, even if the linear Hook principle applies. It is the so-called 'geometrical non-linearity' which results from high deformations—specifically as a result of high turning angles. An example of a material that may be configured to exhibit properties of thin-plates may be the optical-grade plastic, polycarbonate, having a Young's modulus of approximately 2 GPa; (d) Diaphragms (or "membranes"). Diaphragms are plates that may be so thin that their bending rigidity is negligible (as well as the bending stress) and only tensile stress is considered (e.g. various elastomeric membranes). As a result of high deformations these plates are also geometrically non-linear. The optically-clear silicone, polydimethylsiloxane (PDMS), having a Young's modulus of approximately 360-870 KPa, is an example of a material that may be configured in a thin plate and/or diaphragm-like optical surface.

Properties of an Optical Surface

The optical surface may be configured to meet any characteristic properties, for example, optical, physical, mechanical or any other desirable property or specification. Examples of such properties may include: optical power, refractive index, dispersion, spectral transmittance, diffraction, or any other desirable optical property; density, Young's modulus, Poisson's ratio, chemical composition, viscosity, glass transition temperature, coefficient of thermal expansion, density, shear modulus, liquidus temperature, surface tension, chemical durability, hydrolytic class, knoop hardness, grindability, strength, impact strength, coefficient of linear thermal expansion, thermal conductivity, thermal diffusivity, specific thermal capacity (heat capacity), specific heat, shore hardness, specific gravity, elongation, surface resistivity, volume resistivity, tensile modulus, tensile strength, nominal strength at break, flexural modulus, flexural strength, impact strength, mold shrinkage, yield stress, water absorption, thickness, radius, width, length or any other dimensions. In an embodiment, an optical surface may be substantially transparent at desired wavelengths of light. However, in other embodiments, an optical surface may be reflective, diffractive, scattering, holographic or have any other desirable optical property.

Boundary Conditions Governing the Shape of an Optical Surface

Generally, the shape and deflection characteristics of an optical surface disposed in communication with a support may be governed by physical properties of the optical surface and/or support (such as Young's modulus, thickness and length, width or radius of the optical surface and/or support), the applied load (such as fluid pressure; stresses or forces including bending moment, tensile or shear force or other forces), the state of deflection of the optical surface, support, and/or compartment, and/or other boundary conditions of the optical surface, support and/or compartment.

Bending of a Stiff Optical Surface

In one embodiment, a substantially stiff optical surface may be clamped or fixed, disposed in communication with, fastened by, or mounted to one or more support. For example, a support may be fixed to the outer edge of an optical surface. In one embodiment, the deflection of an optical surface may be dominated, or affected, by bending stress. As a result of the deflection of the optical surface being affected by bending stress, a bending moment may occur in the optical surface in response to an applied load. A stiff optical surface may bend, substantially as a result of an applied load, thereby changing certain optical properties of the device. Such a stiff optical surface may provide greater resistance to disturbances (for example, gravity, shock or vibration) than more compliant, diaphragm-like optical surfaces.

Small and Large Deflections of the Optical Surface and Restoring Forces

In a preferred embodiment of the present invention, an optical surface may be configured for deflection, in response to an applied load, based substantially on bending, tensile, compressive or any other desirable stress. Likewise, upon removal or reduction of the applied load, the optical surface may substantially recover or tend toward its undeflected shape primarily due to a restoring stress. In some embodiments, the optical surface may be configured for small deflections (i.e., where the magnitude of deflection is approximately smaller than the thickness of the optical surface); for example; Kirchhoff or thin plate-like optical surfaces. Alternatively, in other embodiments, the optical surface may be configured for large deflections (i.e., where the magnitude of deflection is approximately greater than the thickness of the optical surface); for example, diaphragm-like optical surfaces where strain may be dominated by elongation of radial fibers. In general, any type of optical surface may be configured for small, large, or any other desirable type of deflection. Additionally, the optical surface may be preferably, configured for deflection or strain within its elastic limit. For example, an actuator may apply a load to at least a portion of the compartment, optical surface, support or any other part of the device, resulting in a deformation of at least a portion of the optical surface. The applied load may be in the form of uniform and/or concentrated load. Upon the removal of the applied load, the stiffness of the deflected optical surface may provide a restoring force, assisting the device in returning the optical surface substantially to its undeflected state.

Diaphragm-Like Optical Surface

In other embodiments, an optical surface may be diaphragm-like, similar to a membrane, wherein its deflection may be dominated or affected by diaphragm, tensile or other stresses resulting in a "stretching" deformation of the optical surface. More generally, the deflection of an optical surface may be dominated or affected by any combination of stresses, for example, tensile, diaphragm, bending and/or any other desirable stress.

Rigid Optical Surfaces

In some embodiments, one or more of the optical surfaces may be at least partially rigid. In this fashion, a rigid (or "static") optical surface may be configured to exhibit substantially zero deflection in response to the same or similar applied load that may be utilized to cause the deflection of a compliant, or non-rigid, optical surface. For example, in one embodiment, a plano-convex adaptive fluidic lens may incorporate one compliant (or deflectable) optical surface and one rigid planar optical surface. Both optical surfaces may be subjected to the same applied load, however, only the compliant optical surface may deflect under the load. In this fashion, the compliant optical surface may deflect in a convex shape, changing radius of curvature and/or other optical properties, as a function of the applied load, while the rigid optical surface may remain planar regardless of the state of the applied load. The rigid optical surface may comprise optical elements such as a glass or plastic element, optical window, lens, prism, mirror or any other desirable optical element. Alternatively, an optical surface may be configured with any desirable shape or profile in its deflected or undeflected state. For example, a rigid optical surface may be configured with a static convex profile. Further by way of example, a deflectable optical surface may have a convex shape while in an undeflected state, and a planar or altered convex shape while in a deflected state.

Optical Surface May Include Metamaterials

In other embodiments, an optical surface, fluid or other component of the device may include metamaterials, photonic crystals, nanoparticles and/or be configured to support surface plasmons, guided waves or other optical propagation modes.

Shape of the Undeflected Optical Surface

In the present embodiment, an optical surface (i.e., either a deflectable or undeflectable optical surface) may be configured to be planar and circular in shape; however, any other desirable shape (such as rectangular, elliptical, annular, etc.) may be employed. For example, rectangular-shaped optical surfaces may be employed in order to enable a fluidic optical device with variable astigmatism, or provide a variable focal-length cylindrical lens. Further, the undeflected shape of the optical surface may be non-planar. For example, an adaptive fluidic lens may incorporate an optical surface that has been molded in a convex spherical cap having a radius of curvature. In response to an applied load, the optical surface may change its radius of curvature, thereby changing an optical property of the device.

Pre-Tensioned Optical Surfaces

In some applications (for example, see U.S. patent application Ser. No. 12/706,637, to Robert G. Batchko et al., entitled "FLUIDIC LENS WITH REDUCED OPTICAL ABERRATION", filed Feb. 16, 2010, which has been incorporated herein by reference) it may be desirable to pre-tension an optical surface (for example, during assembly of a fluidic optical device). Pre-tensioning of the optical surface may increase the fluid pressure required to achieve a given curvature, thereby making the fluidic optical device less susceptible to optical aberrations due to gravity or other disturbances. Further, pre-tensioning an optical surface may help reduce its response time (i.e., the time required to achieve a stable state of deflection in response to a change in applied load. Preferably, optical surfaces having diaphragm-plate-like material properties or low modulus of elasticity may incorporate pre-tensioning. However, other types of optical surfaces, including thin plate, medium-thickness plate, thick plate, or any other desirable type of optical surface may be pre-tensioned.

Angle Between Two Optical Surfaces

In a preferred embodiment, two optical surfaces may bound two sides of a compartment and may be disposed substantially parallel to each other. However, in other applications it may be desirable for the optical surfaces to be configured at any desirable relative position with respect to each other and/or the compartment. For example, two rigid optical surfaces may be disposed at an acute angle relative to each other. Such a configuration may be desirable for a fluidic prism or beam scanner wherein the angle between the optical surfaces may be controlled by an applied load. In general, an optical surface may be configured in any desirable orientation relative to the optical axis, other optical surfaces, the compartment, and/or other part of the device.

The Actuator

Function of Actuator and Configuration of Applied Load

The actuator may serve to provide the applied load (or "load", "actuation force" or "motive force') that may be communicated to, and result in the deflection of, a compartment, support and/or an optical surface. In a preferred embodiment, the load may be connected from the actuator to an optical surface through one or more of the compartment and/or support. The actuator may be configured to deliver the applied load in any desirable fashion, for example: a bending moment, concentrated load, concentric load, point load, distributed load, uniformly distributed load, fluid pressure, shear load, shear stress, surface stress (such as a radial stress or a tangential stress), stress normal to or at any angle to the optical axis, other forms of loading similar to those associated with the deflection of beams, plates or diaphragms, or any other desirable form of loading. Further, the load may be converted or modified in any desirable fashion, for example: amplification, conversion between stroke, rotation, pressure and/or moment modification, or any other conversion or modification of any desirable types of force or load. In one embodiment, the actuation force may be applied to a portion of the compartment and/or support, resulting in a concentrated and/or distributed load being applied to the support. The applied load may result in a deformation of the support and a movement or deflection of an optical surface.

Types of Actuators

In a preferred embodiment, the actuator may include an electromagnet and may provide tensile and/or compressive force. In another embodiment the actuator may include one or more piezoelectric ring bender (ring bender). As described in U.S. patent application Ser. No. 12/706,637, to Robert G. Batchko et al., entitled "FLUIDIC LENS WITH REDUCED OPTICAL ABERRATION", filed Feb. 16, 2010, the entire contents of which have been incorporated herein by reference, in one embodiment, an actuator may be formed in the shape of a substantially flat ring or annulus (or annular disk) and may include an aperture; for example, a ring bender. Upon actuation, the ring bender may provide an axially directed (or directed parallel to the optical axis) load. In other embodiments, any known type of actuator may utilized, including, for example, any of the following: electrostatic actuators; voice coils; solenoids; piezoelectric; piezoceramic; electroded piezoceramic ring actuators; electrostrictive; shape memory; shape memory alloy; dielectric electroactive polymer; dielectric polymer; electroactive polymer; multilayer (or stacked layers of) dielectric or electroactive polymer; conductive electro-active polymer; shape memory alloy (SMA) actuators; electroactive polymer artificial muscle (EPAM) actuators; resonant motors; resonant piezoelectric motors; ultrasonic motors; ultrasonic piezoelectric motors; elliptical path motors; precessing motors; stepper motors; stepper motors combined with a mechanism for conversion of rotary into linear motion (i.e., such as a lead screw arrangement); other types of motor actuators; other types of piezoelectric actuators (i.e., such as flextensional, recurve; prestressed; multilayer; bimorph; unimorph; piezoelectric disk benders; piezoelectric ring benders; piezoelectric tube; piezoelectric sphere or spherical sector; piezoelectric c-block; piezoelectric multilayer stack; piezoelectric rings, etc.); and piezoelectric tubes combined in telescopic arrangements to multiply their axial stroke by the number of telescoping segments. In order to gain additional actuation amplitude (or "stroke") and/or additional actuation force, a plurality of actuators may be combined or stacked before being brought into contact with the compartment and/or any other element of the device. In general, any desirable type of actuator or actuators may be employed to provide the applied load.

Alternate Configurations and Shapes of Actuators; Pumps

In alternative embodiments, the actuator may be formed in any desirable shape and may or may not include an aperture in communication with the clear aperture. In a preferred embodiment, the actuator may be disposed in communication with or proximal to an optical surface or the compartment. Alternatively, the actuator may be disposed apart from the optical surface(s) and/or compartment. For example the actuator may include a fluid pump located a distance away from the optical surface and/or compartment. As is well known in the art, the actuation force provided by a pump actuator may serve to adjust fluid pressure in the compartment, thereby providing an applied load in the form of a distributed load to one or more of an optical surface, support and/or compartment and resulting in a change in an optical property of the device.

Stacks of Bender Actuators

In another embodiment, a plurality of actuators, such as piezoelectric ring benders, may be configured in communication with each other. Such configurations may include a stack of ring benders whereby the stacking provides an enhancement or modification in one or more of force, stroke, stiffness, compliance, speed, range of operating temperatures, or any other desirable parameter of actuators. For a stack of actuators, each individual actuator in the stack may have a plurality of electrical terminals or electrodes. Interconnects may be employed to make connections between electrodes of actuators in the stack. For piezoelectric ring benders (ring benders) may have a metal shim electrode and a conductively-coated ceramic electrode. In one example configuration, conductive spacer rings may be employed between each ring bender in the stack to connect the shim electrode of one to the ceramic electrode of the next one in the stack. Additionally, conductive straps may be employed at the inner and/or outer edges of the ring benders to connect electrodes of adjacent actuators in the stack as desired.

Direction of Actuation Force and Types of Stresses

In one embodiment, the actuation force may be directed substantially parallel to the optical axis, and deliver axial stress to the one or more of the compartment, support and/or optical surface. However, in other embodiments, the actuation force may be exerted in any desirable orientation, for example, in a radial, tangential, orthogonal or any other orientation relative to the optical axis. For example, in another embodiment, the actuator and/or actuation force may be distributed generally around the one or more of compartment, support and/or optical surface. The actuator may thus be configured to deliver one or more of a radial stress, tangential stress, circumferential stress or hoop stress to one or more the compartment, support, optical surface or any other member of the device.

The Support

Functions of the Support

In one embodiment, one or more supports may be disposed in communication with one or more of a compartment and/or an optical surface. (Note, throughout this discussion, the terms "support" and "restraint" may be used interchangeably with the same meaning). The support may provide multiple functions in the device. In one function, the support may be similar to supports or connectors known in the field of mechanics, wherein a support provides the interface for communicating loads and/or forces to objects or structures, for example, a beam, cantilever, plate, bridge, etc. In this fashion, the support may serve to mount a portion (for example, the edge) of an optical surface to a portion of the compartment. In this capacity, the support may provide a boundary condition for an optical surface, thereby affecting the shape profile of the optical surface as it deflects in response to the applied load. For example, the optical surface may be substantially stiff and its deflection dominated or affected by bending stress. The support may be substantially rigid, clamping the outer edge of the optical surface (such support may be similar to a fixed or clamped support of a plate or beam). Such a support may cause the optical surface to bend or undergo tensile, bending or other stress or strain under an applied load. As an alternative example, the support may be at least partially compliant, providing at least a partially flexural or hinge-like boundary condition to the optical surface (such support may be similar to a fulcrum, hinge, rocker, pin, pin-joint or simple support of a plate or beam). Such a compliant support may allow the optical surface to at least partially pivot, slide, bend or other deflection and/or undergo tensile, bending or other stress or strain under the applied load. Alternatively, the support may be compliant to pivoting but not compression, as may be the case for a hinge or flexure. In general, the support may be configured to support or mount the optical surface in any desirable fashion.

Shapes of Support and Support Radius

In one embodiment, the support may be circular ring-shaped and the optical surface may be circular disk-shaped. The support may have a radius (support radius) approximately equal to or smaller than the radius of edge (or "outer edge") of the optical surface (optical surface radius). In one embodiment, the inner diameter (or inner perimeter or inner edge) of a support may substantially define the perimeter of the clear aperture. In other embodiments, the support may have any desirable shape, including square, oval, rectangular, open or closed shapes (including lines, segments, L-shaped sections), asymmetric or any other known shape. Alternatively, the outer edge of the optical surface may extend radially outward past (or "overhang") a support. In general, a support may be disposed anywhere on an optical surface.

A Support as a Distinct or Integrated Component

The support may be a distinct component in the device, or alternatively, it may be integrated (or unitary or monolithic) with one or more of the optical surfaces, or any other desirable element of the device.

A Compliant Support and Restoration Forces

In an embodiment, the support may be configured to be at least partially compliant. The compliance of the support may allow the compartment to be compressed, tensioned, torqued or otherwise elastically deformed in response to a load from an actuator. In one embodiment, such a deformation of the support may result in a change in fluid pressure internal or external to the compartment. Such change in fluid pressure may be employed to provide an applied load (such as a uniformly distributed load) to an optical surface, resulting in a deflection of the optical surface. For example, in one embodiment, a majority of the reaction force may be provided by the support with the balance of reaction forces coming from the optical surface. Alternatively, any part of the device may deform in response to the applied load. The elastic energy of one or more of the deformed support, optical surface, fluid, compartment, or any other part of the device may contribute a restoring or reaction force any of these components.

Support in Communication with Optical Surface; Properties of the Support

Properties of the support may include material properties (such as modulus of elasticity), geometric properties (such as shape), dimensional properties (such as relative thickness, diameter, width or length), boundary conditions, magnitude of loading or other properties or conditions. Further, the fashion in which the support is fastened to or disposed in communication with the optical surface and/or compartment may affect the deflection of the optical surface. For example, the support may be similar to a fixed, clamped, compliant, cantilever, sliding, hinge, simple, ring, pin-joint, or any other desirable type of support similar to those known in the field of mechanics, plate and/or shell theory. Additionally, the support may be at least partially rigid and/or elastic (or compliant) and have any desirable geometric, material or other properties. Techniques for fastening, or disposing, a support in communication with an optical surface, compartment or any other desirable part of the device may include adhesive bonding with or without specialized surface treatments (such as exposure to oxygen plasma prior to making contact between the parts that are to be bonded), clamping, bonding, molding, use of frictional, interference or other types of fit, and/or any other desirable methods of fixturing.

Bonding of Support to Optical Surface

In another embodiment, the inner support (or "inner restraint") may be disposed in communication with one or more of the optical surfaces. The inner restraint and one or more of the optical surfaces may be fixed to each other (for example, by way of a chemical bond (such as adhesion), mechanically clamping, or a frictional or interference fit).

Support Provides a Seal for the Compartment

In another function, the support may be disposed in communication with a portion of an optical surface and/or the compartment and provide a seal for containing fluid, solid, gas and/or any other desirable media in and/or out of the compartment. Alternatively, a support may be configured to substantially create a seal between two optical surfaces. Alternatively still, the support may form a boundary between a first portion of the compartment disposed radially internal to the support (inner sub-compartment), and a second portion of the compartment disposed radially external to the support (outer sub-compartment). In this fashion, the support may be configured to control, prevent or limit fluid communication between the two portions of the compartment. More generally, the support may provide a seal for containing fluid, solid, gas and/or any other desirable media in and/or out of any portion of the compartment. In an embodiment, the inner sub-compartment may be similar to a clear aperture. Further, the outer sub-compartment may be similar to a reservoir.

Fluid Channels in a Support

In one embodiment, it may be desirable for one or more of the compartment and/or a support to be configured to permit fluid flow or fluid communication between different regions of the compartment. Such fluid communication may be desirable, for example, for the control of fluid pressure in the compartment. To facilitate such fluid communication, a ring-shaped support may be configured with one or more openings (or holes, vias, ducts, pass-throughs, ports or channels) adapted to provide fluid communication between the regions of the compartment separated by the support. In one embodiment, channels may be disposed radially in the support. Alternatively, the channels may be disposed axially or in any other desirable fashion in the support. In this fashion, such fluid flow may serve to make fluid pressure more uniform throughout the compartment. Additionally, fluid flow in such channels may be employed to reduce changes in fluid pressure in the compartment. In one example configuration, a compartment may be configured with two concentric ring-shaped supports disposed between two similar circular-disk optical surfaces. The first ring-shaped support may be disposed near the edges of the optical surfaces, and the second ring-shaped support may be disposed at a radius smaller than that of the edges. The second support may be configured with radial channels to provide fluid flow through the second support. For example, by configuring the second support with radial holes, fluid may flow between a region of the compartment having a radius smaller than the second support radius and a region of the compartment have a radius larger than the second support radius.

Rounded Surface of the Support

In a preferred embodiment, a support may include one or more surfaces configured to contact an optical surface (support contact surface). A support contact surface may be shaped in a fashion to minimize the surface area of the optical surface in contact with the support. For example, a support contact surface may include rounded surface regions wherein a cross-section of the support may be substantially circular in shape. Such minimization of contact area between the optical surface and the support may allow the support to function more similarly to a fulcrum (or simple support), facilitating smooth bending (or deflection) and/or pivoting of the optical surface about the support. Alternatively, the cross-section of the support may be formed in any other desirable shape (for example, square or triangular in cross-section).

Restoring Forces of the Support

As is well known in the art (for example, by the Poisson effect), when a material is compressed in one direction, it may tend to expand in the other two orthogonal directions perpendicular to the direction of compression. In one embodiment, the support may be disposed in a ring-shape and comprise at least a portion of a sidewall of the compartment. Further, the support may be configured such that when it is driven into axial compression, it may also expand radially toward the inside of the compartment (or toward the optical axis). Such radially-inward expansion of the support may further increase fluid pressure in the compartment, thereby enhancing the deflection of the optical surface and one or more optical property of the device. In general, a compliant support may be configured as any desirable part of the compartment, wherein a deformation of the support, in response to a motive force, may result in a change in fluid pressure internal and/or external to the compartment. Further, due to the specific geometry of the support, such deformation of the support may result in an amplification or de-amplification of such fluid pressure.

Support Mounted Between Two Optical Surfaces

In one embodiment, a support may be disposed between, a first optical surface and a second optical surface. The support may be configured substantially in the shape of a circular ring. Further, at least a portion of the support may be substantially rigid and configured to function as a simple support, or fulcrum. An applied load may be delivered to first and/or second optical surface by means of a concentrated, distributed or other load. The applied load may be configured in such a fashion that one or both of the optical surfaces deflect toward the support. For example, negative fluid pressure in the compartment may cause an optical surface to deflect toward the support. Alternatively, a load applied to an optical surface, at a radius different from the support radius, and in a direction toward the support, may cause the optical surface to deflect toward the support. In this fashion, the support may provide a reaction force, in response to the applied load, to the deflected optical surface. Alternatively, both first and second optical surfaces may deflect toward the support, wherein the support may provide a reaction force opposing the deflection of both optical surfaces.

Projections—Positioning Features in the Second Support

In another embodiment, a support may include radial features for accurately positioning it within the compartment. In one embodiment, such positioning features may include spoke-like projections ("projections", or "spider"), the distal ends of which may be disposed in communication with a boundary of the compartment (for example, another support, optical surface, sidewall or other part of the compartment). Such projections may function to help accurately position the support at a desired location relative to the optical axis. Alternatively, the positioning features may be shaped or configured in any desirable fashion. In one embodiment, the projections may be at least partially compliant and include features similar to slides, flexures and/or hinges. For example, a projection may be configured to allow the support to be displaced along the optical axis while maintaining its radial position in the compartment.

Deflection of an Optical Surface

Aspheric Curvature of the Optical Surface Due to a Distributed Load

In some configurations, for example, wherein an optical surface may be disposed in communication with a support and deflected by a distributed applied load (such as fluid pressure), the optical surface may deflect with an aspheric curvature. Further, such aspheric curvature may deleteriously affect the curvature of the optical surface in the clear aperture. Likewise, aspheric curvature may be exhibited in deflected optical surfaces clamped to a support where the applied load is distributed and/or concentrated (such as ring-on-ring, concentric or pin-on-ring). Further, aspheric curvature may persist in configurations wherein the support imparts no bending moment on the optical surface, and/or wherein the deflection of the optical surface may be dominated by bending, diaphragm, tensile or other stress. Such aspheric curvature in the clear aperture of the optical surface may lead to optical properties of the device, such as unwanted aberrations. Therefore, in some applications, it may be desirable to have the ability to control such aspheric curvature, and, hence, related optical properties.

Lens Vertex and Vertex Curvature

In some embodiments, a deflected optical surface may exhibit a vertex. As understood in the field of optics, a vertex may be the point on the optical surface that intersects the optical axis. Further, the vertex may exhibit a curvature (vertex curvature). For example, by convention, in a convex deflected optical surface, the vertex curvature may be positive. Likewise, a concave deflected optical surface may have a negative vertex curvature. In a preferred embodiment, a vertex may be located in the proximity of the optical axis, or near the center of the clear aperture of the lens. Alternatively, the device may be configured such that a vertex is located at other locations on the optical surface (for example, an adaptive fluidic lens with coma aberration). Alternatively still, an optical surface of a fluidic prism or beam scanner may be substantially planar and not exhibit a vertex at all. Generally, an adaptive fluidic lens may be configured such that the vertex curvature ranges from positive to negative values throughout the range of deflection of the optical surface. The deflection of an optical surface may be characterized by the "height" of the vertex (or the distance from the vertex on a deflected optical surface to the corresponding point on the optical surface in an undeflected state). In some embodiments, actuation of an adaptive fluidic device may result in a deflection of an optical surface of the device, and a corresponding change in height of the vertex of the optical surface.

Support Curvature

In an embodiment, a circular stiff optical surface may be clamped in the proximity of its edge by a fixed, ring-shaped support. The radius of the support (support radius) may be approximately equal to the radius of the outer edge of the optical surface (edge radius). Likewise, a support may clamp the optical surface at a radius other than the edge radius. In such configurations, in addition to vertex curvature described above, the deflected optical surface may exhibit a second, annular-shaped region of curvature (support curvature), which may occur in a region near the support.

Support Curvature and Vertex Curvature May have Opposite Sign

The support curvature may result from the clamping (or restraining) of the deflected optical surface by the support. (Stated differently, the clamped support may impose a bending moment on a deflected optical surface). Further, as a result of the optical surface being restrained at the support radius, and the vertex being unrestrained (for example, at the center of the optical surface), the sign of the support curvature (as measured along a radius of the optical surface) may generally be opposite in sign to that of the vertex curvature. For example, a deflected optical surface under a positive fluid pressure applied load may exhibit a positive vertex curvature and negative support curvature. In general, any desirable configuration of applied load, optical surface and/or clamped support may be selected. Alternatively, optical surfaces or supports having rectangular, elliptical or any desirable shape, homogeneous or inhomogeneous material properties, or having uniform or non-uniform thickness may be employed. Likewise, a device may be configured wherein one or more regions of positive and/or negative curvature may be disposed at generally at any desirable locations on an optical surface (for example, an adaptive fluidic wavefront corrector may include a plurality of concentric ring-shaped supports wherein its optical surface may include a plurality of zones of alternating sign of curvature).

Inflection Point

Cause and Definition of Inflection Point

As a result of the vertex curvature and support curvature having opposite sign, a stiff deflected optical surface may exhibit a region of inflection ("inflection" or "contraflexure") in curvature (as measured along a radius of the optical surface). As understood in the field of differential calculus, an inflection may be defined as a point on a curve at which the curvature changes sign. In this fashion, the radius of the inflection (inflection radius) may typically occur in an annular region of the optical surface greater than the vertex and smaller than the edge radius. (Note, the locus of points constituting an inflection may sometimes be referred to as an "inflection point" in regards to the radial location of the inflection in the curvature of the optical surface).

Inflection Leads to Asphericity and the Need for a Spherical Curvature in the Clear Aperture In some applications, it may be desirable for the clear aperture of the optical surface to maintain a substantially spherical shape throughout at least a portion of its states of deflection. However, the existence of an inflection may result in undesirable aspheric contributions to the shape of the optical surface.

Reduction of Curvature and Aberrations by Pivoting Support

Deleterious optical effects associated with an inflection (for example undesirable aspheric curvature in the clear aperture) may be diminished by configuring the device such that the inflection radius is made substantially larger than the clear aperture radius, or the inflection is eliminated altogether. Such an increase in inflection radius, or elimination of inflection, may be accomplished by reducing the support curvature. In this fashion, an optical surface that is allowed to pivot about the support may exhibit a reduced magnitude of support curvature. Likewise, the reduction of support curvature will cause the infection radius to increase toward the edge of the optical surface. In the case of an optical surface being completely free to pivot without restraint from the support, the inflection radius may be substantially made equal to the edge radius, resulting in the elimination of inflection. In one embodiment, the optical surface may be allowed to pivot by configuring the support with sufficient compliance. Alternatively, a rigid support may be configured to function similarly to a fulcrum or simple support, allowing the optical surface to pivot. In this fashion, the inflection radius may be expanded and the optical surface may exhibit a more spherical profile (in regions, for example, near or inside the clear aperture) throughout at least a portion of its states of deflection. In general, the elastic modulus, shape and/or dimensions of the optical surface and/or support, load and/or other properties of the device, may be selected in any fashion to modify the inflection as desired. Generally, the inflection may be disposed generally at any desirable location(s) on the optical surface, including at radial locations internal or external to the clear aperture radius.

Controlling the Inflection

In certain applications it may be desirable for an inflection radius to be generally fixed throughout all states of deflection of an optical surface. However, in other embodiments such as adaptive fluidic lenses having variable aspheric correction, it may be desirable for the radial location or other properties of the inflection to be adjustable. For either case, the inflection radius may be affected dynamically during operation of the device by several approaches. For example, the support may be configured with adjustable compliance, rigidity, torque or other properties, and those properties may be controlled during actuation of the device. For example, elastic modulus, thickness, radius, width, length and/or other dimensions of the optical surface and/or support, or any other parameters of the device may be chosen. In this fashion, the pivot angle of the optical surface at the edge radius may be controlled, thereby controlling the inflection radius. In one embodiment, for example, a deflected optical surface may exhibit a given vertex curvature. A support, or plurality of supports, may be configured with an actuator for controlling the pivot angle of the optical surface in the proximity of the support. In this fashion, the pivot angle may be increased, thereby resulting in an increase in the inflection radius. Likewise, the pivot angle may be decreased to reduce the inflection radius. Alternatively, the inflection radius may be controlled by the use of multiple applied loads. For example, a concentrated ring-on-ring load may be applied to produce the primary deflection, or curvature, of the optical surface. Additionally, a fluid pressure or distributed load may be applied to control the inflection radius. Such active control of the inflection radius may enable control of the aspheric contribution to the curvature, and the deflection in general, of the optical surface. The ability to control both the spherical and aspheric curvature characteristics of an optical surface may be desirable in certain applications.

Persistence of Inflection

In certain configurations, the optical surface may only have a limited ability to pivot (for example, the support may have an insufficiently low modulus of elasticity). In such cases, the inflection radius may be increased to a value greater than the clear aperture radius, but such increase still may not be sufficient to eliminate the effects of aspheric curvature from entering the clear aperture of the optical surface.

Preferred Embodiment

Ring-on-Ring Load and Stiff Optical Surface

In a preferred embodiment, spherical curvature may be maintained in the clear aperture region of the optical surface throughout its states of deflection by the use of a stiff optical surface and concentrated concentric ring-on-ring (or "double-ring") applied load. In one example of such a configuration, a compartment may be bounded by a first optical surface and a second optical surface. One or more of first and second optical surfaces may be capable of deflection by bending. Further, first and second optical surfaces may be circular-disk shaped and have substantially the same edge radius. A first ring-shaped support (first support) may be configured with a first support radius substantially equal to, or slightly smaller than the edge radius. The first support may be fastened to first and second optical surfaces and may form a seal. First support may be at least partially compliant and configured to allow first and/or second optical surfaces to pivot. The compartment may thus be bounded around its perimeter by first support. Optionally, one or more sidewall members, plate members, sidewall support members or any other additional desired members may optionally be provided to further bound and seal the compartment. A fluid may be disposed in the compartment. A substantially rigid second ring-shaped support (second support) may be disposed concentric to first support. Further, second support may be disposed in communication with first and second optical surfaces in a fashion similar to a simple support. A clear aperture may be provided and have a clear aperture radius approximately equal to or smaller than the second support radius. An optical axis of the device may be provided and disposed substantially normal and concentric to first and second optical surfaces and first and second supports. The compartment and one or more actuator may be disposed in a housing. The actuator may be annular disk-shaped and configured to deliver a concentrated ring load (applied load) to the compartment. The radius of the applied load may be approximately equal to the first support radius. In one configuration, a first actuator may be disposed in communication with first optical surface. Likewise, a second actuator may be disposed in communication with second optical surface. Optional ring-shaped connectors (connectors) may be disposed between optical surfaces and actuators. Further, connectors may be at least partially compliant and provide an interface for delivering the applied load. Alternatively, actuators may be directly bonded, deposited, coated or fastened in any desirable fashion in communication with optical surfaces. The applied load may be directed parallel to the optical axis and configured to provide a compressive force to the first support. Under a first state of actuation, first support may not be compressed and optical surfaces may be substantially planar. Under a second state of actuation, first support may be in a state of axial compression. In this fashion, actuators may communicate the applied load to optical surfaces, resulting in the compression of first support and displacement of the edge of one or more of optical surfaces. Likewise, the rigid simple-support provided by second support may provide a reaction force, resulting in the bending deflection of at least one of optical surfaces. In alternative embodiments, the roles of the supports and forces may be reversed. For example, one or more second supports may communicate the applied load while one or more first supports may provide the reaction force. In general, any desirable configuration of applied and reaction loads and forces may be employed. Although first support may be substantially compliant, such compliance may be imperfect wherein optical surfaces are not perfectly free to pivot. In such case, first support may still impose a bending moment on optical surfaces, wherein such bending moment may result in an inflection. However, due to the ability of optical surfaces to substantially freely pivot about second support radius, second support may not impose a bending moment on optical surfaces. Due to the lack of a bending moment at second support radius, the inflection radius may be restricted to a range of approximately greater than the edge radius and smaller than the second support radius. Further, the lack of a bending moment at second support radius may serve to substantially isolate aspheric curvature to radii approximately greater than second support radius. As a result, deflected optical surfaces may exhibit a vertex in clear aperture while the curvature of deflected optical surfaces in clear aperture may be substantially spherical. In alternative embodiments, optical surfaces, supports, compartment, actuators, housing and any other part of the devices may be configured in any desirable shape. In one embodiment, the device may be preferably configured with substantially mirror symmetry about a mid-plane of the compartment normal to the optical axis. In this fashion, optical surfaces may deflect with mirror symmetry.

In another embodiment one optical surface may be configured to be substantially rigid and undergo substantially no deflection in response to the applied load (for example, rigid optical surface may be similar to a thick optical window or thick plate). In general, either optical surface may similar to one or more of a medium-thickness plate, Kirchhoff plate, thin plate, or diaphragm plate.

Residual Fluid Pressure

In the present embodiment the compartment may be sealed such that fluid cannot substantially enter or escape from it. Additionally, in the present embodiment, one or more of the first optical surface, second optical surface, first support, second support, compartment, or any other member of the device, may be configured to deflect or change in shape under an applied load. In some configurations, such deflections may result in a net imbalance in the change in pressures among regions of the compartment. For example, a region of the compartment at radii generally smaller than the clear aperture radius ("first compartment region", or "inner sub-compartment") may increase in volume as portions of the device (for example, the optical surfaces or support) deflect. Likewise, an annular region of the compartment bound by the edge radius and clear aperture radius ("second compartment region" or "outer sub-compartment") may undergo a decrease in volume as portions of the device deflect. In some cases, the net change in volumes of the compartment regions may not completely balance (i.e., sum to zero). As a result of such a net volume imbalance in the compartment, a residual fluid pressure (or "pressure excursion") may be result and be applied substantially uniformly throughout the compartment. Such residual fluid pressure may result in an applied distributed load causing the first and/or second optical surface to undergo a residual deflection. Such residual deflection, being a result of residual fluid pressure may result in aspheric contributions to the total deflected shape of the first and/or second optical surface, which, in some cases, may be undesirable.

Methods of Controlling Residual Fluid Pressure

As described above, adaptive fluidic devices which achieve modulation of their optical properties (for example, focal power) by bending of the optical surfaces bounding may be subject to spherical and other aberrations which are dependent on residual fluid pressure, internal to the compartment.

To achieve a sufficiently low residual fluid pressure, or control over the residual fluid pressure, several techniques may be employed. For example, the radii of inner and edge supports may be tailored. Further, the compartment may be connected to external, compliant-wall reservoirs. Such compliant reservoirs may have substantially greater compliance that other parts of the compartment, and thus accommodate the volumetric excursions of the compartment without causing substantial pressure changes. The compliant reservoirs may be as simple as flexible caps over holes in the housing. Alternatively, open capillary channels may be connected to the compartment. Further still, compressive gas pockets may be disposed in the compartment. One or more of such techniques may be used in conjunction with each other to further reduce residual fluid pressure.

Control of Residual Fluid Pressure by Configuring the Second Support Radius

In a preferred embodiment, a residual fluid pressure may be reduced or substantially eliminated by properly selecting the second support radius. By configuring the second support (or "inner support") radius (second support radius) to be approximately a factor of $1/\sqrt{2}$ (or 0.707) times the first support (or "edge support") radius (edge support radius) may, over a wide range of loads and configurations, serve to substantially eliminate residual fluid pressure. In other embodiments, control over residual fluid pressure may be desirable. In such cases, the second support radius may be configured to be slightly smaller or larger than the $1/\sqrt{2}$ factor times the first support radius. For example, if the volume imbalance is allowed to range from zero to about half the volume under dome of the deflected clear aperture of the optical surface, the ratio of second support radius divided by the edge support radius may vary from about 0.66 to about 0.76.

Control of Residual Fluid Pressure by a Compliant Bladder

In another embodiment, a residual fluid pressure may be reduced or substantially eliminated in the compartment by providing a bladder member (bladder) in communication with a portion of the compartment. The bladder may preferably have greater compliance than the optical surfaces, first or second support, or any other member of the compartment. In one configuration, the bladder may be configured with substantially greater compliance than any other member of the device. The bladder may comprise a diaphragm, flexible or stretchable film, for example, elastomeric film, PDMS, polyester, or any other flexible or compliant material. The bladder may be disposed in communication with a portion of the compartment such that a first surface of the bladder (first bladder surface) may be in communication with the fluid internal to the compartment. Likewise, a second surface of the bladder (second bladder surface) may be in communication with the environment or media disposed external to the compartment. In this fashion, in response to a positive residual fluid pressure, the bladder may deflect outward from the compartment. Similarly, in response to a negative residual fluid pressure, the bladder may deflect inward to the compartment. Further, in configurations where a diaphragm-like bladder is fastened to an outer wall of a compartment, a negative residual fluid pressure may draw the bladder inward in a concave fashion, thereby helping to prevent delamination of the bladder from the surface to which it is mounted.

Since the bladder may have greater compliance than the optical surfaces, the residual pressure may result in substantially only causing a deflection in the bladder and not the optical surfaces. Similarly, since the bladder may have greater compliance than the first and second supports, the residual pressure may result in substantially only causing a deflection in the bladder and not first and/or second support.

Control of Residual Fluid Pressure by a Compliant Reservoir

In another embodiment, a residual fluid pressure may be reduced or substantially eliminated in the compartment by providing a reservoir member (reservoir) in communication with a portion of the compartment. In one embodiment the reservoir may be compliant and function similarly to a bladder as described in the previous embodiment. The reservoir may include a compliant bellows member and be configured for fluid flow between the compartment and bellows member. In one configuration, the reservoir may be substantially ring-shaped and include a compliant bellows in communication with its sidewall. A first surface of the reservoir may be disposed in communication with the first optical surface, and a second surface of the reservoir may be disposed in communication with the second optical surface. In one configuration the first and second surfaces of the reservoir may be fastened to, and form a seal with, the first and second optical surfaces. The radius of the reservoir (reservoir radius) may be greater than the clear aperture radius and/or second support radius. By way of example, in the presence of positive residual fluid pressure in the compartment, fluid may flow from the compartment into the reservoir (or bladder member of the reservoir), resulting in a portion of the reservoir expanding. Likewise, in presence of negative residual fluid pressure in the compartment, fluid may flow from the bladder member of the reservoir into compartment, resulting in the bladder member of the reservoir contracting. In alternate configurations, one or more of the reservoir, bladder or bladder member of the reservoir may be configured as a member of, integrated with, or in communication with the first support, second support, or any other desirable member of the compartment and/or device.

Control of Residual Fluid Pressure by a Compliant Bladder with Annular Elements

In another embodiment, one or more of first support and/or second support may include one or more channel members (or "channels"). The channels may serve to provide a reservoir or route for fluid to move into or out of the compartment in accordance with changes in residual fluid pressure. The channels may include channel wall regions and may include any desirable surface treatment. Further, the channels may include bellows structures such as annular-shaped members connected by elastomeric ring-shaped seals. The annular-shaped members may have a substantially bending-modulus and may include materials such as thin glass (for example, glass having 10-500 micron thickness), plastic or any generally stiff material. While the annular-shaped members may include stiff material, they may preferably have greater compliance than the optical surfaces, supports, and/or any other part of the device that undergoes deflection. The seals may contribute to the compliance, however, a significant portion of the compliance may be provided by the annular-shaped elements. Although other materials may be desirable for constructing the bellows, the use of glass is beneficial for reducing plastic deformation effects associated with metals, polymers and other materials.

Control of Residual Fluid Pressure by a Reservoir Having Compliantly Sealed Channels In one embodiment, the compartment may include a reservoir member having channels (reservoir channels) configured for fluid flow. The reservoir may be ring shaped and may be in communication with a portion of the first support, second support or any other member of the compartment. In response to a residual fluid pressure, fluid may flow between the compartment and one or more of the reservoir channels, thereby reducing or eliminating the residual fluid pressure. The external ends of the reservoir channels may be sealed with compliant (such as elastomeric) seals in order to prevent the fluid from escaping the channels. In this fashion, the compliant seals may additionally deflect, similar to the bellows described above, in order to assist in the elimination or reduction of residual fluid pressure.

Control of Residual Fluid Pressure by a Reservoir Having Open Capillary Channels In another embodiment, the reservoir channels may be sufficiently small in diameter such that capillary forces may be employed to prevent the fluid from escaping from the compartment. In this fashion, fluid disposed inside a capillary channel may form a meniscus. Capillary forces may then dominate gravity or other forces and prevent the fluid from exiting the reservoir channels and escaping the reservoir and/or compartment. As a result of the capillary forces retaining the fluid in the channels, the ends of the channels may be left unsealed or "open". Additionally, a small amount of oil may be disposed in the proximity of the ends of the reservoir channels. For example, oil that is immiscible with the fluid may follow the motion of fluid as it is driven by the residual fluid pressure in the compartment. Further, the oil may be inert and have low vapor pressure in order to suppress the evaporation of it and the fluid, thereby prolonging the operating life of the device or its mean time between refills.

Control of Residual Fluid Pressure by a Reservoir Having Open Electrowetting Channels In an alternate embodiment, the reduction or elimination of the residual fluid pressure may be controlled by actively modulating the capillary forces of the fluid in the reservoir channels. Such active modulation of the capillary forces may be achieved by employing electrowetting. The fluid may be provided with a small degree of electrical conductivity, for instance by adding an ionic salt. An electrode may be disposed to connect the liquid to a controlled electrical potential. A thin hydrophobic insulator may be provided to separate the fluid from a counter electrode disposed in the reservoir, thereby forming a capacitor. As the capacitor is charged, the wetting (or contact angle) may change in order to minimize the overall system energy, which may include electrostatic and capillary contributions. The change of contact angle may be accompanied by movement of the meniscus of the fluid, whereby the movement of the meniscus may result in the advancing or receding of the fluid in the capillary reservoir channels. In this fashion, the controlled movement of the fluid in the reservoir channels serves to modify the residual fluid pressure or other pressure conditions in the compartment. The ability to control position of the meniscus, and hence the fluid pressure, may provide a beneficial added degree of control (i.e., in addition to a concentrated or other load) over the optical properties of the adaptive fluidic device. As described above, oil may be disposed in the capillary channels in order to prevent evaporation of the fluid. Alternatively, the roles of the oil and conductive fluid may be reversed, if the optical properties of the oil are preferable over the fluid. In such case, the polarity of the control voltage may be reversed and provisions may be made for a capillary channel with characteristics that may include the following: an electrode may be brought into direct contact with the conductive fluid either in the capillary channel or in an auxiliary external reservoir; and/or a second electrode may be localized under a hydrophobic insulator only in the region of the capillary channel where the interface between the oil and the conductive fluid is likely to be positioned.

Gas Bubble Reservoir for the Control of Residual Fluid Pressure

In an alternative embodiment, residual fluid pressure may be reduced by disposing (or trapping) a sufficiently large air bubble (or gas pocket, or region of other compressive medium) in a portion of the compartment. The gas pocket may function similarly to a compliant reservoir and accommodate volume excursions with minimal pressure changes. The size of the required gas pocket may be estimated from the ideal gas law, which provides that the product of pressure and volume of the gas pocket must remain constant. Therefore, the fractional change in volume of the gas volume must be equal and opposite in sign to the fractional change in pressure on gas pocket. For example, if, at atmospheric pressure, the gas pocket occupies a volume 100 times larger than the net volume excursion, then the pressure excursion in the gas pocket will be only $1/100$, or 1%, of the atmospheric pressure. To create and stabilize a gas pocket in compartment, the gas pocket may be disposed in an outer sub-compartment or other region of the compartment. Portions of the inner support and/or the walls of the compartment may be surface engineered. In surface engineering, materials are treated in such a way as to modify their wettability by the fluids of interest. For example, the selective and judicious deposition of hydrophobic and/or hydrophilic coatings and capillarity effects may help attract and localize a bubble or gas pocket in a desirable part of the compartment or device. For example, hydrophilic coating of an inner sub-compartment (such as regions inside the clear aperture) and hydrophobic coating of an outer sub-compartment (such as regions outside the clear aperture), may assist in preferentially locating and retaining such bubbles in the outer sub-compartment. In this fashion, bubbles may be kept out of the clear aperture and thus may be prevented from having deleterious effects on optical properties of the device.

Independent Control of Pressure and Bending

In still other embodiments, it may be advantageous for spherical and aspheric deflection of a stiff optical surface to be controlled independently of each other. In one embodiment, a first actuator (for example, a ring bender) and concentric supports may provide a ring-on-ring concentric load to a stiff optical surface. Such concentric loading may result in the clear aperture of optical surface deflecting with spherical curvature. Likewise, a pressure-control actuator (for example, a pump) may be configured to communicate a fluid pressure to the compartment, resulting in an aspheric deflection of the optical surface, and, particularly, the clear aperture of the optical surface. Independent control over multiple forms of applied loads (e.g., the concentrated and distributed) may enable control over multiple aspects of the optical surface profile and optical properties of the device. For example, in the case of an adaptive fluidic lens, the radius of curvature of a stiff optical surface may be controlled by bending under a ring-on-ring load, generally corresponding to control of the Zernike Z4 defocus term. Further, asphericity (for example, the conic constant) of the optical surface may be controlled by fluid pressure, generally corresponding to control of primary spherical (Z8), secondary spherical (Z15), or higher order spherical Zernike terms.

Fluidic Adaptive Wavefront Corrector

Wavefront Corrector—Introduction

In previous embodiments, adaptive fluidic devices are described wherein both the curvature and height of the vertex of a deflected optical surface may be controlled by an applied load. As described above, such control of the optical surface may enable control of optical properties of the device such as defocus and spherical aberration Zernike terms. Alternatively, it may be desirable for an adaptive optical device to be optimized for control of only spherical aberration terms, while generally leaving focus unchanged. Such control may be enabled by constraining the vertex while permitting other portions of the optical surface to undergo deflection, and may be useful in adaptive wavefront correction applications. For example, as atmospheric turbulence may cause fluctuations in the Strehl ratio of a telescope, an adaptive fluidic Schmidt corrector plate may be useful for dynamically correcting spherical aberrations without substantially changing the telescope's focus.

Adaptive Fluidic Wavefront Corrector Actuated by Fluid Pressure

In one such embodiment, an adaptive fluidic corrector plate may include a lens compartment bounded by two circular disk-shaped optical surfaces (first and second optical surfaces), and a ring-shaped edge support (edge support) disposed between the optical surfaces near their edges. The edge support may have an edge support radius similar to the radius of the edge of first and/or second optical surfaces. A fluid may be disposed in the compartment. A pump actuator may be disposed in communication with, and provide a controllable fluid pressure to, the compartment. In this fashion, pump provides an applied distributed load to the compartment. First optical surface and/or second optical surface may be configured for deflection in response to an applied load. A first axial support may be disposed external to the compartment and in communication with first optical surface in the proximity of the optical axis. For example, the first axial support may include a rigid convex surface (such as a rigid glass lens), wherein the convex vertex of the first axial support may be disposed in communication with the vertex of first optical surface. In this fashion, first axial support may be similar to a simple pin support. Further, first axial support may be configured to be substantially optically transparent at a desired range of wavelengths. An index-matching second fluid may optionally be disposed externally to compartment and in communication with an external side of first optical surface and a side of first axial support. In this fashion, the pump may provide an applied load in the form of a change in fluid pressure to the compartment. In response to the applied load, first optical surface may deflect. In response to the applied load and deflection of first optical surface, first axial support may provide a reaction force to the vertex of first optical surface. In this fashion, first optical surface may be constrained from deflection at regions near its edge by edge support, as well as near the optical axis by first axial support. Since the vertex of first optical surface may be constrained (i.e., the height of the vertex may not change) by axial support, while other radial regions may be allowed to deflect, first optical surface may exhibit deflected shape profiles similar to Zernike polynomial terms for spherical aberration. Optionally, both second optical surface and first optical surface may be configured for deflection. In such case, a second axial support, and second fluid, may optionally be disposed in communication with second optical surface in a fashion similar to first axial support. As may be desirable for operation in transmission mode (i.e., wherein light may be transmitted through at least a portion of the clear aperture of the device), any of the components of the device may be configured to exhibit high optical transmission at a desired range of wavelengths. Further, additional supports and index-matching fluids may be provided to control vertex deflection and reduce unwanted reflections and/or interference effects that could hinder its performance. Yet further, in alternative embodiments, one or more of first and/or second optical surfaces, first and/or second axial supports, fluids, index-matching fluids, and/or any other part of the device may be configured to be at least partially reflecting at a desired range of wavelengths. In this fashion, the device may function in reflection mode, rather than in a transmissive mode of operation.

Adaptive Fluidic Wavefront Corrector Actuated by Pin-on-Ring Load

In another alternative embodiment, the first and/or second axial support may be configured to be displaced with respect to the position of edge support. Pump actuator may be replaced with a force actuator configured to provide an axially-directed (i.e., along the optical axis) load to first and/or second supports, resulting in a displacement of first and/or second axial support with respect to edge support. Alternatively, actuator may be configured to displace edge support relative to first and/or second axial support. In this fashion, the actuator, edge support, first and/or second axial supports may be configured to apply a concentrated pin-on-ring load to first and/or second optical surfaces. In the present embodiment, the vertex may be simultaneously subjected to an applied concentrated load, and constrained from other change in height, by first and/or second axial support. The compartment may include optional reservoir and/or bellows for the control of residual fluid pressure.

Adaptive Fluidic Wavefront Corrector Actuated by Ring-on-Ring Load

In an alternative embodiment, a ring-shaped second support may be disposed with a radius smaller than the edge support radius. An actuator may be configured with first and/or second supports to apply a concentrated ring-on-ring load to first and/or second optical surfaces. The applied load may result in the bending deflection of one or more of first and/or second optical surfaces.

Fluidic Adaptive Wavefront Corrector—Internal Axial Support

In above embodiments, the applied load may be configured so that first optical surface deflects in a convex fashion, wherein the vertex may deflect along the optical axis, outward, or away from, the center of the compartment. Alternatively, the applied load may be configured so that first optical surface deflects in a concave fashion, wherein the vertex may deflect along the optical axis, inward, or toward the center of the compartment. For example, the applied load may include a negative fluid pressure. Alternatively, ring-shaped supports may be configured to bend first optical surface in a concave fashion. In such concave cases, the first axial support may be disposed internal to compartment, providing a pin-support reaction force and constraining deflection of the vertex of the first optical surface in a fashion similar to the externally-disposed configuration described above.

Operation of a Fluidic Wavefront Corrector

The above described embodiments may operate as follows. Light may be transmitted through first axial support, second index-matching fluid, enter compartment through first optical surface, exit compartment through second optical surface, and be transmitted through additional index-matching fluid and second axial support. In response to the applied load, first optical surface may deflect. Further, as deflection increases, the stress between the between the first axial support in first optical surface, may also increase. As the fluidic optical device is actuated, the first axial support restrains the position of the vertex of the first optical surface from moving outward along the optical axis or, prevents the vertex of first optical surface from bulging outward). As a result of the restraint (or support) at the vertex, the peripheral regions of the first optical surface (i.e., regions disposed between the center and the edge) may bulge instead. Such control of first optical surface may result in deflections similar to Zernike spherical aberration polynomials, and hence control of spherical aberration properties of the device. Further, by controlling the height of the vertex of the first optical surface (which may be achieved, for example, by use of an actuator to control the axial position of first axial support), the first optical surface may exhibit deflection similar to the defocus Zernike polynomial, thereby allowing control over the focus of the device.

Detailed Figure Descriptions

FIG. 1 is a three-dimensional cross-sectional view of a portion of a compartment 1000 of an adaptive fluidic optical device 2000, showing deflected optical surface 2002 and edge support 2004 in the presence of an applied load. Edge support 2004 may be at least partially rigid and similar to a fixed support. Optical surface 2002 may generally be similar to a thin (or Kirchhoff) plate and disposed in communication with edge support 2004. In response to applied load, optical surface 2002 may exhibit an inflection (indicated by 2006) at a radial region and a vertex (indicated by 2010). However, when under no applied load, optical surface 2002 may exhibit substantially planar geometry, resulting in the reduction or elimination of inflection 2006 and vertex 2010. In another embodiment, inflection 2006 may be at least partially a result of the undeflected shape of optical surface 2002. For example, optical surface 2002 may be formed by molding or grinding and polishing and exhibit an inflection in some or all states of applied load. Alternatively, optical surface 2002 may be configured to exhibit an inflection point under no applied load, but under applied load inflection may disappear. Compartment 1000 may be filled with a fluid (not shown).

Figure 2:
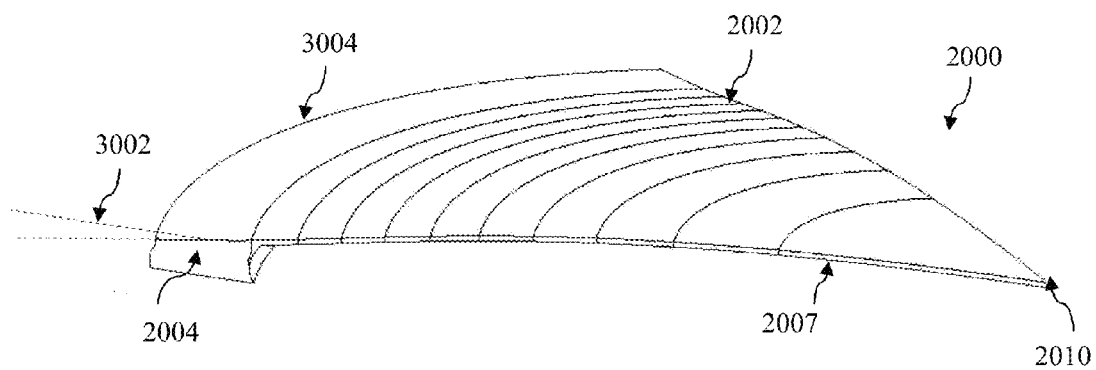
FIG. 2 shows a wedge-shaped section view of a fluidic lens membrane having a high elastic modulus and being fixed in a flexible mounting configuration.

FIG. 2 is a three-dimensional cross-sectional view of a portion of a compartment of an adaptive fluidic optical device 2000, showing the deflection of optical surface 2002 in communication with an edge support 2004. Edge support 2004 may be compliant and similar to a hinge support. Edge support 2004 may be configured with compliance such that deflection of optical surface 2002 results in a pivoting (or angular displacement) 3002 of outer edge 3004 of optical surface 2002. Pivoting 3002 of outer edge 3004 may lead to a reduced bending moment in optical surface 2002 (compared to the embodiment depicted in FIG. 1), and resulting elimination of an inflection. When edge support 2004 is sufficiently compliant, optical surface 2002 may pivot freely in response to an applied load, and exhibit substantially spherical curvature in a clear aperture region 2007.

Figure 3:
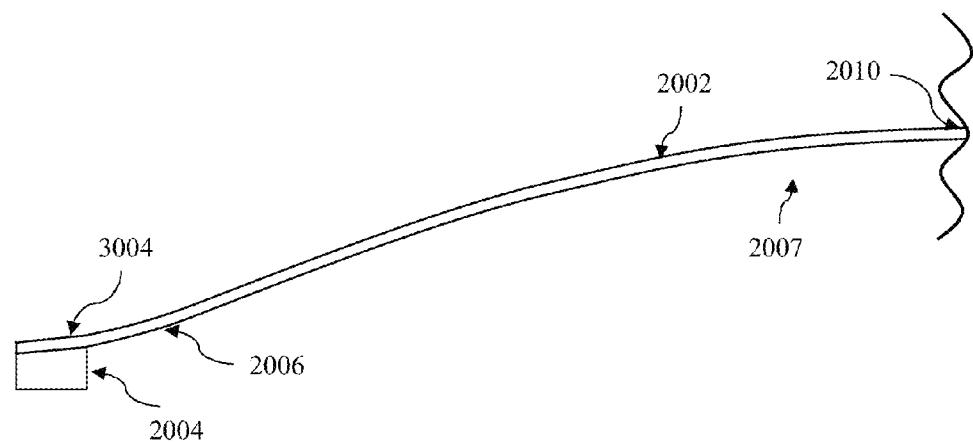
FIG. 3 shows a deflected optical surface with a resulting inflection point close to a support.

FIG. 3 is alternative embodiment of the configuration depicted in FIG. 2, showing a cross-sectional schematic representation of a deflected optical surface 2002 with an outer edge 3004 supported by a partially compliant edge support 2004. Due to lack of perfect compliance in edge support 2004, edge 3004 is limited in its ability to pivot in response to an applied load. As a result of such limited pivoting, inflection 2006 is still present but it is shifted to a greater radial distance from vertex 2010, as compared to the rigid-support configuration depicted in FIG. 1. Such shifting of inflection 2006 to greater radial locations may improve aspheric curvature in a clear aperture region 2007 of deflected optical surface 2002.

Figure 4:
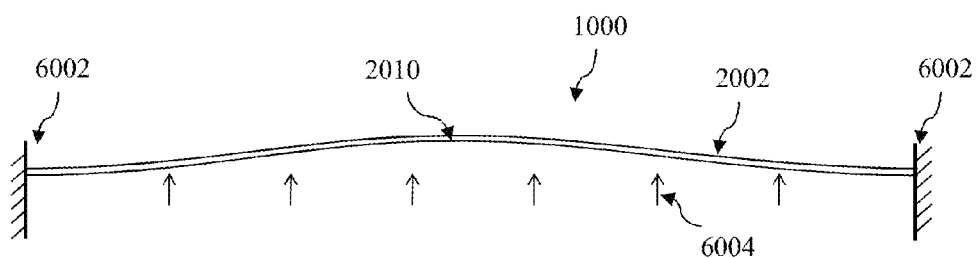
FIG. 4 shows an optical surface having a fixed edge support and deflected by fluid pressure.

FIG. 4 is a cross-sectional schematic representation of the embodiment depicted in FIG. 1 wherein optical surface 2002 is clamped by fixed edge support 6002. Applied load may be disposed in the form of a distributed load (or fluid pressure, indicated by arrows 6004). Distributed load 6004 is shown applied internally to compartment 1000 and uniformly across optical surface 2002. However, distributed load 6004 may alternatively be applied to any portion of compartment and/or optical surface 2002, as well as non-uniformly over any portion of compartment and/or optical surface 2002. Further, distributed load 6004 is shown as a positive pressure, causing vertex 2010 to deflect outward from center of compartment 1000. Alternatively, distributed load 6004 may be applied externally to compartment 1000, and may result in vertex 2010 deflecting inward toward center of compartment 1000. Generally, distributed load 6004 may be positive and/or negative and may be disposed internally and/or externally to compartment 1000, resulting in a pressure differential between the top and bottom sides of optical surface 2002 (or between internal and external regions of compartment 1000).

Figure 5:
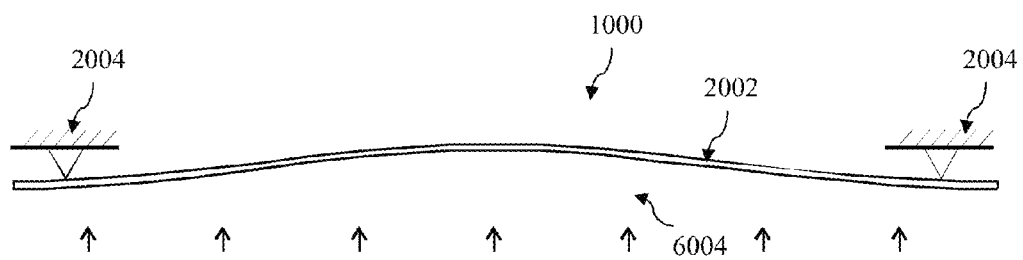
FIG. 5 shows an optical surface with a simple edge support and deflected by fluid pressure.

FIG. 5 is a schematic cross-sectional representation similar to the structure depicted in FIG. 4. However, in FIG. 5, optical surface 2002 is now supported by simple edge support 2004 instead of fixed edge support 6002 (see FIG. 4). Edge support 2004 may be compliant and disposed internally and/or externally to compartment 1000.

Figure 6:
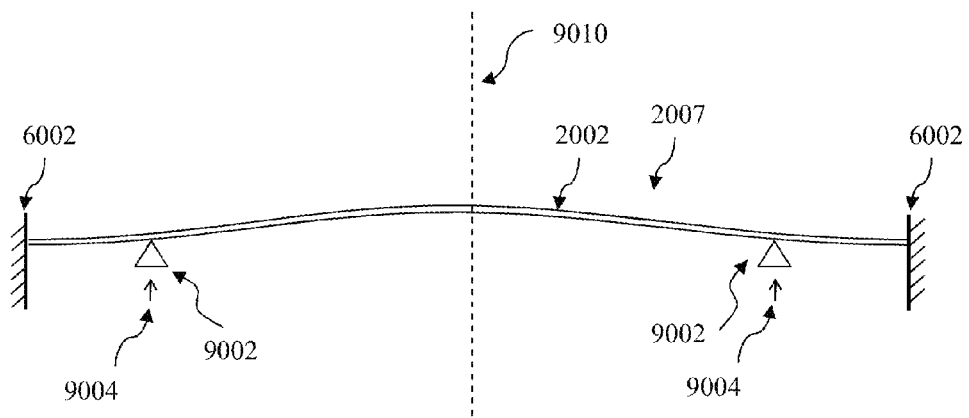
FIG. 6 shows an optical surface with a fixed edge support and simple inner support and deflected by a concentrated ring-on-ring load.

FIG. 6 is a cross-sectional schematic representation of a deflected optical surface 2002 in a configuration that includes fixed edge support 6002 and inner ring support 9002. Fixed edge support 6002 may be mounted to a portion of a compartment 1000 and/or housing (not shown). Inner ring support 9002 may be similar to a simple support or fulcrum. Further, inner ring support 9002 may be disposed in communication with optical surface 2002 at a radius smaller than the radius of fixed edge support 6002. An actuator (not shown) may provide the applied load, which may be in the form of a "ring-on-ring load", indicated by arrows 9004). In communicating applied load 9004 to optical surface 2002, inner ring support 9002 may be displaced relative to the position of fixed edge support 6002 in a direction substantially parallel to optical axis 9010. Alternatively, the functions of supports 6002, 9002 may be reversed, wherein fixed edge support 6002 may be displaced relative to position of simple inner ring support 9002. For example, fixed edge support 6002 may be configured for displacement, while simple inner ring support 9002 may be mounted to a portion of a compartment and/or housing (not shown). Generally, either or both supports 6002, 9002 may be displaced relative to the position of the other in order to deliver an applied load to optical surface 2002.

Figure 7:
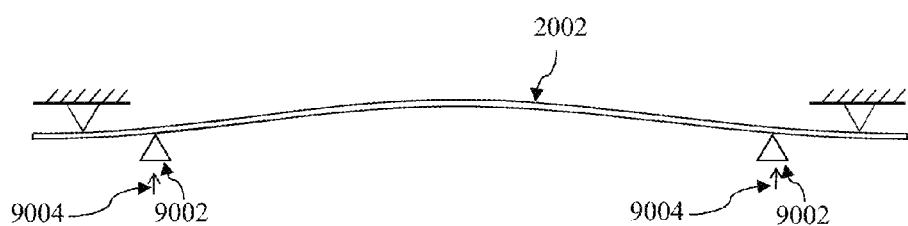
FIG. 7 shows an optical surface with a simple edge support and a simple inner support and deflected by a concentrated ring-on-ring load.

FIG. 7 is a schematic cross-sectional representation similar to the structure depicted in FIG. 6 However, in FIG. 7, fixed edge support 6002 (see FIG. 6) is replaced with a simple edge support 2004.

Figure 8:
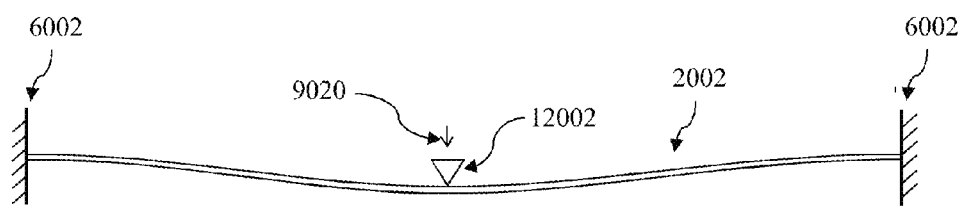
FIG. 8 shows an optical surface with a fixed edge support, a simple point support, and deflected by a pin-on-ring load.

FIG. 8 is a schematic cross-sectional representation similar to the structure depicted in FIG. 6. However, in FIG. 8, control of the displacement of vertex 2010 is enabled by replacing simple inner support 9002 (see FIG. 6) with an axial support 12002. Axial support 12002 may be similar to a simple or pin support and may have substantially high optical transmission at a desired range of wavelengths. Actuator (not shown) may provide the applied load, which may be in the form of a "pin-on-ring load", indicated by arrows 9020). In communicating applied load 9020 to optical surface 2002, axial support 12002 may be displaced relative to the position of fixed edge support 6002 in a fashion similar to that depicted in FIG. 6. Alternatively, the functions of supports 6002, 12002 may be reversed, wherein fixed edge support 6002 may be displaced relative to position of axial support 12002.

Figure 9:
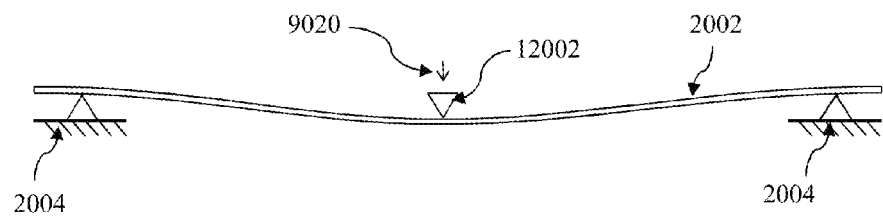
FIG. 9 shows an optical surface with a simple edge support, a simple point support, and deflected by a pin-on-ring load.

FIG. 9 is a schematic cross-sectional representation similar to the structure depicted in FIG. 8. However, in FIG. 9, fixed edge support 6002 has been replaced with a simple edge support 2004.

Figure 10:
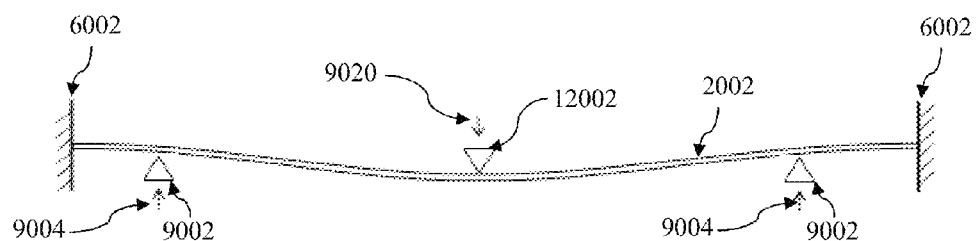
FIG. 10 shows an optical surface with a fixed outer edge support, a simple inner ring-shaped support, and a simple point support.

FIG. 10 is a schematic cross-sectional representation similar to the structure depicted in FIG. 8. However, in FIG. 10, simple inner ring support 12002 has been added. Ring-on-ring load 9004 may be actuated independently from pin-on-ring load 9020. As a result of independent applied loads 9004, 9020, the asphericity as well as radius-of-curvature of optical surface 2002 may be controlled.

Figure 11:
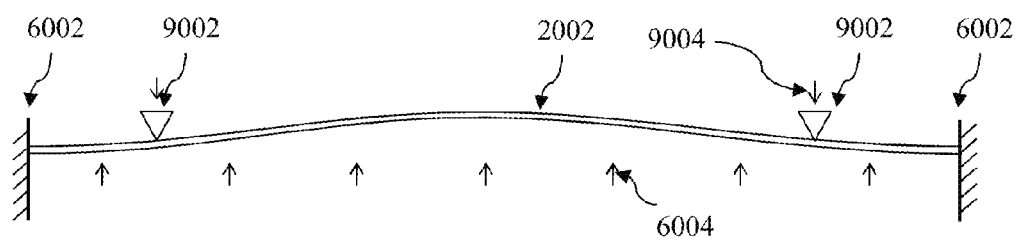
FIG. 11 shows an optical surface with a fixed edge support, a simple inner support, and deflected by a concentric load and fluid pressure.

FIG. 11 is a schematic cross-sectional representation similar to the structure depicted in FIG. 6. However, in FIG. 11, distributed load 6004 has been added as an applied load, independent from ring-on-ring load 9004. In FIG. 11, optical surface 2002 is shown deflecting in a convex fashion toward inner ring support 9002, however, applied loads 9004, 6004 may be configured in any fashion such that optical surface 2002 may deflect in generally either a convex or concave direction. In general, any applied load may be configured in any desired fashion in order to cause optical surface 2002 to deflect in any desired fashion. For example, distributed load 6004 is shown in FIG. 11 configured to oppose load 9004 applied to simple inner support 9002. Alternatively, displacement load 9004 and distributed load 6004 may be applied in the same direction. Distributed load 6004 may be provided by a positive or negative fluid pressure applied to the top, bottom, or both sides of optical surface 2002. As a result of independent applied loads 6004, 9004, the asphericity as well as radius-of-curvature of optical surface 2002 may be controlled.

Figure 12:
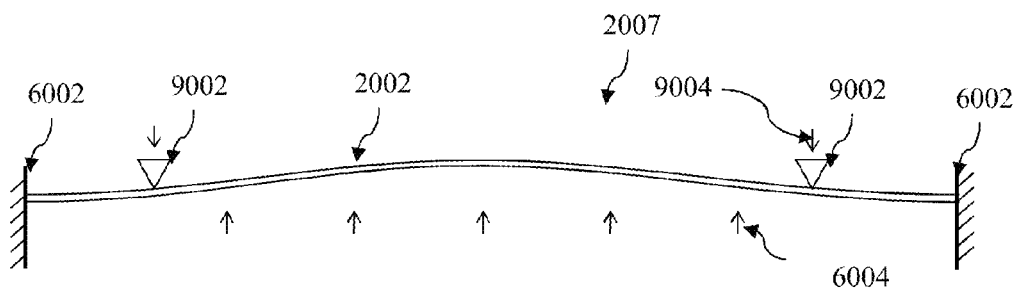
FIG. 12 shows an alternate configuration of an optical surface with a fixed edge support, a simple inner support, and deflected by a concentric load and fluid pressure.

FIG. 12 is a schematic cross-sectional representation similar to the structure depicted in FIG. 11. However, in FIG. 12, distributed load 6004 is applied non-uniformly to optical surface 2002 with greatest pressure disposed in the clear aperture region 2007.

Figure 13:
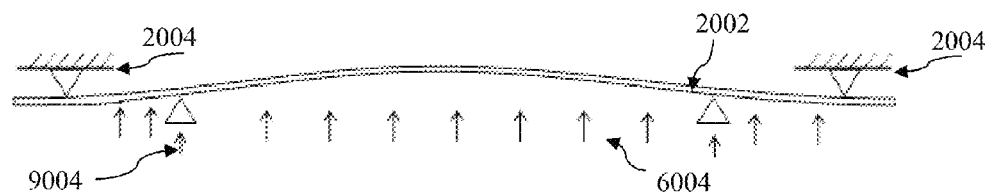
FIG. 13 shows and optical surface with a simple edge support, a simple inner support, and deflected by a concentric load and fluid pressure.

FIG. 13 is a schematic cross-sectional representation similar to the structure depicted in FIG. 11. However, in FIG. 13, simple edge support 2004 now replaces fixed edge support 6002 (see FIG. 11).

Figure 14:
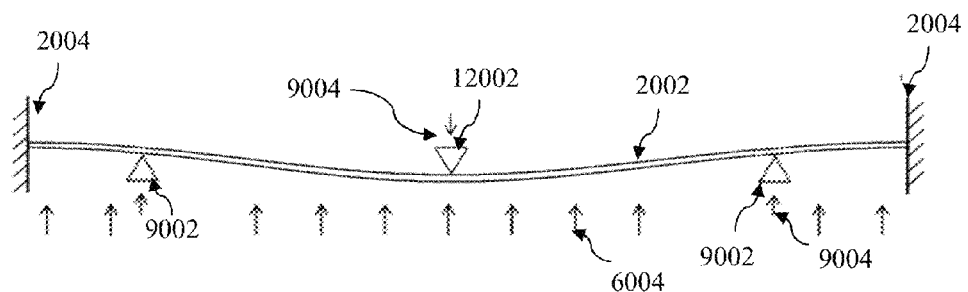
FIG. 14 shows an optical surface with a fixed edge support, a simple inner support, a simple pin support, and deflected by a concentric load, a pin-on-ring load and fluid pressure.

FIG. 14 is a schematic cross-sectional representation similar to the structure depicted in FIG. 10. However, in FIG. 14, distributed load 6004 is added to pin-on-ring load 9020 and ring-on-ring load 9004.

Figure 15:
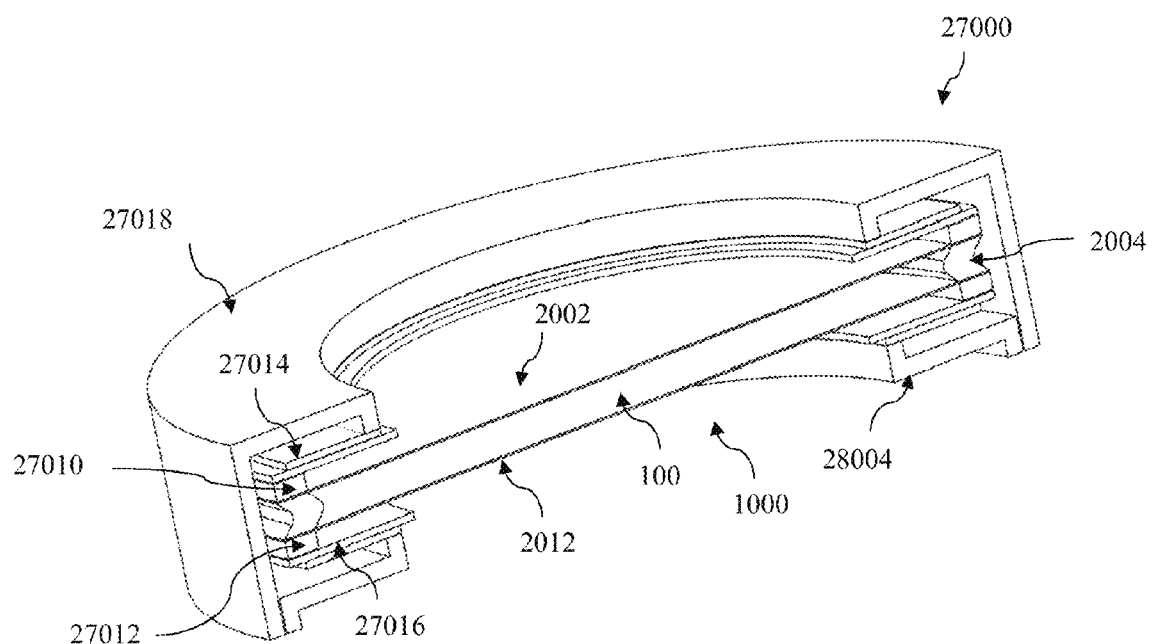
FIG. 15 is a three-dimensional cross-sectional view of a fluidic optical device with compliant edge supports, two deflectable optical surfaces and dual actuators.

FIG. 15 is a three-dimensional cross-sectional view of fluidic lens element 27000 that includes fluid-filled compartment 1000 bounded by first optical surface 2002 and second optical surface 2012. Compartment 1000 may additionally be bounded by a first compliant edge support (first edge support, or edge support) 2004. Further, first edge support 2004 may form a seal with optical surfaces 2002, 2012, and compartment 1000 may be filled with fluid 100. A portion of the top surface of first optical surface 2002 may be disposed in communication with a second edge support (second edge support or external edge support) 27010. Similarly, a portion of the bottom surface of second optical surface 2012 may be disposed in communication with a third edge support (third edge support or external support) 27012. Supports 2004, 27010, 27012 may be configured with support radii approximately equal to the edge radii of optical surfaces 2002, 2012. External support 27010 may be disposed in communication with first actuator 27014. Likewise, external support 27012 may be disposed in communication with second actuator 27016. Actuator assemblies 27014, 27016 may be in disposed in communication with housing 27018 and may provide an applied axial load that may drive supports 2004, 27010, 27012 in a state of compression. A portion of housing, adjustable housing member 28004, may be adjustable (for example, along the optical axis) in order to dispose a desired amount of preload to one or more of actuators 27014, 27016, supports 2004, 27010, 27012, optical surfaces 2002, 2012 or any other part of the compartment 1000 or device 27000. The position of adjustable housing member 28004 may be set by any desirable technique, for example, by threading mating sidewalls of adjustable housing member 28004 and housing 27018. As first edge support 2004 compresses and relaxes in response to changes in the applied load, fluid pressure within compartment 1000 may likewise increase and decrease, thereby resulting in deflection of optical surfaces 2002, 2012.

Figure 16:
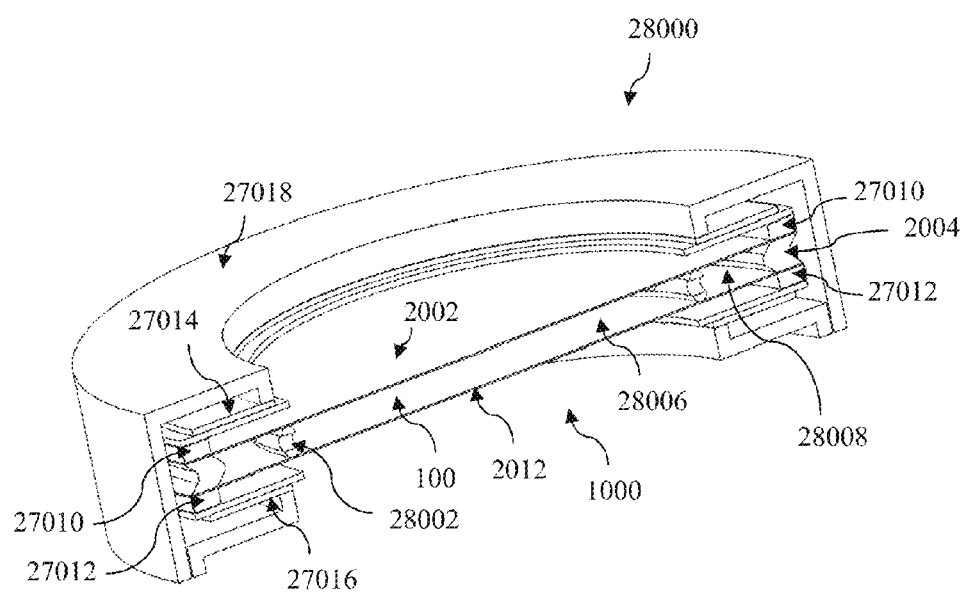
FIG. 16 is a three-dimensional cross-sectional view of a fluidic optical device with compliant edge supports, two deflectable optical surfaces, dual actuators and simple inner support for providing a ring-on-ring load.

FIG. 16 is a three-dimensional cross-sectional view of fluidic lens element 28000 similar to the structure depicted in FIG. 15. However, in FIG. 16 simple inner support 28002 is added to the assembly. Simple inner support 28002 may be disposed internal to compartment 1000 and in communication optical surfaces 2002, 2012. Simple inner support 28002 may form a seal with optical surfaces 2002, 2012 and separate compartment 1000 into two distinct sub-compartment regions; an inner sub-compartment 28006 and an outer sub-compartment 28008. Simple inner support 28002 may be configured to prevent fluid communication between sub-compartments 28006, 28008. Actuators 27014, 27016 may deliver an axial compressive load to edge supports 2004, 27010, 27012, and applied load to edge of optical surfaces 2002, 2012. Such loading may result in the axial compression of first edge support 2004 relative to simple inner support 28002, further resulting in a concentrated concentric ring-on-ring loading and deflection of optical surfaces 2002, 2012. Due to the lack of fluid communication between sub-compartments 28006, 28008, deflection of optical surface 2002, 2012 may result in a residual fluid pressure. Such residual fluid pressure may serve to provide additional asphericity into the curvature of deflected optical surfaces 2002, 2012.

Figure 17:
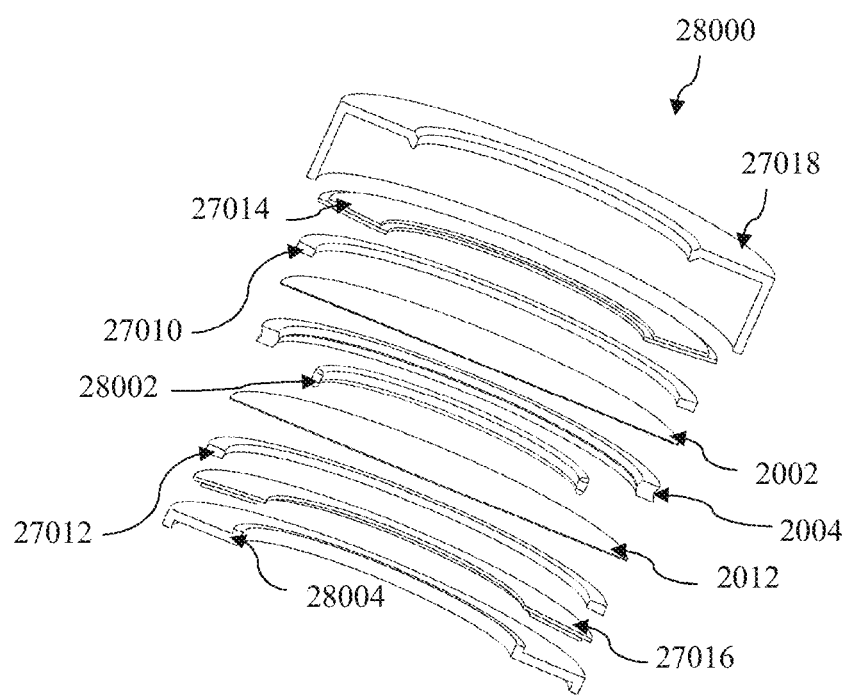
FIG. 17 is an exploded view of a fluidic optical device similar to that depicted in FIG. 16.

FIG. 17 is a three-dimensional exploded cross-sectional view of fluidic lens element 28000 depicted in FIG. 16.

Figure 18:
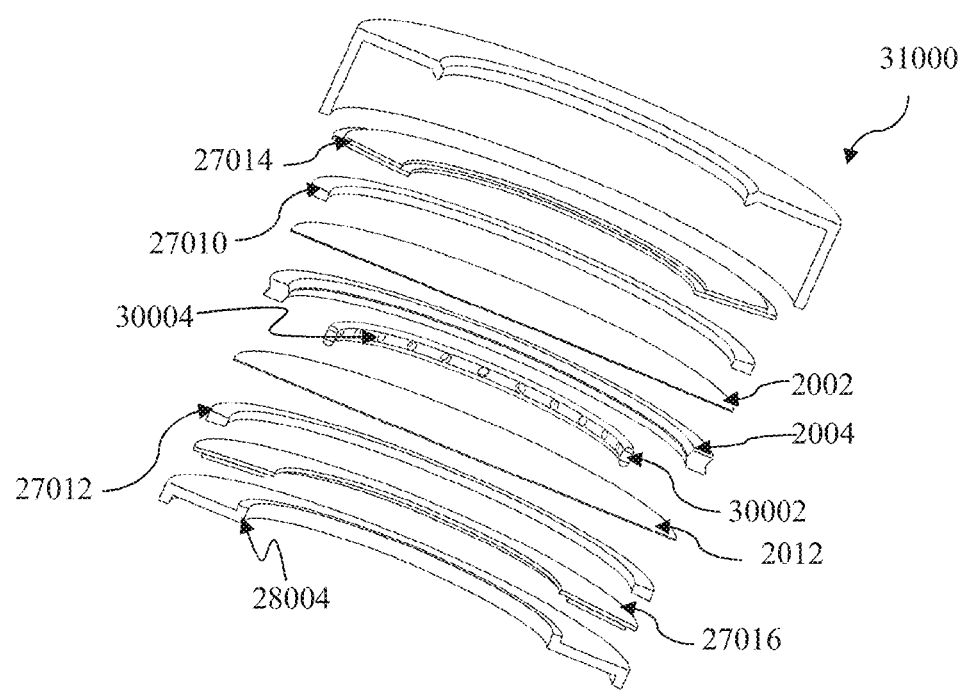
FIG. 18 is an exploded view of a fluidic optical device that includes compliant edge supports, two deflectable optical surfaces, dual actuators and perforated simple inner support.

FIG. 18 is a three-dimensional exploded cross-sectional view of fluidic lens element 31000 similar to the structure depicted in FIG. 16. However in FIG. 18, perforated simple inner support (perforated support) 30002 replaces simple inner support 28002 (see FIG. 16). Fluid pass-throughs 30004 are disposed in sidewall of perforated support 30002 and permit fluid communication between sub-compartments 28006, 28008 (see FIG. 16). Such fluid communication enables the control of fluid pressure between sub-compartments 28006, 28008. In this fashion, compartment 1000 may be configured such that residual fluid pressure may be substantially negative, positive or zero pressure.

Figure 19:
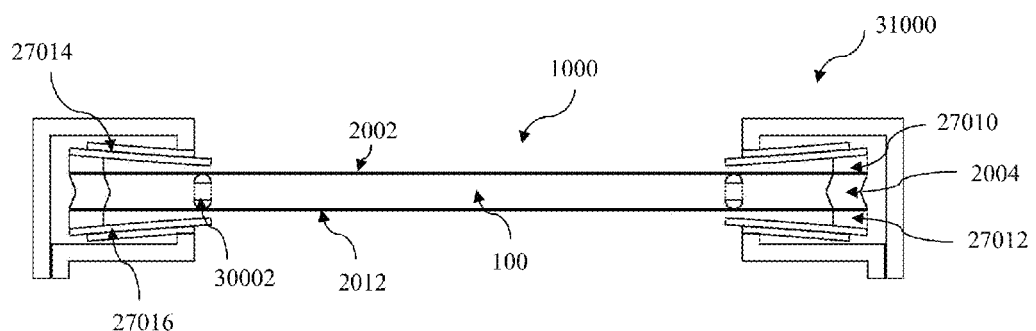
FIG. 19 is a cross-sectional side view of a fluidic optical device that includes compliant edge supports, two deflectable optical surfaces, dual actuators and perforated simple inner support, and shown in an undeflected state.

FIG. 19 is a cross-sectional view of fluidic lens element 31000 similar to the device depicted in FIG. 18, illustrating one example of actuation of the device. In FIG. 19, actuators 27014, 27016 are shown in a first state of actuation. First state of actuation results in substantially zero applied load being delivered to compartment 1000; consequently, optical surfaces 2002, 2012 are shown in an undeflected state.

Figure 20:
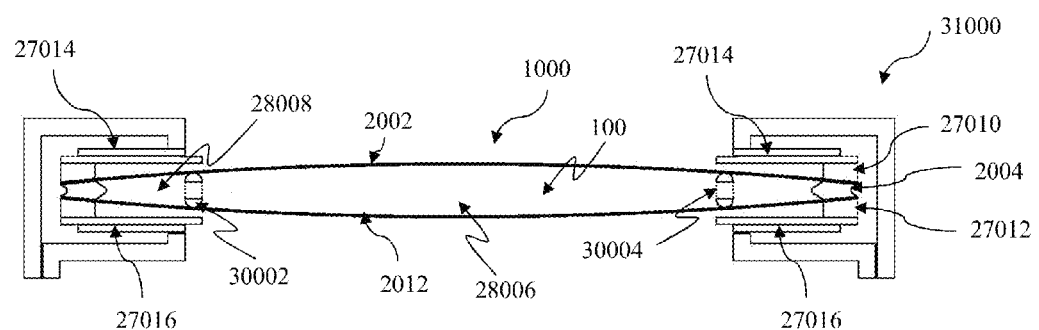
FIG. 20 is a cross-sectional side view of a fluidic optical device that includes compliant edge supports, two deflectable optical surfaces, dual actuators and perforated simple inner support, and shown in a deflected state.

FIG. 20 is a cross-sectional view of fluidic lens element 31000 similar to the device depicted in FIG. 19, however, actuators 27014, 27016 are now shown in a second state of actuation. Second state of actuation results in an applied load being delivered to compartment 1000; consequently, optical surfaces 2002, 2012 are shown to be in a state of deflection. Applied load includes a ring-on-ring load delivered by supports 30002, 27010, 27012, resulting in a deflection of optical surfaces 2002, 2012. Deflection of optical surfaces 2002, 2012 may result changes in fluid pressure between sub-compartments 28006, 28008. Fluid 100 may flow through fluid pass-throughs 30004 in order to reduce or eliminate residual fluid pressure (i.e., the relative pressure between sub-compartments 28006, 28008).

Figure 21:
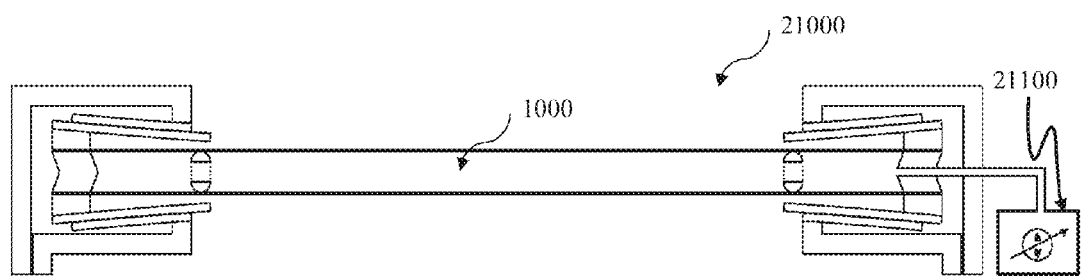
FIG. 21 is a cross-sectional side view of a fluidic optical device that includes compliant edge supports, two deflectable optical surfaces, dual actuators and perforated simple inner support, further including a pressure control actuator.

FIG. 21 is a cross-sectional view of fluidic lens element 21000 similar to the structure depicted in FIG. 19. The applied load may be provided by a pressure control actuator 21100. Pressure control actuator 21100 (for example, a pump) may be disposed in communication with, and control fluid pressure in, compartment 1000.

Figure 22:
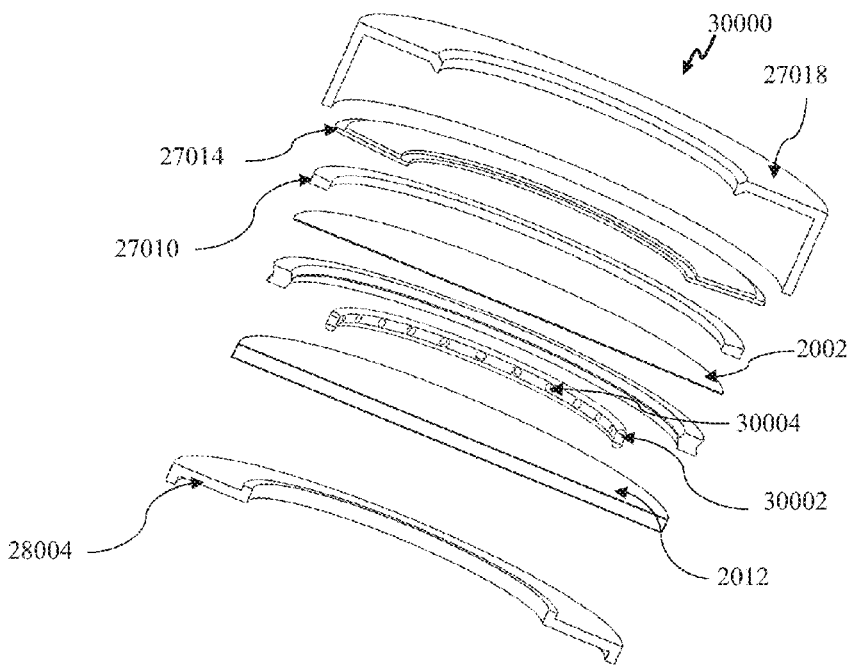
FIG. 22 is an exploded view of a fluidic optical device with deflectable and rigid optical surfaces.

FIG. 22 is a three-dimensional exploded cross-sectional view of fluidic lens element 30000 similar to the structure depicted in FIG. 18. However in FIG. 22, second optical surface 2012 may have any desired deflection or mechanical properties, for example, it may be similar to a thick or rigid plate (see FIG. 18). By way of further example, the second optical surface 2012 may exhibit substantially less deflection than the first optical surface 2002 or substantially no deflection at all. Further, actuator 27014, may be configured to deliver applied load to the edge of first optical surface 2002.

Figure 23:
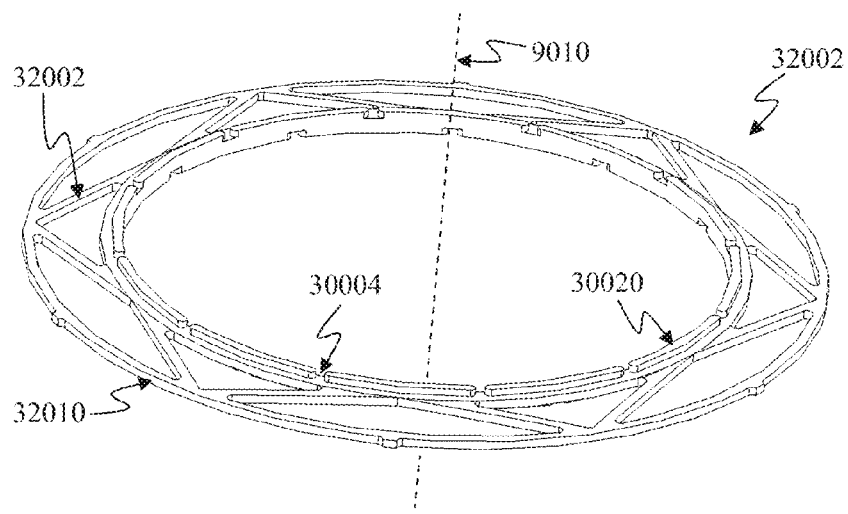
FIG. 23 shows a simple perforated support with channels for fluid flow, radial protrusions to assist in alignment and flexible linkages for providing axial compliance.

FIG. 23 is a three-dimensional view of a perforated support 30002. Perforated support 30002 may include support rim 30020 for communicating applied load with optical surfaces 2002, 2012 and fluid pass-throughs 30004 for providing fluid communication between sub-compartments. Support rim 30020 may be perforated or segmented in order to provide fluid communication between regions of compartment 1000 disposed on either side of it. Alternatively, support rim 30020 may be configured as continuous rim if such fluid communication is not required or is provided by other parts of perforated support 30002 and/or another part of the compartment 1000 and/or device. Perforated support 30002 further may include spider-leg 32002 and outer-rim 32010 protrusions to assist in centering of the support within lens element 30000. Spider-leg 32002 and outer-rim 32010 may additionally provide axial compliance to perforated support 30002, permitting support rim 30020 to be easily displaced in a direction parallel to optical axis 9010. Support rim 30020 and/or any other part of perforated support 30002 may define or bound the clear aperture 2007.

Figure 24:
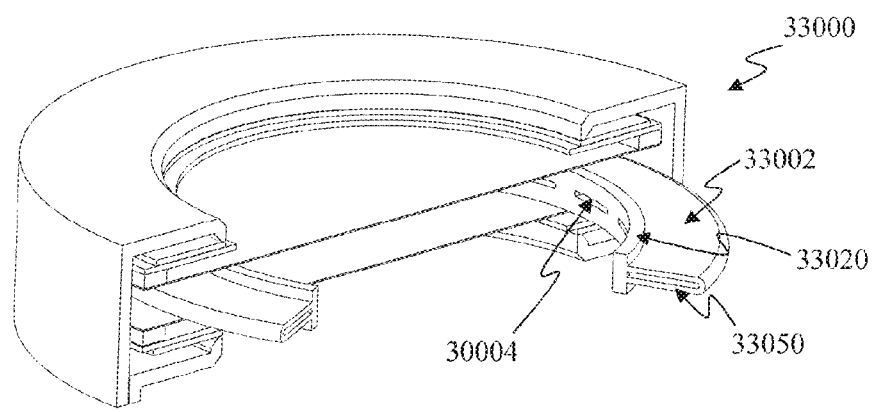
FIG. 24 is a cross-sectional view of a fluidic optical device with inner support having channels for fluid communication with an annular compliant reservoir and bladder.

FIG. 24 is a three-dimensional cross-sectional view of fluidic lens element 33000 similar to the structure depicted in FIG. 18. However in FIG. 24, simple inner support with bellows (bellows support) 33002 may replace both perforated support 30002 and edge support 2004 (see FIG. 18). Bellows support 33002 may include support rim 33020, fluid pass-throughs 30004, and compliant bellows member 33050. In response to residual fluid pressure, fluid may flow between inner sub-compartment 28006 and bellows member 33050 via fluid pass-throughs 30004. In this fashion, bellows member 33040 may inflate and deflate so as to reduce or eliminate residual fluid pressure.

Figure 25:
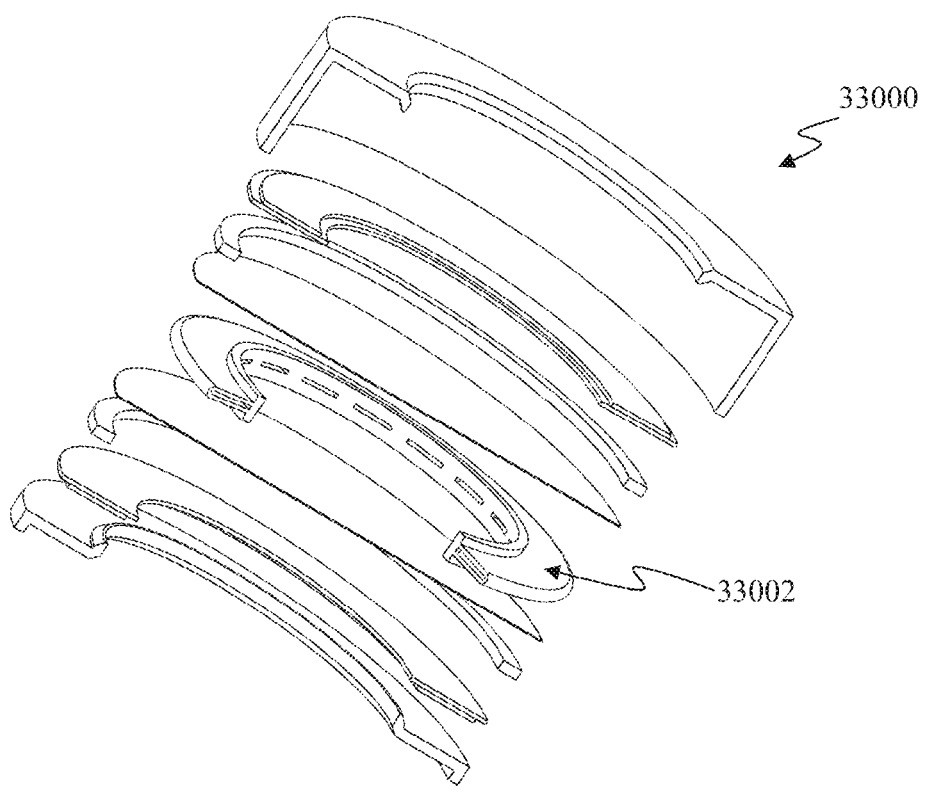
FIG. 25 is an exploded view of a fluidic optical device similar to that depicted in FIG. 24.

FIG. 25 is a three-dimensional exploded cross-sectional view of fluidic lens element 33000 similar to the structure depicted in FIG. 24.

Figure 26:
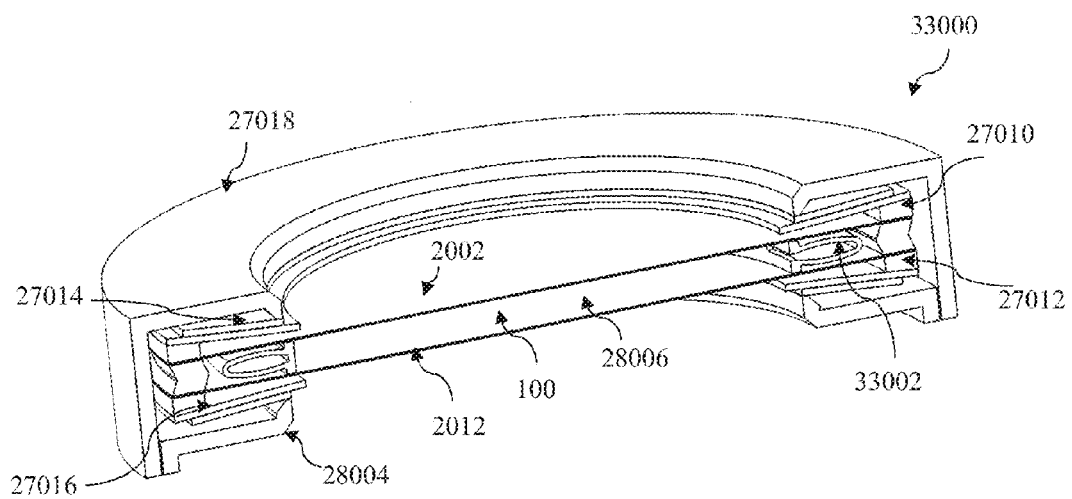
FIG. 26 is a cross-sectional side view of a fluidic optical device with a compliant reservoir support and bladder, shown in an undeflected state.

FIG. 26 is a three-dimensional cross-sectional view of adaptive fluidic lens element 33000, similar to the device depicted in FIG. 24. In FIG. 26, actuators 27014, 27016 are shown in a first state of actuation. First state of actuation results in substantially zero applied load being delivered to compartment 1000; consequently, optical surfaces 2002, 2012 are shown in an undeflected state.

Figure 27:
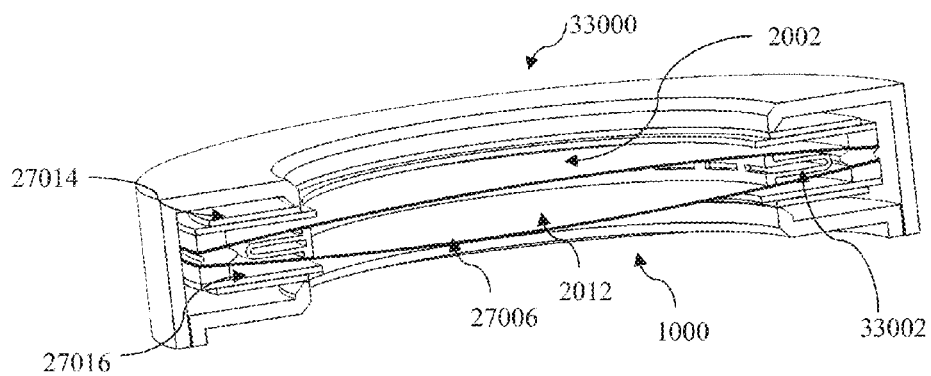
FIG. 27 is a cross-sectional side view of a fluidic optical device with a compliant reservoir support and bladder, shown in a deflected state.

FIG. 27 is a three-dimensional cross-sectional view of adaptive fluidic lens element 33000, similar to the device depicted in FIG. 26. However, in FIG. 27, actuators 27014, 27016 are now shown in a second state of actuation. Second state of actuation results in an applied load being delivered to compartment 1000; consequently, optical surfaces 2002, 2012 are shown in a state of deflection. Applied load includes a ring-on-ring load delivered by supports 33002, 27010, 27012, and may also include a fluid pressure load if residual fluid pressure, resulting from deflection of optical surfaces 2002, 2012, is non-zero.

Figure 28:
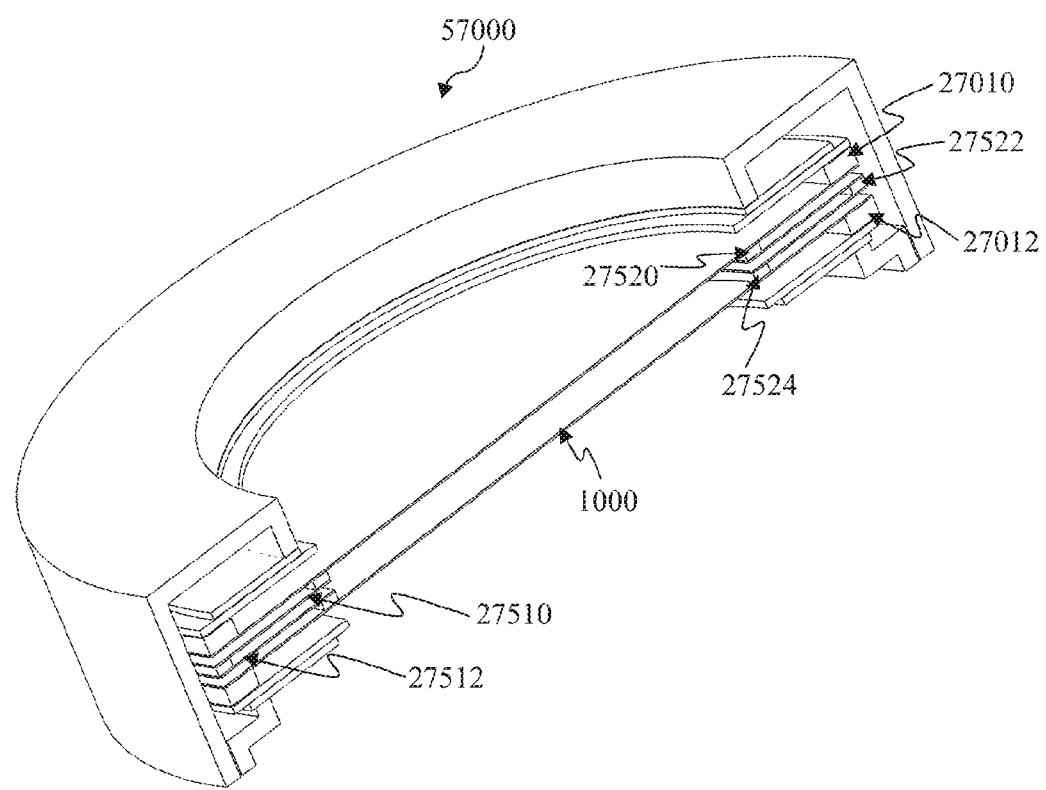
FIG. 28 is a cross-sectional view of an adaptive optical device having a reservoir bladder.

FIG. 28 is a three-dimensional cross-sectional view of fluidic lens element 57000 similar to the structure depicted in FIG. 26. However in FIG. 28, bending-modulus bellows support (bending bellows support) 27500 may replace bellows support 33002 (see FIG. 26). Bending bellows support 27500 may include annular-shaped members 27510, 27512 connected by elastomeric ring-shaped seals 27520, 27522, 27524. In operation, annular-shaped members 27510, 27512 may deflect in a fashion that reduces or eliminates residual fluid pressure in compartment 1000, which may result from actuation.

Figure 29:
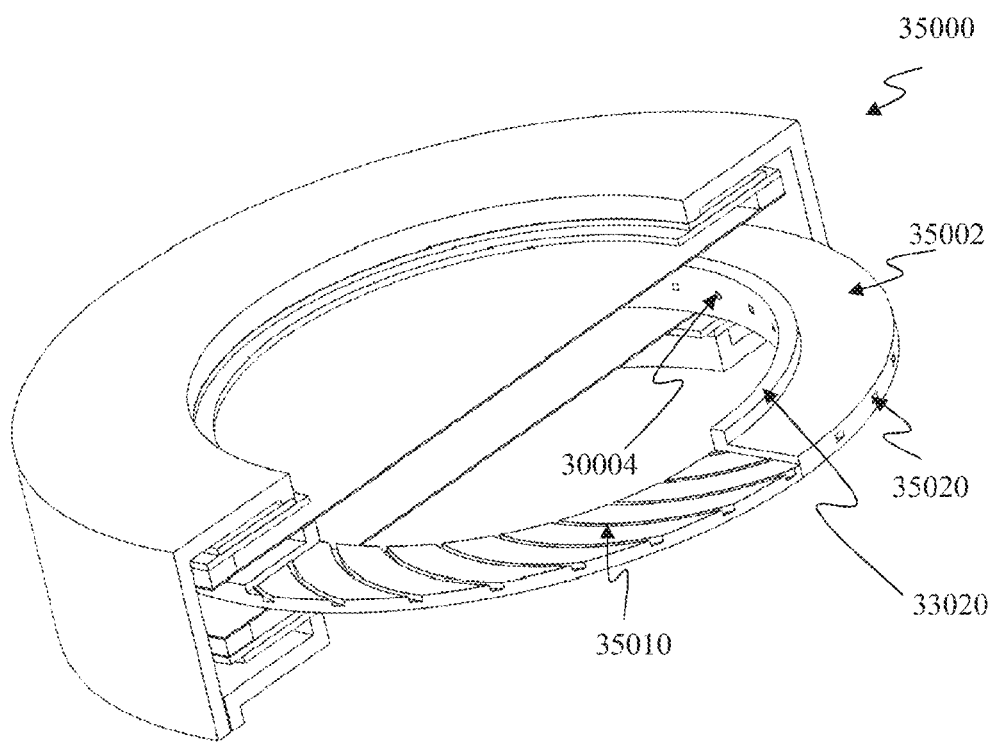
FIG. 29 is a cross-sectional view of a fluidic optical device with support including a reservoir with open channels for control of fluid pressure.

FIG. 29 is a three-dimensional cut-away view of fluidic lens element 35000 similar to the structure depicted in FIG. 24. However in FIG. 29, support with fluid capillary channels (capillary support) 35002 replaces bellows support 33002 (see FIG. 24). Capillary support 35002 includes support rim 33020, fluid pass-throughs 30004 and fluid channels 35010 (note, in various embodiments of the present invention, fluid pass-throughs 30004 may be similar to fluid channels 35010). In a fashion similar to bellows member 33040 (see FIG. 24), fluid may flow into and out of fluid channels so as to reduce or eliminate residual fluid pressure. Fluid channels 35010 may employ capillary forces, hydrophobic or other coatings, electrowetting, oils and/or other fluids in order to further control properties of the fluid. Further, fluid channels 35010 may be open-ended (indicated by openings 35020) or optionally sealed with compliant bellows or diaphragms (not shown) to help contain fluid.

Figure 30:
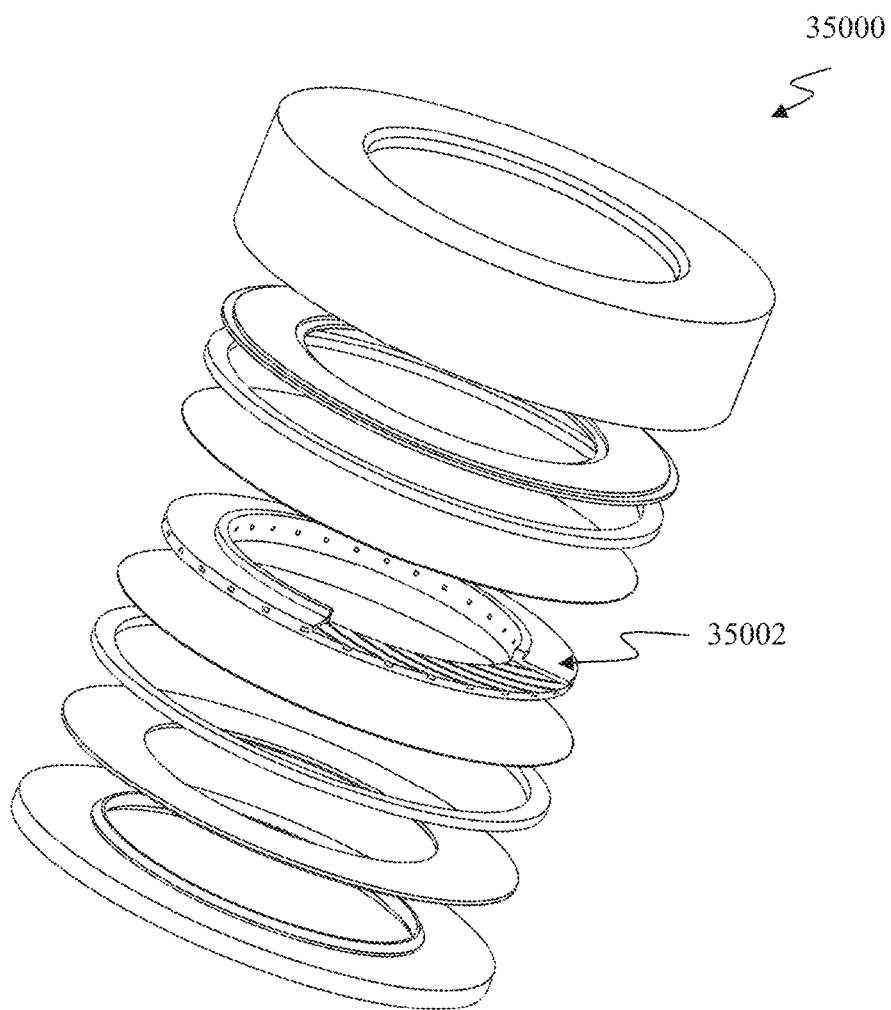
FIG. 30 is an exploded view of a fluidic optical device similar to that depicted in FIG. 29.

FIG. 30 is a three-dimensional exploded view of fluidic lens element 35000 (see FIG. 29).

Figure 31:
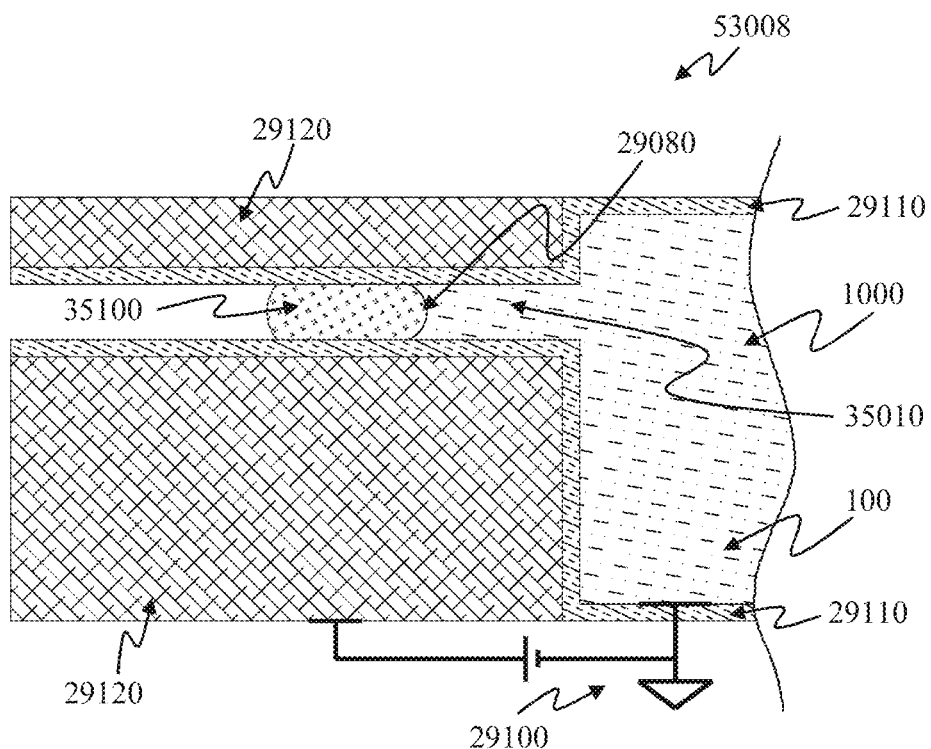
FIG. 31 is a cross-sectional view of a portion of an electrowetting capillary support.

FIG. 31 is a schematic cross-sectional view of an electrowetting capillary support 35002 similar to the structure depicted in FIG. 29. Preferably, in the present embodiment, residual fluid pressure is sufficiently low that it may be controlled by electrowetting. Capillary support 35002 includes openings 35020 and is disposed in fluid communication with compartment 1000. Fluid 100 forms a meniscus 29080 and is prevented from following gravity by capillary forces in fluid channel 35010. Fluid 100 is electrically conductive and connected to a controlled electrical potential 29100. Thin hydrophobic insulator 29110 separates the fluid 100 from counter electrode 29120, thereby forming a capacitor. Counter-electrode 29120 may be an electrically conductive structural material (for example, aluminum or stainless steel) and integral to capillary support 35002. As the capacitor is charged, the wetting angle changes and is accompanied by movement of the meniscus 29080, thus effectively advancing or receding fluid 100 in fluid channel 35010 and modifying residual fluid pressure in compartment 1000. Immiscible oil (oil) 35100 may be added to fluid disposed in fluid channel 35010. Oil 35100 would simply follow the electrowetting-controlled motion of fluid 100.

Figure 32:
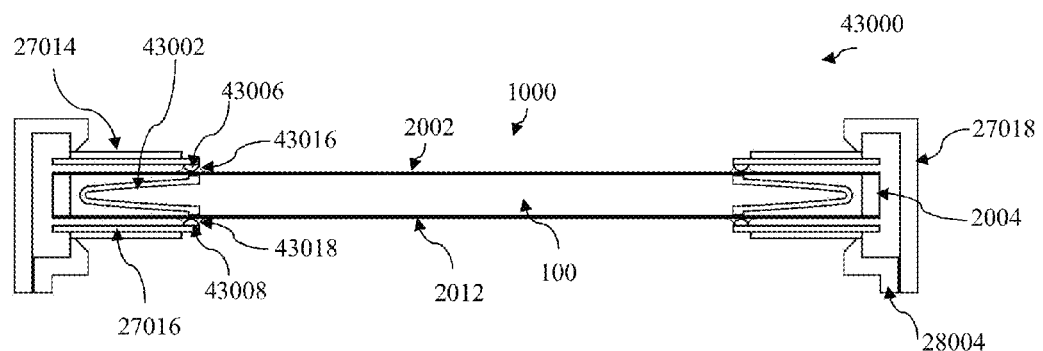
FIG. 32 is a cross-sectional side view of a fluidic optical device with an edge support, external supports coupled to actuators, and compliant reservoir, shown in an undeflected state.

FIG. 32 is a cross-sectional view of fluidic lens element 43000 with compartment 1000 including fluid (not shown) optical surfaces 2002, 2012 and reservoir bladder 43002. Reservoir bladder 43002 forms a seal with optical surfaces 2002, 2012. Actuators 27014, 27016 may be mounted at their outer edges by housing 27018 and adjustable housing member 28004. Reservoir bladder 43002 is substantially more compliant than optical surfaces 2002, 2012, wherein it if configured for easily axial compression. External ring supports 43006, 43008 may be disposed in communication with actuators 27014, 27016 and optical surfaces 2002, 2012. External ring supports 43006, 43008 are configured to function similarly to simple supports. In response to an axial motive force provided by actuators 27014, 27016, external ring supports 43006, 43008 may communication an axial applied load to optical surfaces 2002, 2012, respectively. External ring supports 43006, 43008 may be fastened, or affixed, to optical surfaces 2002, 2012 with a compliant adhesive or elastomer (indicated by meniscuses 43016, 43018). In FIG. 32, actuators 27014, 27016 are shown in a first state of actuation. First state of actuation results in substantially zero applied load being delivered to compartment 1000; consequently, optical surfaces 2002, 2012 are shown in an undeflected state. In response to first state of actuation, reservoir bladder 43002 is shown inflated to a first shape to accommodate a first volume of displaced fluid 43020.

Figure 33:
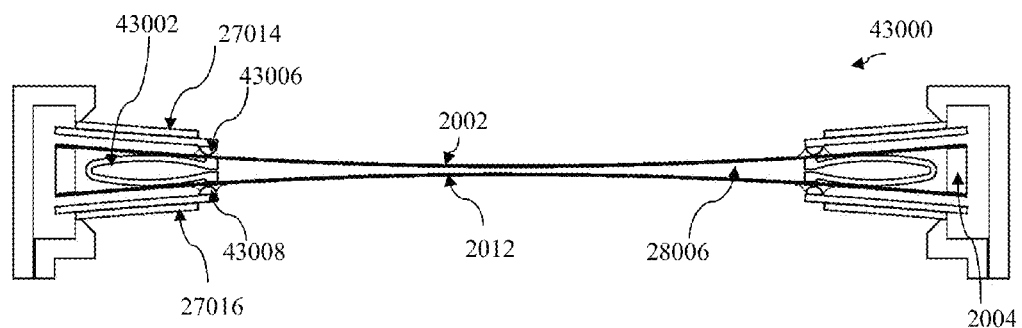
FIG. 33 is a cross-sectional side view of a fluidic optical device with an edge support, external supports coupled to actuators, and compliant reservoir, shown in a deflected state.

FIG. 33 is a cross-sectional view of fluidic lens element 43000 in a second state of actuation. Actuators 27014, 27016 provide an axial motive force, resulting in a ring-on-ring applied load being delivered to optical surfaces 2002, 2012 through supports 43006, 43008, 2004. In response to second state of actuation and resulting applied load, optical surfaces 2002, 2012 are shown in a deflected state. Further, in response to second state of actuation and resulting residual fluid pressure, reservoir bladder 43002 is shown inflated to a second shape to accommodate a second volume of displaced fluid 43020. In this fashion, as applied load is adjusted, the resulting changes in residual fluid pressure may cause fluid to flow between sub-compartment 28006 and reservoir bladder 43002. Likewise, reservoir bladder 43002 will expand and contract in response to the flow of fluid into and out of it.

Figure 34:
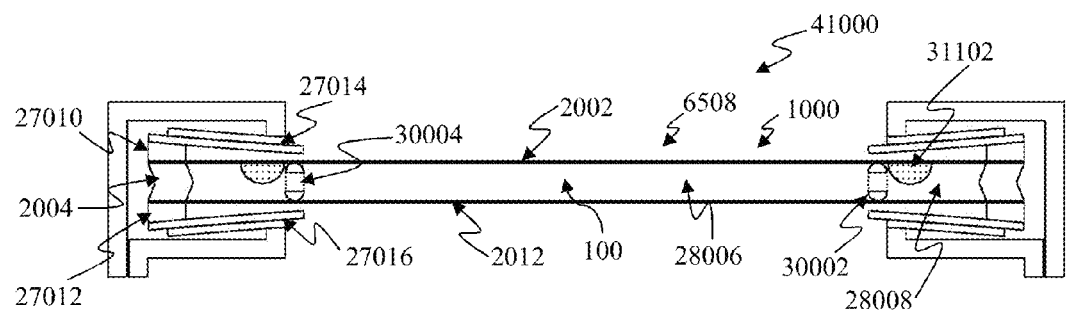
FIG. 34 is a cross-sectional side view of a fluidic optical device, including a gas pocket reservoir, shown in an undeflected state.

FIG. 34 is a cross-sectional view of an adaptive fluidic lens 41000 similar to the embodiment depicted in FIG. 19. However, in FIG. 19 one or more gas pocket reservoir (gas pocket) 31102 is disposed in compartment 1000. Preferably, gas pocket 31102 is disposed in sub-compartment 28008. Surfaces internal to inner sub-compartment 28006 may be treated with a hydrophobic coating to help prevent gas pocket from entering inner sub-compartment 28006. Likewise, surfaces internal to outer sub-compartment 28008 may be treated with a hydrophilic coating to help retain gas pocket in outer sub-compartment 28008. Further, fluid pass-throughs 30004 may be configured in such a fashion that capillary action substantially prevents gas pocket 31102 from transiting through fluid pass-through 30004 and entering inner sub-compartment 28006. By preventing gas pockets 31102 from entering inner sub-compartment 28006, gas pocket 31102 is likewise prevented from obscuring clear aperture and causing undesired optical effects in the device. In FIG. 34, adaptive fluidic lens 41000 is shown in a first state of actuation wherein optical surfaces 2002, 2012 are undeflected and gas pocket 31102 is in a first state of volume and pressure.

Figure 35:
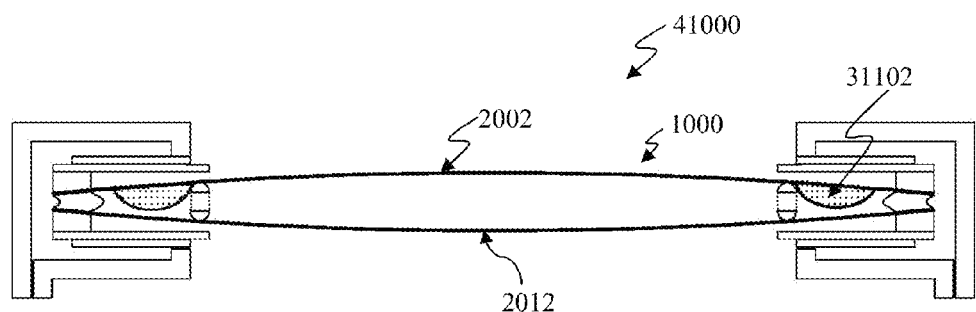
FIG. 35 is a cross-sectional side view of a fluidic optical device, including a gas pocket reservoir, shown in a deflected state.

In FIG. 35, adaptive fluidic lens 41000 is shown in a second state of actuation wherein optical surfaces 2002, 2012 are deflected and gas pocket 31102 is in a second state of volume and pressure. As a result of deflection of optical surfaces 2002, 2012, a residual fluid pressure may occur in compartment 1000. In the example of FIG. 35, residual fluid pressure may be negative, thereby subjecting gas pocket 31102 to a drop in pressure. Following the ideal gas law, such drop in pressure may result in gas pocket 31102 undergoing an increase in volume.

Figure 36:
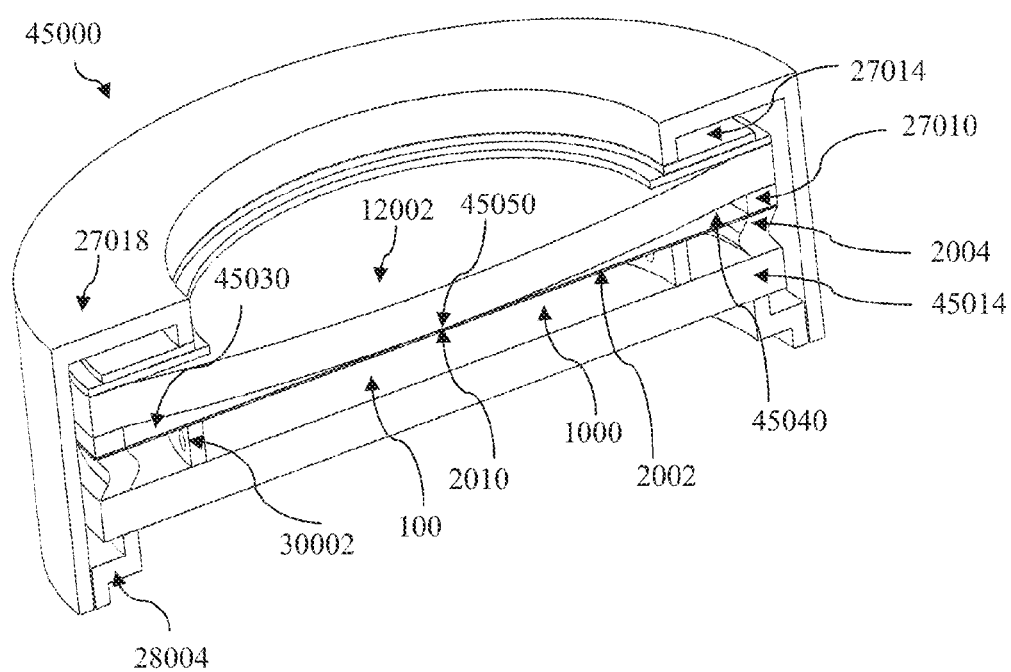
FIG. 36 is a cross-sectional side view of a fluidic optical device configured for a pin-on-ring load.

FIG. 36 is a three-dimensional cross-sectional view of fluidic lens element 45000 similar to the structure depicted in FIG. 9. Axial support 12002 may be rigid and have high optical transmission. Further, axial support 12002 may be disposed externally to compartment 1000 and include a curved convex vertex 45050 disposed in communication with vertex 2010 of optical surface 2002. Compartment 1000 may include rigid optical surface 45014 and compliant edge support 2004. Support 27010 may be disposed between of axial support 12002 and optical surface 2002. First fluid 100 may be disposed in compartment 1000. An index-matching second fluid 45030 may be disposed in external compartment 45040 located between axial support 12002 and optical surface 2002. Actuator 27014 may be mounted between housing 27018 and axial support 12002. In operation, actuator 27014 may deliver an axial motive force to axial support 12002. Such motive force may result in a pin-on-ring load being applied to optical surface 2002 through axial support and perforated support 30002. Additionally as a result of the motive force, a ring-on-ring load may be applied to optical surface 2002 through supports 27010, 30002.

Figure 37:
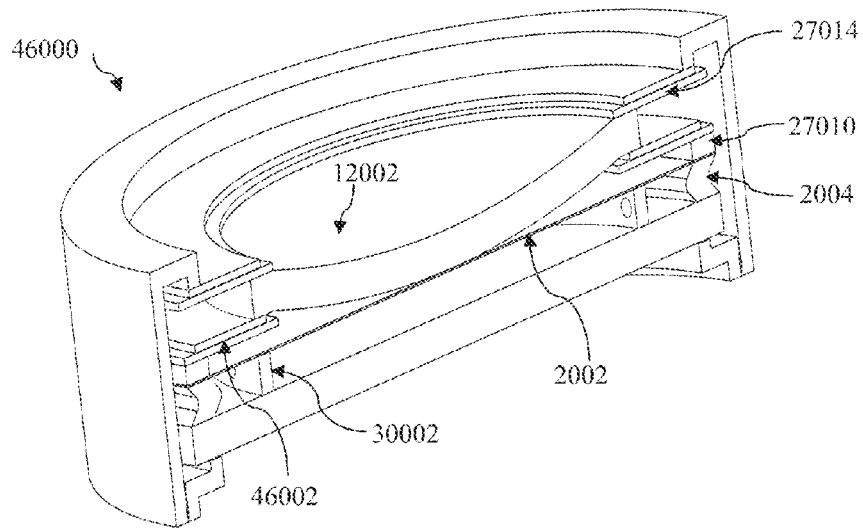
FIG. 37 is a cross-sectional side view of a fluidic optical device configured for providing independent control of concentrated and distributed loads on the optical surfaces.

FIG. 37 is a three-dimensional cross-sectional view of fluidic lens element 46000 similar to the structure depicted in FIG. 36. However, in FIG. 37, an additional actuator 46002 is disposed in communication with axial support 12002 and support 27010. In operation, actuator 27014 may deliver an axial motive force to axial support 12002. Such motive force may result in a pin-on-ring load being applied to optical surface 2002 through axial support 12002 and perforated support 30002. Additionally, actuator 46002 may deliver an axial motive force to optical surface 2002 and axial support 2004. Such motive force may result in a ring-on-ring load being applied to optical surface 2002 through supports 27010, 30002. Such independent control of multiple applied loads on optical surface 2002 may enable independent control over spherical curvature and asphericity of deflection of optical surface 2002.

Figure 38:
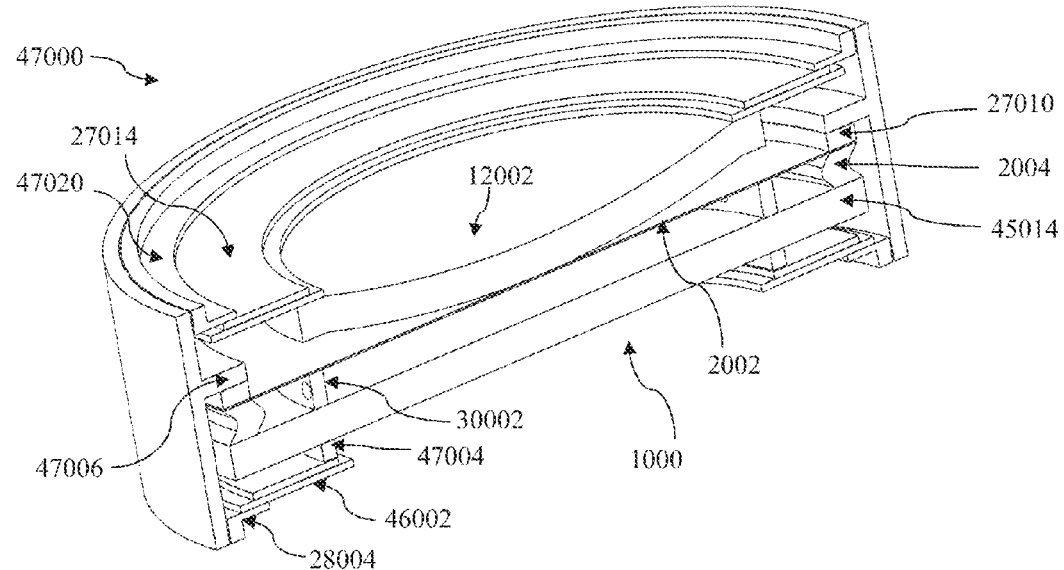
FIG. 38 is a cross-sectional side view of an alternate embodiment of a fluidic optical device configured for providing independent control of concentrated and distributed loads on the optical surfaces.

FIG. 38 is a three-dimensional cross-sectional view of fluidic lens element 47000 similar to the structure depicted in FIG. 37. However, in FIG. 38 actuator 46002 may be mounted between adjustable housing member 28004 and a ring-shaped support 47004. Support 47004 may be fastened to rigid optical surface 45014. Support 27010 may be mounted to housing protrusion 47006. Actuator 27014 may be mounted to a second housing adjustable housing member 47020. In operation, actuator 46002 may deliver an axial motive force to support 47004, resulting in a ring-on-ring load being applied to optical surface 2002 through supports 27010, 30002. Additionally, actuator 27014 may deliver an axial motive force to axial support 12002. Such motive force may result in a pin-on-ring load being applied to optical surface 2002 through axial support 12002 and perforated support 30002.

Figure 39:
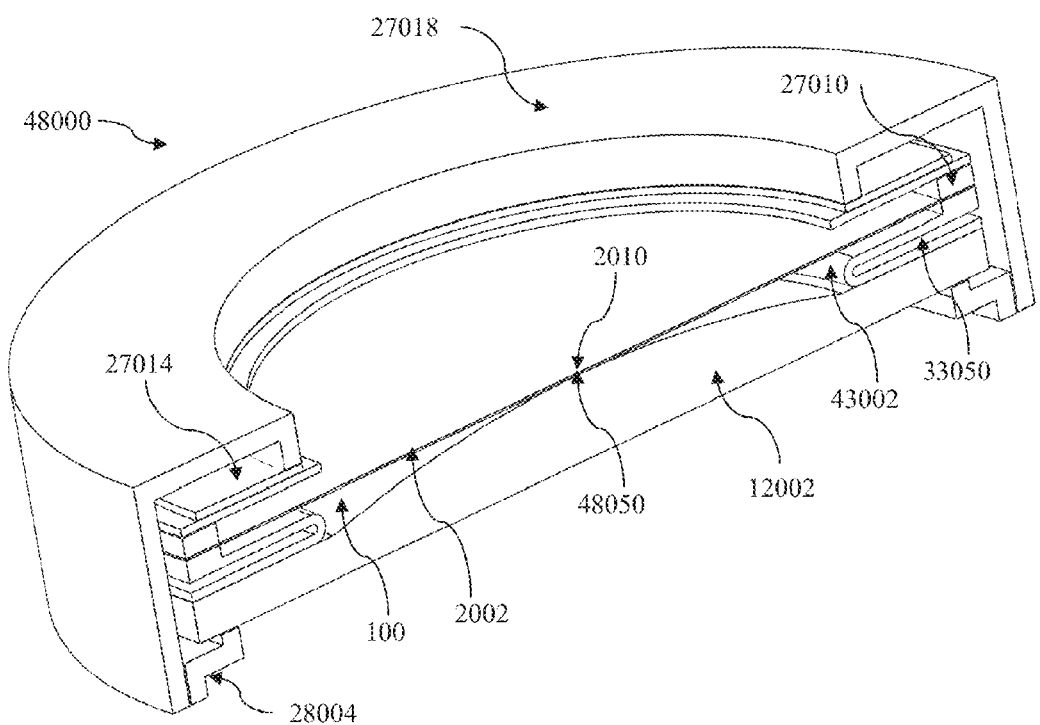
FIG. 39 is a cross-sectional side view of a fluidic optical device with an edge support, compliant reservoir, dual actuators and optical surfaces disposed below a rigid curved optical surface.

FIG. 39 is a three-dimensional cross-sectional view of an adaptive fluidic optical device 48000 similar to the device depicted schematically in FIG. 9. Compartment 1000 is bounded by optical surface 2002 and axial support 12002. In the present embodiment, axial support 12002 may be disposed with curved convex vertex 45050 internal to compartment 1000 and in communication with vertex 2010 of optical surface 2002. Compartment is additionally bounded by compliant reservoir bladder 43002. Portions of reservoir may be disposed in communication with axial support 12002 and optical surface 2002. In this fashion, reservoir bladder 43002 may form a seal with optical surface 2002, and axial support 12002, thereby sealing compartment 1000. Compartment 1000 may be at least partially filled with fluid 100. Actuator 27014 may be mounted between housing 27018 and support 27010. Adjustable housing member 28004 is disposed in communication with axial support 12002. In this fashion, the axial position of adjustable housing member 28004 may be adjusted in order to provide a desired amount of "pre-load" (or compression) to compartment 1000, actuator 27014, and/or device 48000. In operation, actuator 27014 may deliver an axial motive force to support 27010. Such motive force may result in a pin-on-ring load being applied to optical surface 2002 through axial support 12002 and support 27010. Such pin-on-ring applied load may result in the bending deflection of optical surface 2002. In response to any volume excursions resulting from deflection of optical surface 2002, bellows member 33050 may deform in order to accommodate such fluid excursions and reduce or eliminate any residual fluid pressure.

Figure 40:
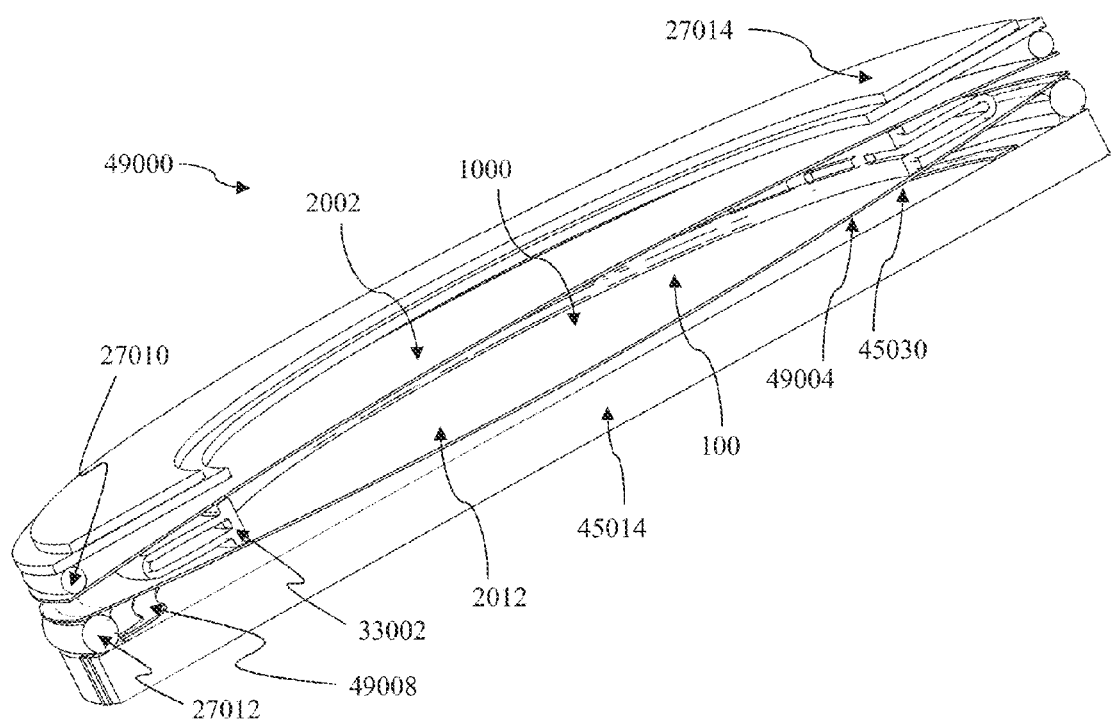
FIG. 40 is a cross-sectional side view of a fluidic optical device with thermally heated sealed compartments.

FIG. 40 is a three-dimensional cross-sectional view of an adaptive fluidic optical device 49000 similar to the device depicted in FIG. 26. The present embodiment demonstrates an alternative method to produce a uniformly distributed applied load. A compartment 1000 is bounded by optical surfaces 2002, 2012 and a bellows support 33002. Actuator is mounted to a housing (not shown). Rigid optical surface 45014 may be disposed in communication with support 27012. Support 27012 forms a seal with optical surfaces 45014, 2012. In this fashion, an external compartment 49004 is bounded by optical surfaces 45014, 2012 and support 27012. External compartment 49004 may be filled with a second fluid (or gas or other medium) 45030 having desired thermal properties (including coefficient of thermal expansion). Temperature control element 49008 (for example, a thermoelectric or piezoelectric heat transfer device, or NiCr (or "nichrome") coating or wire.) may be disposed proximal to rigid optical surface 45014 and in thermal communication with compartment 49004 and/or fluid 45030. In this fashion, a change in temperature of temperature control element 49008 may cause a change in temperature of fluid 45030. Likewise, the pressure in compartment 49004 will change in accordance with the thermal expansion properties of fluid 45030. In operation, actuator 27014 may deliver a ring-on-ring load to optical surface 2002 through supports 27010, 33002. Additionally, a uniformly distributed load (for example, gas- or fluid pressure) may be applied to optical surface 2012 through a change in pressure in compartment 49004 due to the heating and/or cooling of fluid 45030.

Figure 41:
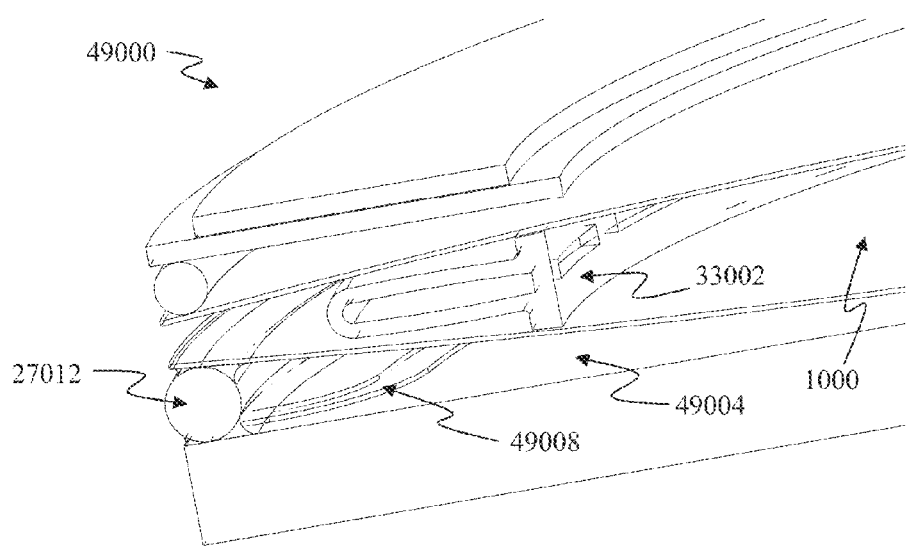
FIG. 41 is a magnified cross-sectional side view of a fluidic optical device with thermally heated sealed compartments.

FIG. 41 is a detailed view of the edge region of lens element 49000 depicted in FIG. 29. Compartments 1000, 49004 are sealed by supports 33002, 27010, respectively.

Figure 42:
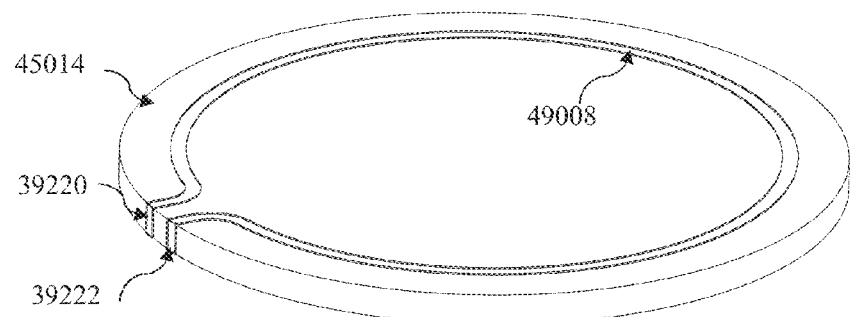
FIG. 42 is a three-dimensional view of a thermal heater disposed within an optical element.

FIG. 42 is a detailed view of rigid optical surface 45014. Heating element 49008 may be configured in a circular pattern concentric with the edge of rigid optical surface 45014 and include exposed electrical contacts 39220, 39222.

Figure 43:
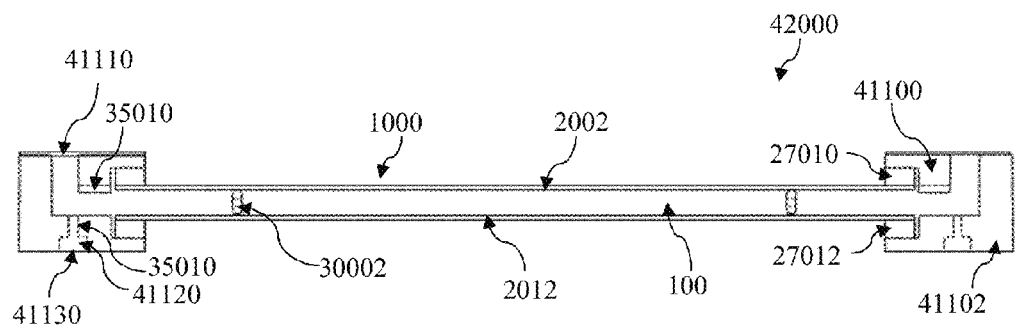
FIG. 43 is a cross-sectional side view of an adaptive fluidic optical device including a diaphragm seal with optical surfaces in an undeflected state.

FIG. 43 is a cross-sectional side view of an adaptive fluidic optical device 42000 similar to the one depicted schematically in FIG. 6. Compartment 1000 is partially bounded by optical surfaces 2002, 2012 and supports 27010, 27012. Compartment may additionally be bounded by support frames 41100, 41102 and diaphragm seal 41110. Support frames 41100, 41102 may be structural frames providing a rigid surface to mount supports 27010, 27012, respectively. For example, support frames 41100, 41102 may be fabricated from machined aluminum, steel or rigid machinable plastic, and may be of similar shape to that of supports 27010, 27012 (for example, ring-shaped). Supports 27010, 27012 may be bonded to support frames 41100, 41102, forming a seal. Diaphragm seal 41110 may include a flexible film, seal or support and may be fastened to support frames 41100, 41102, forming a seal. Diaphragm seal 41110 may be configured in any desirable shape; for example, in the case where support frames 41100, 41102 are ring-shaped and concentrically disposed to each other, diaphragm seal 41110 may be formed in the shape of a ring or film annulus. Further, diaphragm seal 41110 may be a film and fastened to support frames 41100, 41102 with pre-tension. A support frame 41102 may include one or more fluid channel 35010 and fluid reservoir 41120. Fluid reservoir 41120 may be similar to a channel or cavity disposed in a support frame 41102 for holding and transporting fluid 100. Fluid channel 35010 provides fluid communication between compartment 1000 and fluid reservoir 41120. Fluid reservoir 41120 may be sealed with a bladder diaphragm 41130. Bladder diaphragm 41130 may be a compliant film or seal and is capable of deflecting in response to residual fluid pressure. In FIG. 43, the device 42000 is shown in an un-actuated (or "first actuation") state wherein optical surfaces 2002, 2012, diaphragm seal 41110 and bladder diaphragm 41130 are substantially undeflected, and, hence, residual fluid pressure in compartment 1000 is substantially zero.

Figure 44:
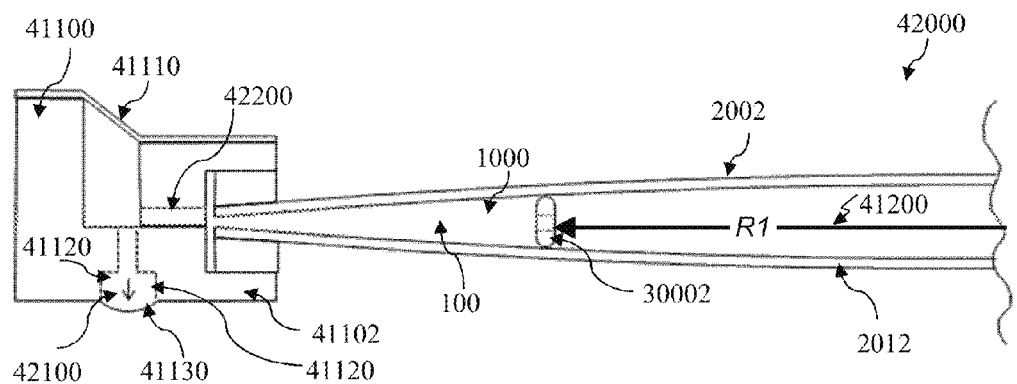
FIG. 44 is a cross-sectional side view of an adaptive fluidic optical device with optical surfaces in a deflected state and bladder exhibiting deflection in response to positive residual fluid pressure.

FIG. 44 is a cross-sectional side view of an adaptive fluidic optical device 42000 similar to the device depicted in FIG. 43. However, in FIG. 44, device 42000 is shown in a second actuation state wherein optical surfaces 2002, 2012, diaphragm seal 41110 and bladder diaphragm 41130 are deflected. An actuator (not shown) provides an axial motive force, resulting in displacing support frames 41100, 41102 axially toward each other. As a result of displacement of support frames 41100, 41102, diaphragm seal 41110 is brought into a state of increased tension. Further, as a result of displacement of support frames 41100, 41102, optical surfaces 2002, 2012 are subjected to a ring-on-ring applied load through supports 30002, 27010, 27012, and undergo bending deflection. In FIG. 44, support 30002 is configured with a first support radius, R1 (indicated by arrow 41200). As a result of such first support radius and actuation of device, a positive residual pressure (indicated by arrow 42100) is present in compartment 1000. Such positive residual pressure results in the outward deflection of bladder diaphragm 41130. In this fashion, bladder diaphragm 41130 increases the effective volume of fluid reservoir 41120 such that residual fluid pressure is reduced or eliminated. Support frames 41100, 41102 may be configured such that in a state of maximum axial displacement, they may bottom out (or stop) against each other. In such case one or more rim fluid channel 42200 may be disposed in one or more of Support frames 41100, 41102. Such rim fluid channel 42200 may be similar to fluid channels 35010 (see FIG. 43) and provide fluid communication between compartment 1000 and fluid reservoir 41120 when support frames 41100, 41102 are bottomed out against each other. As an optional alternative embodiment, if diaphragm seal 41110 is configured with sufficient compliance, it may perform the additional function of acting similar to a bellows and relieving residual fluidic pressure. In this fashion, diaphragm seal 41110 may obviate the need for, and, hence, enable the elimination of, bladder diaphragm 41130.

Figure 45:
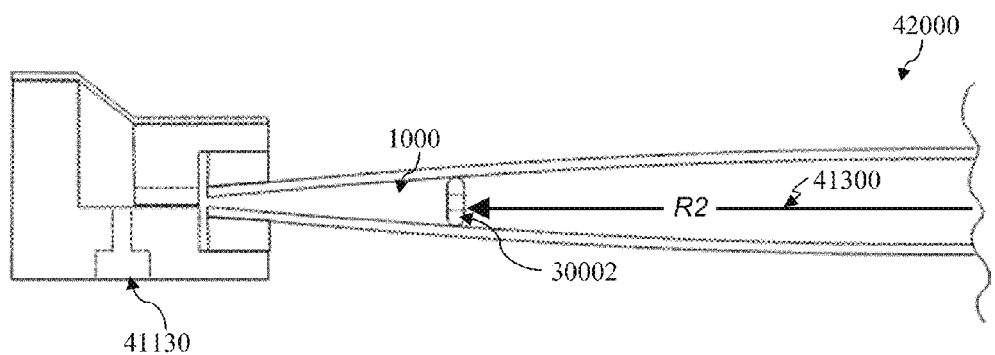
FIG. 45 is a cross-sectional side view of an adaptive fluidic optical device with optical surfaces in a deflected state and bladders exhibiting no deflection in response to zero residual fluid pressure.

FIG. 45 is a cross-sectional side view of an adaptive fluidic optical device 42000 similar to the device depicted in FIG. 44 in second actuation state. However, in FIG. 45, support 30002 is configured with a second support radius, R2 (indicated by arrow 41300). As a result of such second support radius and actuation of device, zero residual pressure is present in compartment 1000. Such lack of residual pressure results in no deflection of bladder diaphragm 41130.

Figure 46:
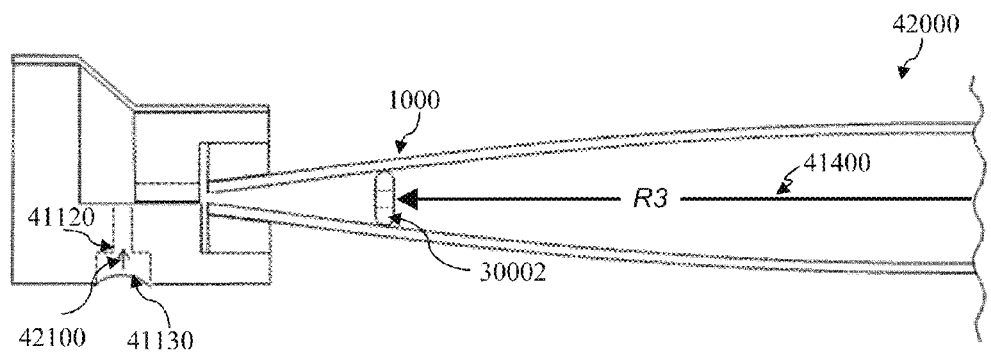
FIG. 46 is a cross-sectional side view of an adaptive fluidic optical device with optical surfaces in a deflected state and bladder exhibiting deflection in response to negative residual fluid pressure.

FIG. 46 is a cross-sectional side view of an adaptive fluidic optical device 42000 similar to the device depicted in FIG. 44 in third actuation state. However, in FIG. 46, support 30002 is configured with a third support radius, R3 (indicated by arrow 41400). As a result of such third support radius and actuation of device, negative residual pressure is present in compartment 1000. Such lack of residual pressure results in no deflection of bladder diaphragm 41130.

Figure 47:
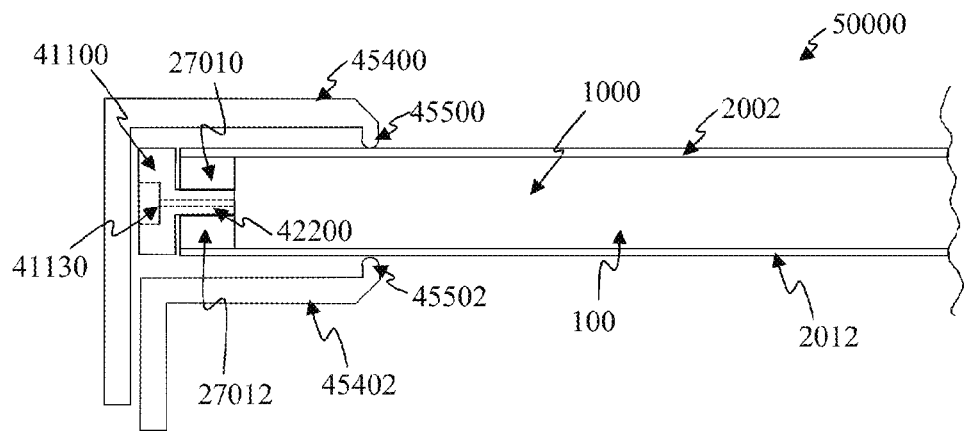
FIG. 47 is a cross-sectional side view of a fluidic optical device with external supports and radially disposed bladder, shown in an undeflected state.

FIG. 47 is a cross-sectional view of an alternative embodiment of an adaptive fluidic optical device 50000, similar to the device depicted schematically in FIG. 6. Compartment 1000 is at least partially bounded by optical surfaces 2002, 2012, supports 27010, 27012, and support frame 41100. Fluid 100 may be disposed in compartment 1000. Rim fluid channel 42200 and bladder diaphragm 41130 may be disposed in a radial fashion in support frame 41100. First support armature 45400 and second support armature 45402 may be disposed external to compartment 1000. Support armatures 45400, 45402 may include support members 45500, 45502 and may be substantially rigid. Support members 45500, 45502 may be disposed in communication with optical surfaces 2002, 2012. Further, support members 45500, 45502 may include portions with rounded cross-sectional shape in order to provide a concentrated applied load to optical surfaces 2002, 2012. Support armatures 45400, 45402 may be disposed as part of or in communication with a housing (not shown), and/or actuator (not shown). In operation, actuator (not shown) may provide a motive force, thereby resulting in an axial displacement of support armatures 45400, 45402 with respect to each other. Such displacement of support armatures 45400, 45402 may result in a concentrated bending load being applied to optical surfaces 2002, 2012. For example, in the case of ring-shaped support members 45500, 45502 and supports 27010, 27012, said bending load may be similar to a ring-on-ring load. In FIG. 47, device 50000 is shown in a first actuation state wherein no substantial load is applied and optical surfaces 2002, 2012 are substantially undeflected. Further, in first actuation state, zero residual fluid pressure may be present in chamber 1000, leaving bladder diaphragm 41130 substantially undeflected.

Figure 48:
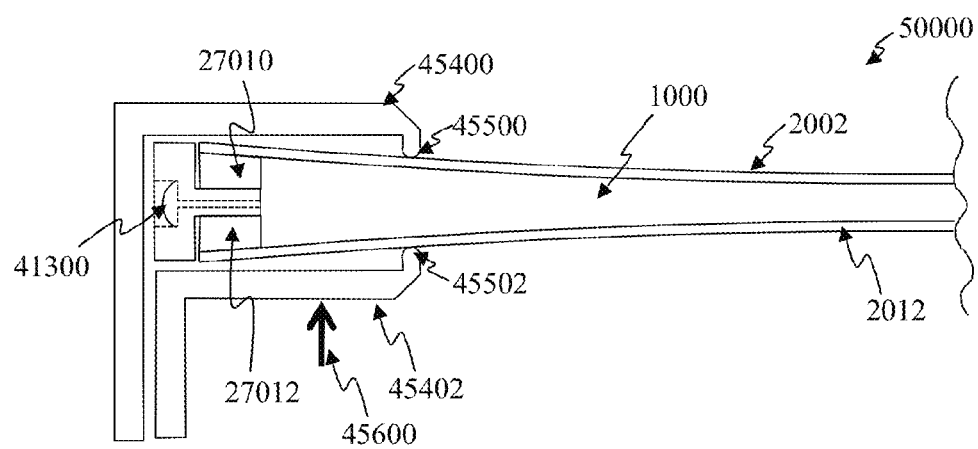
FIG. 48 is a cross-sectional side view of a fluidic optical device with external supports and radially disposed bladder, shown in a deflected state.

FIG. 48 is a cross-sectional view of adaptive fluidic optical device 50000, similar to the device depicted FIG. 47. However, in FIG. 48, device 50000 is shown in a second actuation state. In second actuation state, support armatures 45400, 45402 are axially displaced with respect to each other (indicated by arrow 45600). As a result of displacement of support armatures 45400, 45402, applied ring-on-ring loads are delivered to optical surface 2002 through support 27010 and support member 45500, and to optical surface 2012 through support 27012 and support member 45502. In response to applied loads, optical surfaces 2002, 2012 deflect in a concave fashion (i.e., inward toward the center of compartment 1000). Further, as a result of deflection of optical surfaces 2002, 2012, positive residual fluid pressure may be present in compartment 1000, resulting in a convex (or outward) deflection of bladder diaphragm 41130.

Figure 49:
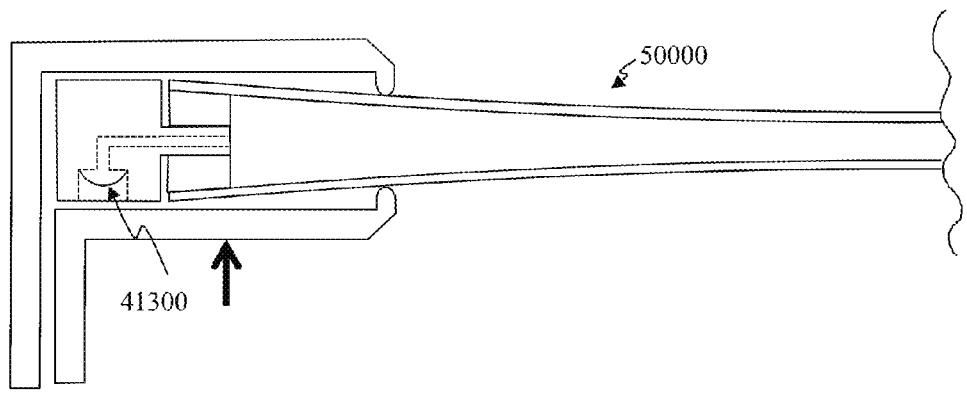
FIG. 49 is a cross-sectional side view of a fluidic optical device with external supports and axially disposed bladder, shown in a deflected state.

FIG. 49 is an alternative configuration of the device 50000 depicted in FIG. 48. However, in FIG. 49, at least a portion of rim fluid channel 42200 and/or bladder diaphragm 41130 may be disposed in an axial fashion in support frame 41100.

Figure 50:
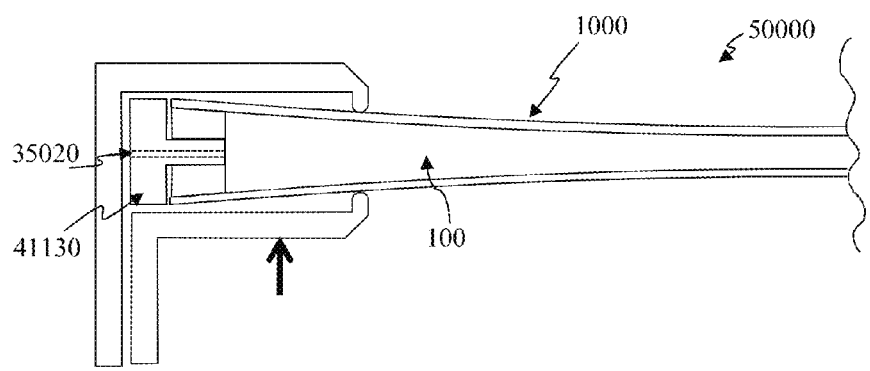
FIG. 50 is a cross-sectional side view of a fluidic optical device with external supports and radially disposed fluid channel.

FIG. 50 is an alternative configuration of the device 50000 depicted in FIG. 48. However, in FIG. 50, rim fluid channel 42200 may employ openings 35020, capillary forces and/or electrowetting to control fluid 100 (similar to fluid channels 35010; see FIG. 29) and/or fluid pressure in compartment 1000.

Figure 51:
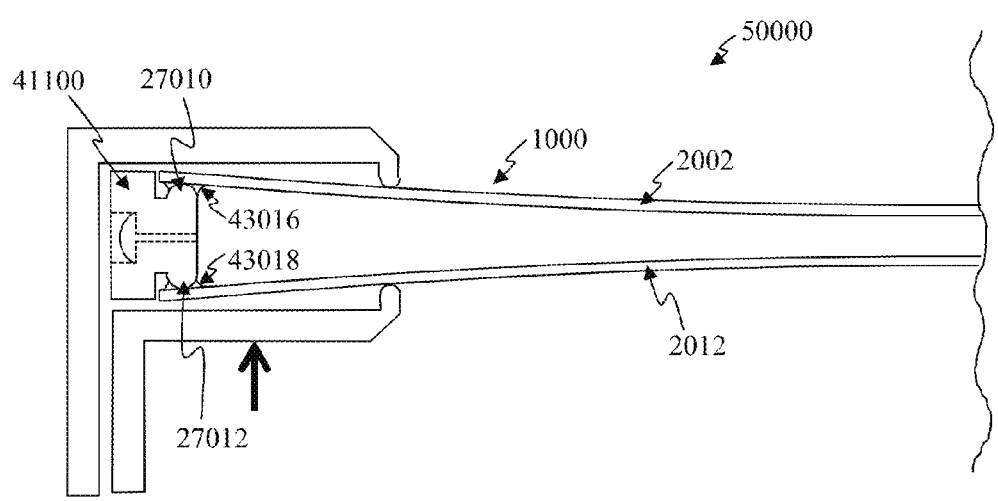
FIG. 51 is a cross-sectional side view of an alternate configuration of a fluidic optical device with external supports and radially disposed bladder.

FIG. 51 is an alternative configuration of the device 50000 depicted in FIG. 48. However, in FIG. 51, supports 27010, 27012 may be configured integral with support frame 41100. Further supports 27010, 27012 may include rounded cross-sections, and may be substantially rigid and fastened to optical surfaces 2002, 2012 with a compliant adhesive (indicated by meniscuses 43016, 43018), thereby sealing compartment 1000. In this fashion supports 27010, 27012 may function similarly to simple supports in delivering concentrated applied loads to optical surfaces 2002, 2012 and providing a seal to compartment 1000. Actuation of device 50000 may result in residual fluid pressure which may result in the deflection of bladder diaphragm 41130.

Figure 52:
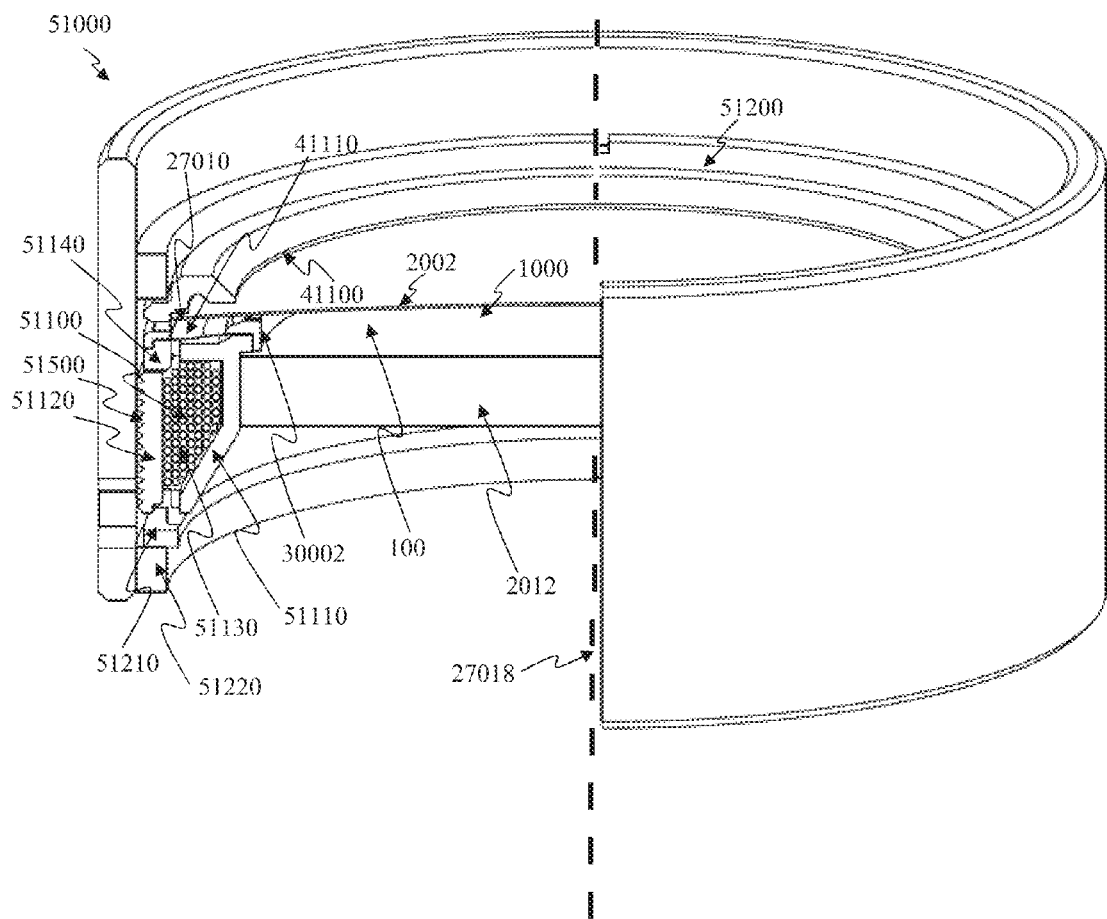
FIG. 52 is a three-dimensional view of a fluidic optical device with actuation provided by an electromagnet actuator.

FIG. 52 shows a cross-section of an adaptive fluidic optical device 51000 according to a preferred embodiment of the present invention. Compartment 1000 may include and be partially bounded by first optical surface 2002 and second optical surface 2012. First optical surface 2002 may be similar to a Kirchhoff plate or exhibit deflection dominated by bending (i.e., it may exhibit a 'bending modulus'). Second optical surface 2012 may be rigid or similar to a thick plate. Compartment 1000 may be further bounded by diaphragm seal 41110, perforated support 30002, support frame 41100, and support 27010. Actuator 51100 may be similar to an electromagnet and include solenoid bobbin 51110, solenoid casing 51120, solenoid winding 51130 and solenoid armature 51140. One or more of solenoid bobbin 51110, solenoid casing 51120, solenoid winding 51130 and solenoid armature 51140, and/or any other part of actuator 51100 may include ferromagnetic materials (such as low-carbon steel, magnetic iron and/or electromagnetic iron), permanent magnetic materials, any other desirable material for use in electromagnets, and/or materials having any desired properties including remnant magnetism, coercivity, permeability, and/or core loss. Compartment 1000 may be filled with fluid 100. One or more of optical surface 2012, diaphragm seal 41110 and perforated support 30002 may be disposed in communication with solenoid bobbin 51110. Solenoid armature 51140 may be disposed in communication with support frame 41100. Solenoid casing 51120 may be fastened to housing 27018 with threading 51150, and/or retainer rings 51200, 51210, 51220.

Figure 53:
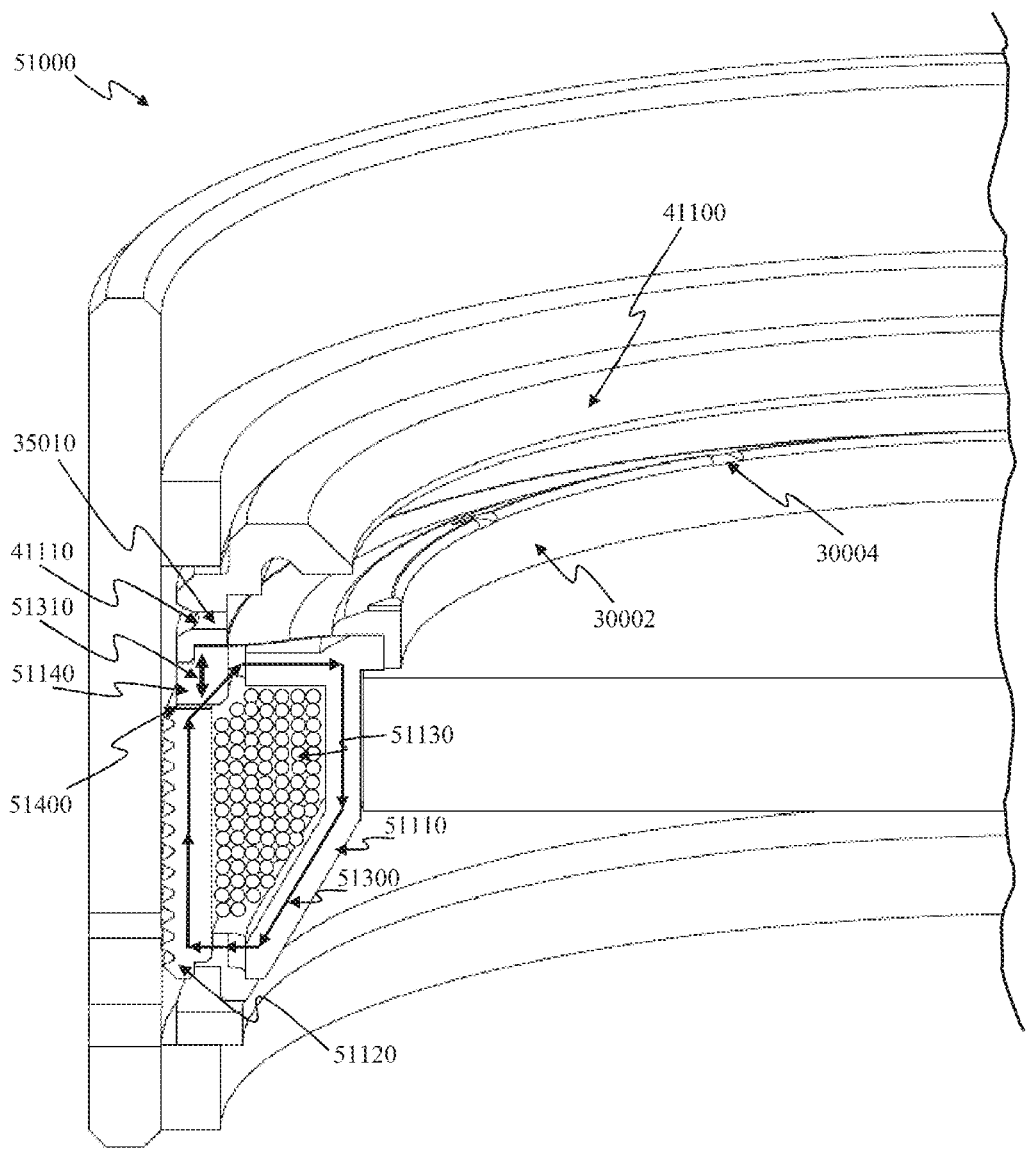
FIG. 53 is detailed three-dimensional view of a fluidic optical device with actuation provided by an electromagnet actuator.

FIG. 53 shows a close-up cross-section view of device 51000 similar to the structure depicted in FIG. 52. Solenoid winding 51130 may be an electrically conductive wire wound into a solenoidal coil. Solenoid bobbin 51110, solenoid casing 51120 and solenoid armature 51140 may form a substantially toroidally shaped shell encasing solenoid winding 51130. Solenoid bobbin 51110, solenoid casing 51120 and solenoid winding 51130 may be substantially fixed in position with respect to each other. Solenoid armature 51140 (similar to a solenoid plunger) is the moving component of actuator 51100 and may be configured for translation in a direction parallel to the axis of solenoid winding 51130 (which may parallel to the optical axis and is indicated by arrow 51310). In un-actuated state, solenoid armature 51140 may be disposed with an air gap 51400 positioned between it and solenoid casing 51120. In operation, actuator 51100 may be controlled by passing an electric current through solenoid winding 51130, thereby inducing a toroidally-shaped magnetic circuit (indicated by arrows 51300) confined substantially in solenoid bobbin 51110, solenoid casing 51120 and solenoid armature 51140. In response to magnetic flux in magnetic circuit 51300, solenoid armature 51140 may move in a direction that increases the magnetic flux density in (or, decreases the reluctance of) magnetic circuit 51300. For example, solenoid armature 51140 may be substantially composed of iron. In FIG. 53, support 27010 and optical surface 2002 are hidden in order to provide visibility of support 30002 and optional fluid pass-throughs 30004 and diaphragm seal 41110.

Figure 54:
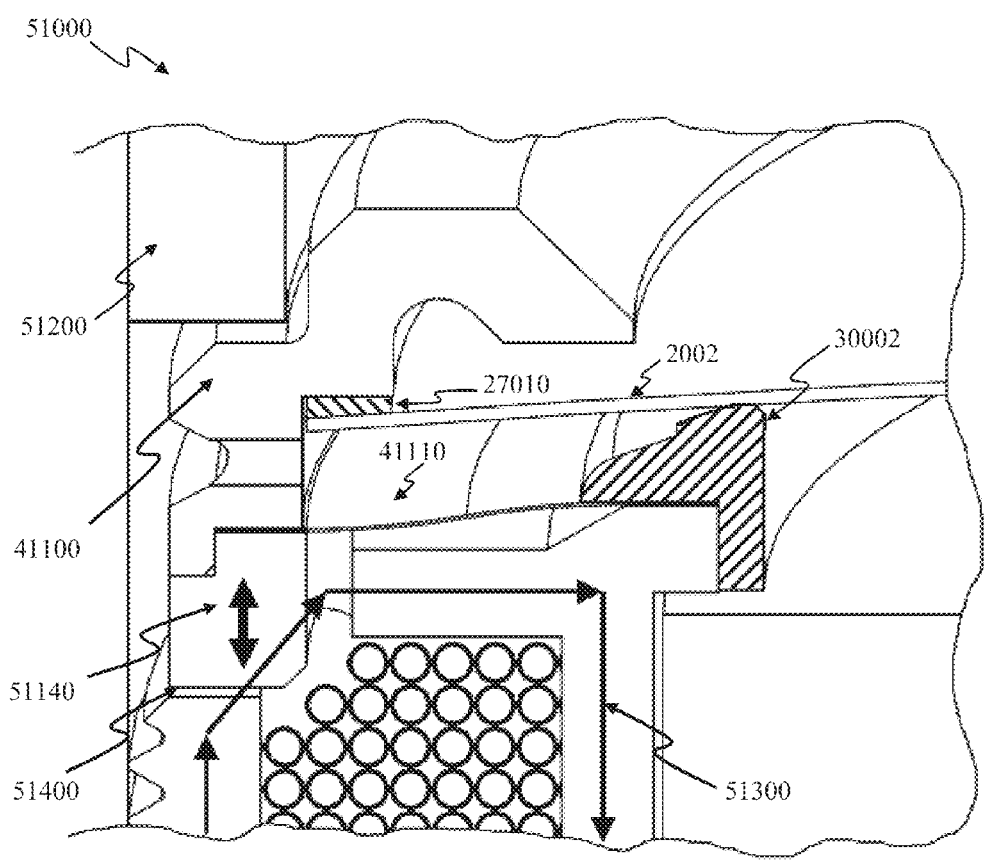
FIG. 54 is an alternate detailed three-dimensional view of a fluidic optical device with actuation provided by an electromagnet actuator.

FIG. 54 shows a detailed close-up cross-section view of device 51000 similar to the structure depicted in FIG. 52. Support 27010 may be disposed in communication with optical surface and support frame 41100 in the proximity of the edge of optical surface 2002. In this fashion, support may function similarly to a fixed, compliant, or simple edge support to optical surface 2002. Likewise, perforated support 30002 may be disposed in communication with, and function similarly to, a simple support to optical surface 2002 and may optical surface 2002. Solenoid armature 51140 may be fastened to support frame 41100. In response to electromagnetic force from magnetic circuit 51300, solenoid armature 51140 and support frame 41100 may move axially (indicated by arrow 51310) toward solenoid casing 51120, thereby reducing the size of air gap 51400. Such axial motion of support frame 41100 may deliver an axially directed motive force to the edge of optical surface 2002. In response to such motive force at the edge of optical surface 2002, support 30002 may provide a reactive force and simple support to optical surface 2002. In this fashion, a ring-on-ring type load may be provided to, and cause the bending deflection of, optical surface 2002. Retainer ring 51200 may serve as a physical stop for limiting the axial travel of support frame 41100.

Figure 55:
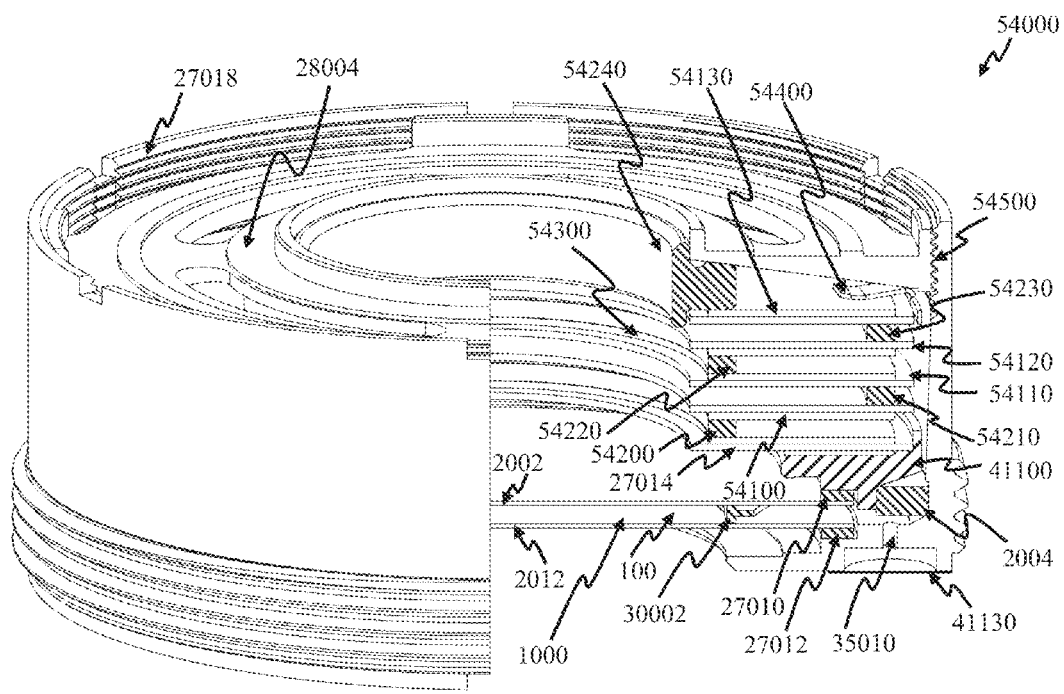
FIG. 55 is a three-dimensional view of a fluidic optical device with actuation provided by a plurality of actuation members.

FIG. 55 is a three-dimensional cross-section view of an adaptive fluidic optical device 54000, similar to the device depicted in FIG. 19. Compartment 1000 may be at least partially bounded by optical surfaces 2002, 2012, supports 27010, 27012, 2004, support frame 41100, and housing 27018. Housing 27018 may additionally function in a fashion similar to support frame 41100 wherein it may serve as a mount for a support and/or optical surface. Support 30002 further may include spider-leg (not shown) and outer-rim (not shown) protrusions to assist in positioning of support 30002 within compartment 1000. Support 30002 may be perforated in order to allow fluid communication across either side of it, or may not be perforated in order to prevent fluid communication as desired. Actuator 54300 may be disposed to provide an axially directed motive force to support frame 41100. Actuator 54300 may further include a plurality of actuator members 27014, 54100, 54110, 54120, 53130, which may be stacked actuators (for example, a stack of piezoelectric ring benders or electroactive polymer actuators) or a singular actuator configured for increased stroke and/or force (for example, a singular electroactive polymer actuator folded multiple times thereby forming stacked actuator layers). In the case of actuator 54300 comprising stacked discrete members, a plurality of actuator supports 54200, 54210, 54220, 54230, 54240 may be disposed in communication with one or more actuator members in the stack. Actuator supports 54200, 54210, 54220, 54230, 54240 may be at least partially electrically conductive and/or insulating, in order to provide desired electrical communication to actuator members 27014, 54100, 54110, 54120, 53130. Further, actuator supports 54200, 54210, 54220, 54230, 54240 may be at least partially stiff and/or compliant in order to provide desired mechanical support to actuator members 27014, 54100, 54110, 54120, 53130. Additionally, one or more conductive straps 54400 may be disposed in order to provide desired electrical communication between actuator members in the stack. For example, conductive strap 54400 may connect the piezoceramic electrodes of actuator elements 54130, 54120 to each other. Similarly, conductive support 54230 may connect the metallic shims of actuator elements 54130, 54120 to each other. In this fashion, a plurality of such conductive straps and supports may be employed to electrically and mechanically connect all actuator members in a desired configuration. Support 54240 may be disposed in communication with adjustable housing member 28004, wherein the axial position of adjustable housing member 28004 may be adjusted in order to provide a desired preload to actuator 54300. The position of adjustable housing member 28004 may be set by any desirable method, for example, threads 54500 between adjustable housing member 28004 and housing 27018. In operation, actuator 54300 may deliver an axial load to optical surface 2002 through support 27010. Likewise, optical surface 2002 may communicate such axial load to optical surface 2012 through support 30002. In this fashion, a first ring-on-ring load may be delivered to optical surface 2002 between supports 27010, 30002, and a second ring-on-ring load may be delivered to optical surface 2012 between supports 27012, 30002. Such ring-on-ring loads may result in the deflection of optical surfaces 2002, 2012. Residual fluid pressure may be controlled by fluid channels 35010 and bladder diaphragm 41130. Additionally, fluid 100 may be introduced into compartment 1000 via fluid channel 35010 (prior to sealing fluid channel 35010 with bladder diaphragm 41130), wherein fluid channel 35010 may function similarly to a fill hole as understood in the field of microfluidic device engineering.

Figure 56:
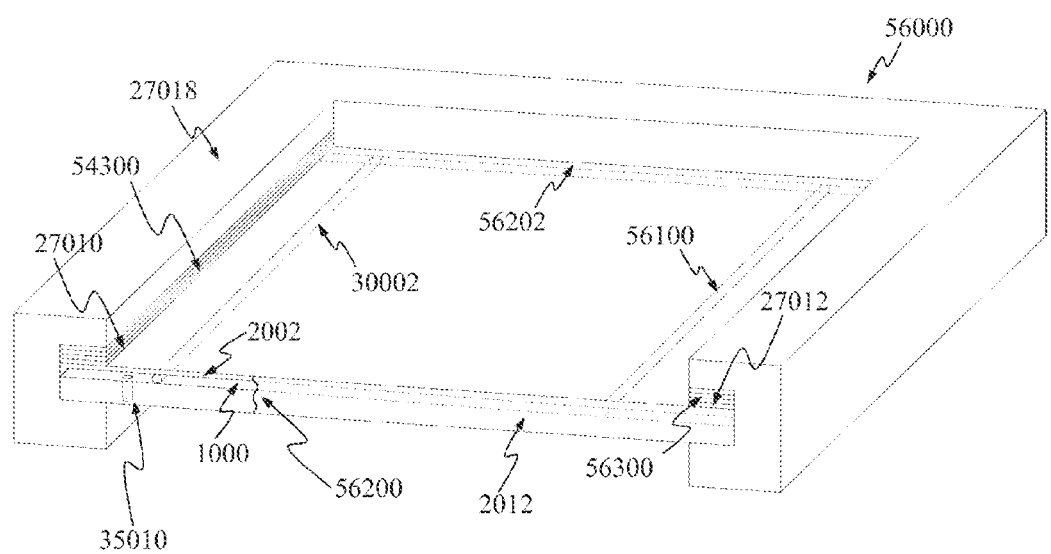
FIG. 56 is a three-dimensional cross-section view of an adaptive fluidic optical device configured as a variable focal length cylindrical lens.

FIG. 56 is a three-dimensional cross-section view of an adaptive fluidic optical device 56000, similar to the device depicted in FIG. 6. Device 56,000 is configured to operate similarly to a cylindrical lens having adjustable focal length. Compartment 1000 may be at least partially bounded by optical surfaces 2002, 2012, housing 27018, and sidewall members 56200, 56202. In one embodiment, optical surface 2002 may be bendable and similar to a Kirchhoff plate, while optical surface 2012 may be substantially rigid. Supports 30002, 56100 may be substantially linear and disposed parallel to each other, thereby enabling the bending of optical surface 2002 along a single axis. Actuators 54300, 56300 may be disposed in the proximity of the edges optical surface 2002 and provide an axially-directed motive force to the edges of optical surface 2002. In this fashion, actuators 54300, 56300 and supports 30002, 56100 may deliver a bending load to optical surface 2002 similar to a 4-point load wherein optical surface 2002 may bend about an axis substantially parallel to supports 30002, 56100. Supports 30002, 56100 may be perforated with fluid pass-throughs (not shown). Sidewall members 56200, 56202 may be at least partially compliant and accommodate for bending of optical surface 2002 while still maintaining a seal on the sidewalls of compartment 1000. Preferably, sidewall members are more compliant than optical surface 2002 and may easily deflect or deform in response to deflection of optical surface 2002. In FIG. 56, sidewall member 56200 is shown partially removed in to provide visibility to the internal region of compartment 1000, however it may completely seal the side of compartment, spanning from actuator 54300 to actuator 56300.

Figure 57:
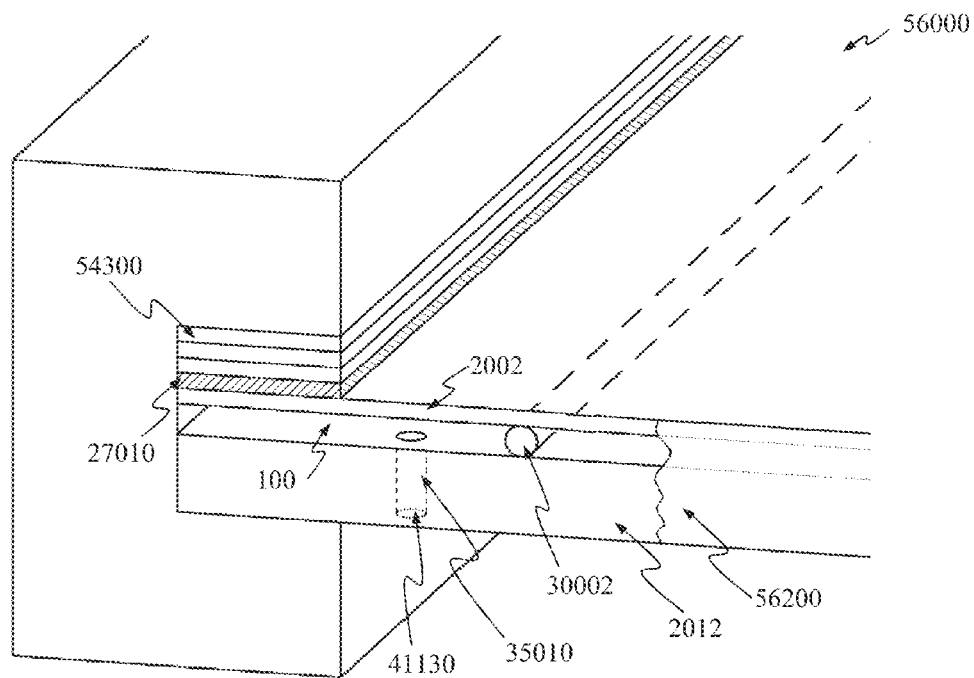
FIG. 57 is a detailed three-dimensional cross-section view of an adaptive fluidic optical device configured as a variable focal length cylindrical lens.

FIG. 57 is a detailed three-dimensional cross-section view of an adaptive fluidic optical device 56000, similar to the device depicted in FIG. 56. Actuator 54300 may include a plurality or stack of individual actuator members. Fluid channel 35010 and bladder diaphragm 41130 may be provided in optical surface 2012 or any other desirable part of the device 56000 in order to control residual fluid pressure.

Figure 58:
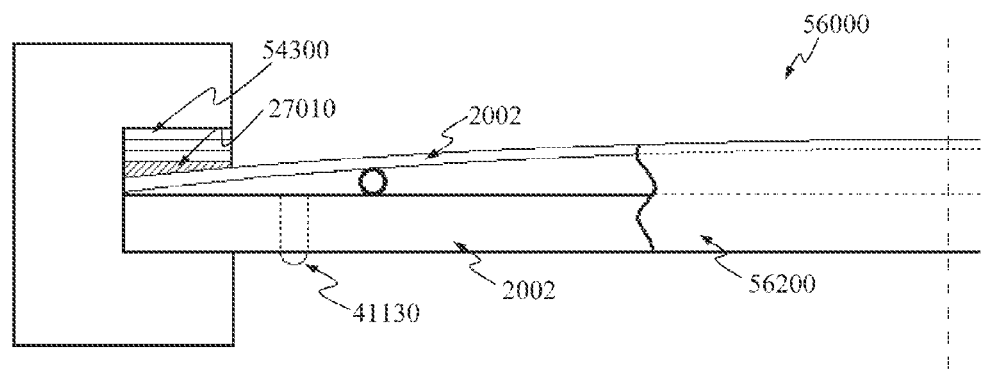
FIG. 58 is a partial cross-section view of an adaptive fluidic optical device configured as a variable focal length cylindrical lens.

FIG. 58 is a partial cross-section view of an adaptive fluidic optical device 56000, similar to the device depicted in FIG. 56. Optical surface 2002 is shown in a deflected state as a result of the applied load (which, as described above may similar to 4-point loading). Supports 27010, 27012 may be disposed in communication with actuator 54300 and optical surface 2002 in order to deliver motive force from actuator 54300 to optical surface 2002. In response to deflection of optical surface 2002, and sidewall members 56200, 56202 may undergo elastic deformation (for example, tension).

It is understood that the fluid or any fluidic element of the device may comprise fluid, liquid, gas, gel, plasma or solid chosen for its performance characteristics including optical, mechanical, physical and chemical properties.

It is also understood that the fluid or any type of optical surface of any embodiment of the device may be substituted and/or combined with any other type of optical surface. For example, a Kirchhoff plate-type optical surface in an embodiment may be replaced with a rigid optical surface.

It is further understood that a compartment may be closed (i.e., sealed) or open (i.e., not sealed). For example, a closed compartment may comprise two optical surfaces and a ring-shaped support forming a seal around a fluid or liquid. Alternatively, one example of an open compartment may comprise two optical surfaces and a reservoir having open capillary channels generally bounding a fluid or liquid. As a further example of an open compartment, two optical surfaces may be disposed in communication on either side of a volume of gel, elastomer, polymer, solid or other desirable material. The gel may have sufficient viscosity and/or other desirable properties (for example, low durometer) such that it will not run, thereby eliminating the need for confinement (or a seal) around its perimeter by a reservoir, support, sidewall or other fluid containment structure.

It is also understood that multiple elements of the present device may be combined and formed as "integrated" (or "unitary" or "monolithic") units or parts.

The reader's attention is directed to all papers and documents which are filed concurrently with this specification and which are open to public inspection with this specification, and the contents of all such papers and documents incorporated herein by reference.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for." Any feature described herein, whether preferred or not, may be combined with any other feature, whether preferred or not.

We claim:

1. A fluidic optical device, comprising:
   a fluidic lens comprising a first compartment at least partially bounded by:
   a first optical surface; and
   a second optical surface;
   wherein second optical surface is configured for deflection in response to an applied load;
   a first fluid disposed at least partially in first compartment, wherein the deflection in response to an applied load results in a residual fluid pressure in the compartment, wherein the applied load includes a ring-on-ring load;
   a second compartment at least partially bounded by:
   the second optical surface; and
   a third optical surface; and
   a second fluid disposed at least partially in second compartment.

2. A fluidic optical device, comprising:
   a fluidic lens comprising a first compartment at least partially bounded by:
   a first optical surface; and
   a second optical surface;
   wherein second optical surface is configured for deflection in response to an applied load;
   a first fluid disposed at least partially in first compartment, wherein the deflection in response to an applied load results in a residual fluid pressure in the compartment, wherein the applied load includes a pin-on-ring load;
   a second compartment at least partially bounded by:
   the second optical surface; and
   a third optical surface; and
   a second fluid disposed at least partially in second compartment.

* * * * *